US012781920B2

(12) United States Patent
Park et al.

(10) Patent No.: US 12,781,920 B2
(45) Date of Patent: Nov. 3, 2026

(54) LIQUEFIED GAS STORAGE TANK AND SHIP COMPRISING SAME

(71) Applicant: HYUNDAI HEAVY INDUSTRIES CO., LTD., Ulsan (KR)

(72) Inventors: Seong Bo Park, Ulsan (KR); Won Seok Heo, Ulsan (KR); Hye Min Cho, Ulsan (KR); Ki Joong Kim, Ulsan (KR); Cheon Jin Park, Ulsan (KR); Min Kyu Park, Ulsan (KR); Jung Kyu Park, Ulsan (KR); Byeong Jin Jeong, Ulsan (KR); Dong Woo Kim, Ulsan (KR); Sung Kyu Hong, Ulsan (KR); Gwang Soo Go, Ulsan (KR); Jee Yeon Heo, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 626 days.

(21) Appl. No.: 18/261,977

(22) PCT Filed: Dec. 15, 2021

(86) PCT No.: PCT/KR2021/019117
§ 371 (c)(1),
(2) Date: Jul. 18, 2023

(87) PCT Pub. No.: WO2022/215829
PCT Pub. Date: Oct. 13, 2022

(65) Prior Publication Data

US 2024/0084969 A1 Mar. 14, 2024

(30) Foreign Application Priority Data

Apr. 8, 2021 (KR) ........................ 10-2021-0046140
Jun. 2, 2021 (KR) ........................ 10-2021-0071792
Nov. 26, 2021 (KR) ........................ 10-2021-0165709

(51) Int. Cl.
*F17C 3/04* (2006.01)
*B63B 25/16* (2006.01)
*F17C 3/02* (2006.01)

(52) U.S. Cl.
CPC ................ *F17C 3/04* (2013.01); *B63B 25/16* (2013.01); *F17C 3/027* (2013.01); *F17C 2203/0304* (2013.01); *F17C 2270/0105* (2013.01)

(58) Field of Classification Search
CPC .... F17C 3/00; F17C 3/027; F17C 3/04; F17C 3/02; F17C 2203/0304; F17C 2270/0105;
(Continued)

(56) References Cited

U.S. PATENT DOCUMENTS 4,170,952 A 10/1979 McCown
6,035,795 A 3/2000 Dhellemmes et al.
(Continued)

FOREIGN PATENT DOCUMENTS

CN 111164343 A 5/2020
JP S56091996 U 12/1979
(Continued)

OTHER PUBLICATIONS

Office Action for Chinese Patent Application No. 202180089951.9 issued by the Chinese Patent Office on Aug. 30, 2025.
(Continued)

*Primary Examiner* — Lars A Olson
(74) *Attorney, Agent, or Firm* — IP&T GROUP LLP

(57) ABSTRACT

The liquefied gas storage tank includes a primary barrier, a primary insulation wall, a secondary barrier, and a secondary insulation wall. In a state where unit elements are arranged adjacent to each other, each of the unit elements being formed by stacking the secondary insulation wall, the secondary barrier, and a fixed insulation wall which is a part of
(Continued)

the primary insulation wall, the primary insulation wall may comprise: a connection insulation wall provided in the space between the adjacent fixed insulation walls; first slits formed between the fixed insulation walls and the connection insulation wall when the connection insulation wall is inserted and installed between the adjacent fixed insulation walls; a plurality of second slits formed in a lengthwise direction and a widthwise direction of the fixed insulation walls; and a first insulating filler material for filling the first slits.

12 Claims, 51 Drawing Sheets

(58) Field of Classification Search
CPC ...... F17C 1/00; F17C 1/02; F17C 1/12; B63B 25/00; B63B 25/08; B63B 25/16
USPC ........................................................ 114/74 A
See application file for complete search history.

(56) References Cited

U.S. PATENT DOCUMENTS

| | | | | |
|---|---|---|---|---|
| 10,989,357 | B2 * | 4/2021 | Bony | F17C 3/027 |
| 2020/0256514 | A1 | 8/2020 | Bony et al. | |
| 2020/0346720 | A1 | 11/2020 | Bertucelli | |

FOREIGN PATENT DOCUMENTS

| | | | |
|---|---|---|---|
| JP | S60196496 | A | 10/1985 |
| JP | H06-337096 | A | 12/1994 |
| JP | 2000-079987 | A | 3/2000 |
| JP | 2011-099548 | A | 5/2011 |
| JP | 2011-196412 | A | 10/2011 |
| JP | 2020-532690 | A | 11/2020 |
| JP | 2021011950 | A | 2/2021 |
| KR | 10-2011-0006819 | A | 1/2011 |
| KR | 10-2011-0068146 | A | 6/2011 |
| KR | 10-1053123 | B1 | 8/2011 |
| KR | 10-1067126 | B1 | 9/2011 |
| KR | 10-2011-0109115 | A | 10/2011 |
| KR | 10-1099676 | B1 | 12/2011 |
| KR | 20110130637 | A | 12/2011 |
| KR | 10-2012-0004652 | A | 1/2012 |
| KR | 10-1105253 | B1 | 1/2012 |
| KR | 20120013227 | A | 2/2012 |
| KR | 10-2012-0074441 | A | 7/2012 |
| KR | 20120074441 | A | 7/2012 |
| KR | 10-1325689 | B1 | 11/2013 |
| KR | 20140003357 | A | 1/2014 |
| KR | 10-1415899 | B1 | 7/2014 |
| KR | 10-1435381 | B1 | 8/2014 |
| KR | 10-2016-0015438 | A | 2/2016 |
| KR | 20160043162 | A | 4/2016 |
| KR | 20160072290 | A | 6/2016 |
| KR | 10-2017-0022661 | A | 3/2017 |
| KR | 10-2017-0120862 | A | 11/2017 |
| KR | 20170137606 | A | 12/2017 |
| KR | 10-1834291 | B1 | 4/2018 |
| KR | 20190011554 | A | 2/2019 |
| KR | 10-2019-0051599 | A | 5/2019 |
| KR | 10-2019-0078547 | A | 7/2019 |
| KR | 20190082026 | A | 7/2019 |
| KR | 10-2011866 | B1 | 8/2019 |
| KR | 10-2020969 | B1 | 11/2019 |
| KR | 10-2019-0142566 | A | 12/2019 |
| KR | 10-2075975 | B1 | 3/2020 |
| KR | 10-2095423 | B1 | 3/2020 |
| KR | 20200021759 | A | 3/2020 |
| KR | 10-2020-0046079 | A | 5/2020 |
| KR | 10-2020-0051668 | A | 5/2020 |
| KR | 20200088360 | A | 7/2020 |
| KR | 20200091990 | A | 8/2020 |
| KR | 10-2183947 | B1 | 11/2020 |
| KR | 10-2021-0003417 | A | 1/2021 |
| KR | 10-2021-0040687 | A | 4/2021 |
| KR | 10-2021-0040688 | A | 4/2021 |
| KR | 20210058055 | A | 5/2021 |
| KR | 10-2021-0074441 | A | 6/2021 |
| WO | 2017/034118 | A1 | 3/2017 |

OTHER PUBLICATIONS

Written Opinion for the Singapore Patent Application No. 11202305611R issued by the Intellectual Property Office of Singapore on Dec. 17, 2024.
Notice of Allowance for the Korean Patent Application No. 10-2021-0186218 issued by the Korean Patent Office on Sep. 25, 2023.
Office Action for the Korean Patent Application No. 10-2022-0001641 issued by the Korean Patent Office on Aug. 7, 2023.
Office Action for the Korean Patent Application No. 10-2022-0001660 issued by the Korean Patent Office on Aug. 7, 2023.
Office Action for the Korean Patent Application No. 10-2022-0001672 issued by the Korean Patent Office on Aug. 8, 2023.
Office Action for the Korean Patent Application No. 10-2022-0010218 issued by the Korean Patent Office on Aug. 19, 2023.
Office Action for Japanese Patent Application No. 2023-542858 issued by the Japanese Patent Office on Jul. 9, 2024.
Office Action for the Korean Patent Application No. 10-2022-0042540 issued by the Korean Intellectual Property Office on Oct. 6, 2023.
Office Action for the Korean Patent Application No. 10-2022-0043073 issued by the Korean Intellectual Property Office on Oct. 7, 2023.
Office Action for the Korean Patent Application No. 10-2022-0049130 issued by the Korean Intellectual Property Office on Oct. 10, 2023.
Notice of Allowance for Chinese Patent Application No. 202180089951.9 issued by the Chinese Patent Office on Apr. 6, 2026.

* cited by examiner

LIQUEFIED GAS STORAGE TANK AND SHIP COMPRISING SAME

This application is a national stage application of PCT/KR2021/019117 filed on Dec. 15, 2021, which claims priority to Korean patent application number 10-2021-0046140 filed on Apr. 8, 2021, Korean patent application number 10-2021-0071792 filed on Jun. 2, 2021, and Korean patent application number 10-2021-0165709 filed on Nov. 26, 2021. The disclosure of each of the foregoing applications is incorporated herein by reference in its entirety.

TECHNICAL FIELD

The present invention relates to a liquefied gas storage tank and a ship including the same.

BACKGROUND ART

Recently, liquefied gases, such as liquefied natural gas (LNG) and liquefied petroleum gas (LPG), are widely used to replace gasoline or diesel according to the technology development.

In addition, a storage tank (so-called "cargo tank") for storing LNG in a cryogenic liquid state is installed in ships, such as LNG cargo ships, LNG regasification ships (RVs), LNG floating, production, storage, and offloading (FPSO) ships, and LNG floating storage and regasification units (FSRUs), for transporting or storing the liquefied gases such as LNG at sea.

In addition, boil off gas (BOG) may be generated in the liquefied gas storage tank affected by external heat, and a key technology for designing the liquefied gas storage tank is for reducing a boil off rate (BOR), which is a rate of vaporization of BOG, through an insulation design. In addition, since the liquefied gas storage tank is exposed to various loads such as sloshing, it may be essential to secure a mechanical strength of an insulation panel.

Considering this point, allowable thicknesses of a primary insulation wall and a secondary insulation wall may be associated with a mechanical strength of the liquefied gas storage tank. Therefore, studies are being actively conducted to maintain the mechanical strength of the secondary insulation wall while eliminating the low-temperature load of a secondary barrier.

Technical Problem

The present invention has been made in efforts to solve the above problems of the related art and is directed to providing a liquefied gas storage tank and a ship including the same, in which a thickness of a primary insulation wall is formed identically or similarly to a secondary insulation wall in the entire thickness of an insulation wall, thereby reducing the low-temperature load and sloshing load of a secondary barrier while maintaining a mechanical strength of the secondary insulation wall at a predetermined level.

In addition, the present invention is directed to providing a liquefied gas storage tank and a ship including the same, in which a thickness of a primary insulation wall is formed identically or similarly to a secondary insulation wall in the entire thickness of an insulation wall, thereby reducing the low-temperature load and sloshing load of a secondary barrier in a range in which brittle fracture of a hull does not occur.

In addition, the present invention is directed to providing a liquefied gas storage tank and a ship including the same, in which a configuration of a secondary barrier is improved, thereby increasing insulation performance.

In addition, the present invention is directed to providing a liquefied gas storage tank and a ship including the same, in which a configuration of a fixing member for fixing a secondary insulation wall to a hull is improved, thereby not only increasing insulation performance but also reducing the number of processes.

In addition, the present invention is directed to providing a liquefied gas storage tank and a ship including the same, in which a slit provided to cope with contraction and expansion of a primary insulation wall formed on a secondary barrier is optimized and a convection phenomenon caused through the slit and an amount of heat transferred into the secondary barrier is minimized, thereby enhancing the stability of the primary insulation wall and also reducing a low-temperature load of the secondary barrier.

Technical Solution

A liquefied gas storage tank according to one aspect of the present invention is the liquefied gas storage tank that stores cryogenic substances, which includes a primary barrier, a primary insulation wall, a secondary barrier, and a secondary insulation wall, wherein, in a state in which unit elements, each of which is formed by stacking the secondary insulation wall, the secondary barrier, and a fixed insulation wall that is a part of the primary insulation wall, are disposed adjacent to each other, the primary insulation wall includes a connection insulation wall provided in a spatial portion between the adjacent fixed insulation walls, a first slit formed between the fixed insulation wall and the connection insulation wall when the connection insulation wall is inserted and installed between the adjacent fixed insulation walls, a plurality of second slits formed in a longitudinal direction and a width direction of the fixed insulation wall, and a first insulating filler material filling the first slit.

The first insulating filler material may be formed to fully fill the first slit, formed to fill the first slit from an inlet of the first slit to a predetermined depth so that a space is formed in a lower portion of the first slit, or formed to fill an inside of the first slit in multiple layers so that a plurality of spaces are formed inside the first slit.

When the first insulating filler material is formed to fill the inside of the first slit in multiple layers so that the plurality of spaces are formed inside the first slit, the first insulating filler material may include a first upper insulating filler material formed in an upper portion of the first slit, a first middle insulating filler material spaced a predetermined interval from the first upper insulating filler material and formed in a middle of the first slit, and a first lower insulating filler material spaced a predetermined interval from the first middle insulating filler material and formed in a lower portion of the first slit, each of the first upper insulating filler material, the first middle insulating filler material, and the first lower insulating filler material may be formed of the same insulating material or different insulating materials, and the insulating material may include glass wool, super lite, a soft foam material, or an aerogel blanket.

The first insulating filler material may fill the first slit in an insertion method using a jig after the connection insulation wall is inserted and installed between the adjacent fixed insulation walls, or fill the first slit by inserting and installing the connection insulation wall between the adjacent fixed insulation walls in a state of being bonded to both side surfaces of the connection insulation wall facing a side surface of the fixed insulation wall using an adhesive member.

The second slit may be filled with a second insulating filler material therein when formed to a depth similar to a thickness of the fixed insulation wall, and the second insulating filler material may be formed to fill the second slit from an inlet of the second slit to a predetermined depth so that a space is formed in a lower portion of the second slit, or formed to fill an inside of the second slit in multiple layers so that a plurality of spaces are formed inside the second slit.

When the second insulating filler material is formed to fill the inside of the second slit in multiple layers so that the plurality of spaces are formed inside the second slit, the second insulating filler material may include a second upper insulating filler material formed in an upper portion of the second slit, a second middle insulating filler material spaced a predetermined interval from the second upper insulating filler material and formed in a middle of the second slit, and a second lower insulating filler material spaced a predetermined interval from the second middle insulating filler material and formed in a lower portion of the second slit, each of the second upper insulating filler material, the second middle insulating filler material, and the second lower insulating filler material may be formed of the same insulating material or different insulating materials, and the insulating material may include glass wool, super lite, a soft foam material, or an aerogel blanket.

The liquefied gas storage tank may include one or more third slits formed in a longitudinal direction of the connection insulation wall and positioned collinearly with the second slit formed in the longitudinal direction when the connection insulation wall is inserted and installed between the fixed insulation walls, the second slit and the third slit may be formed to a depth corresponding to about half of thicknesses of the fixed insulation wall and the connection insulation wall and may not be filled with an insulating filler material therein, the first insulating filler material is formed to be at least longer than a depth of each of the second slit and the third slit, and a heat convection path through the first slit, the second slit, and the third slit may be intermittently formed.

The primary insulation wall and the secondary insulation wall may have the same or similar thickness.

A liquefied gas storage tank according to another aspect of the present invention is the liquefied gas storage tank that stores cryogenic substances, which includes a primary barrier, a primary insulation wall, a secondary barrier, and a secondary insulation wall, wherein, in a state in which unit elements, each of which is formed by stacking the secondary insulation wall, the secondary barrier, and a fixed insulation wall that is a part of the primary insulation wall, are disposed adjacent to each other, the primary insulation wall may include a connection insulation wall provided in a spatial portion between the adjacent fixed insulation walls, first steps formed on front, rear, left, and right side surfaces of the connection insulation wall, second steps formed on front, rear, left, and right side surfaces of the fixed insulation wall, first slits formed by the first steps and the second steps between the connection insulation wall and the fixed insulation wall when the connection insulation wall is inserted and installed between the adjacent fixed insulation walls, and a first insulating filler material filling the first slits.

The first step may be formed so that front-rear and left-right widths of an upper portion of the connection insulation wall is smaller than front-rear and left-right widths of a lower portion of the connection insulation wall, the second step may be formed so that front-rear and left-right widths of an upper portion of the fixed insulation wall is smaller than front-rear and left-right widths of a lower portion of the fixed insulation wall, and the first insulating filler material may fill the first slit, which is a space provided between the upper portion of the connection insulation wall and the upper portion of the fixed insulation wall by installing the lower portion of the connection insulation wall to be adjacent to the lower portion of the fixed insulation wall.

The liquefied gas storage tank may include a plurality of second slits formed in a longitudinal direction and a width direction of the fixed insulation wall, and one or more third slits formed in a longitudinal direction of the connection insulation wall and positioned collinearly with the second slit formed in the longitudinal direction when the connection insulation wall is inserted and installed between the fixed insulation walls, the second slit and the third slit may be formed to a depth corresponding to about half of thicknesses of the fixed insulation wall and the connection insulation wall and not filled with an insulating filler material therein, the first slit filled with the first insulating filler material may be formed to be at least longer than a depth of each of the second slit and the third slit, and a heat convection path through the first slit, the second slit, and the third slit may be intermittently formed.

The primary insulation wall and the secondary insulation wall may have the same or similar thickness.

Advantageous Effects

In a liquefied gas storage tank and a ship including the same according to the present invention, a thickness of a primary insulation wall is formed to be the same as or similar to that of a secondary insulation wall in the entire thickness of the primary insulation wall and the secondary insulation wall including a connection insulation wall, thereby not only maintaining a mechanical strength of the secondary insulation wall at a predetermined level but also reducing a low-temperature load and a sloshing load of a secondary barrier to prevent damage to the secondary barrier.

In addition, in the liquefied gas storage tank and the ship including the same according to the present invention, the thickness of the primary insulation wall is formed to be the same as or similar to that of the secondary insulation wall in the entire thickness of the primary insulation wall and the secondary insulation wall including the connection insulation wall, thereby preventing brittle fracture of a hull and reducing the low-temperature load and the sloshing load of the secondary barrier.

In addition, the liquefied gas storage tank and the ship including the same according to the present invention is provided with an auxiliary insulation plate on a lower surface of the connection insulation wall provided in a space between adjacent primary insulation walls constituting a unit element, thereby further increasing insulation performance at a connected portion between adjacent secondary insulation walls constituting a unit element.

In addition, in the liquefied gas storage tank and the ship including the same according to the present invention, a configuration of the secondary barrier is improved, thereby increasing insulation performance.

In addition, in the liquefied gas storage tank and the ship including the same according to the present invention, a non-adhesive elastic insulating material is applied between the secondary insulation wall and the hull as a leveling member of the secondary insulation wall, thereby leveling a deformed portion of the hull and increasing insulation performance of the tank even without using a conventional mastic and leveling wedge.

In addition, in the liquefied gas storage tank and the ship including the same according to the present invention, a unit panel of the adjacent secondary insulation walls is fixed in a cleat structure method using a protrusion provided to protrude outward from a lower portion of a side surface of the unit panel of the secondary insulation wall and a stud bolt fixed to the hull, thereby reducing the number of processes compared to a method of making a hole in the secondary insulation wall and fixing the unit panel with the stud bolt.

In addition, in the liquefied gas storage tank and the ship including the same according to the present invention, a slit structure is improved and various insulating filler materials filling the slit are provided in order to optimize the slit provided to cope with contraction and expansion of the primary insulation wall formed on the secondary barrier and minimize a convection phenomenon generated through the slit and an amount of heat transferred into the secondary barrier, thereby enhancing the stability of the primary insulation wall according to the formation of the slit and also reducing the low-temperature load of the secondary barrier to prevent damage to the primary insulation wall and the secondary insulation wall.

MODES OF THE INVENTION

Figure 1:
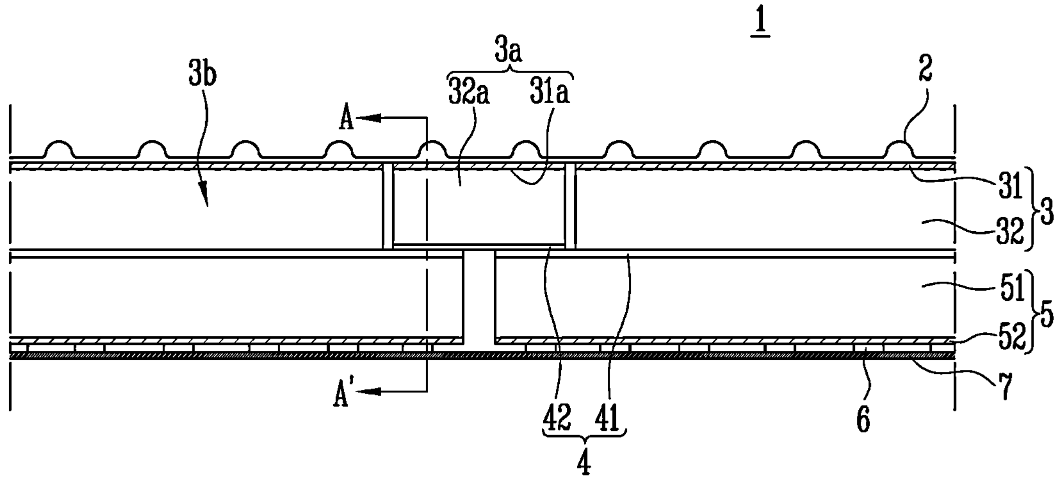
FIG. 1 is a partial cross-sectional view showing a liquefied gas storage tank according to a first embodiment of the present invention.

Objects, specific advantages and new features of the present invention will become more apparent from the following detailed description and exemplary embodiments associated with the accompanying drawings. In the specification, in adding reference numerals to components of each drawing, it should be noted that the same components have the same numbers as possible even when the components are displayed on different drawings. In addition, in describing the present invention, when it is determined that a detailed description of related known technologies may unnecessarily obscure the subject matter of the present invention, the detailed description thereof will be omitted.

In addition, it should be understood that the accompanying drawings are only for easy understanding of the embodiments disclosed in the specification, and the technical spirit disclosed in the specification is not limited by the accompanying drawings and includes all changes, equivalents, or substitutes included in the spirit and technical scope of the present invention.

In addition, terms including ordinal numbers, such as first and second, may be used to describe various components, but the components are not limited by the terms. These terms are only used for the purpose of distinguishing one component from another.

Hereinafter, in the specification, liquefied gas may be used as the meaning including all gaseous fuels that are generally stored in a liquid state, such as liquefied natural gas (LNG), liquefied petroleum gas (LPG), ethylene, and ammonia, and liquefied gas in the case of being not in the liquid state by heating or pressurizing may also be expressed as liquefied gas for convenience. Likewise, this may also be applied to boil off gas (BOG). In addition, for convenience, the LNG may be used as the meaning including not only natural gas (NG) in a liquid state but also LNG in a supercritical state, and the BOG may be used as the meaning including not only a BOG in a gaseous state but also liquefied BOG.

Hereinafter, exemplary embodiments of the present invention will be described in detail with reference to the accompanying drawings.

Figure 2:
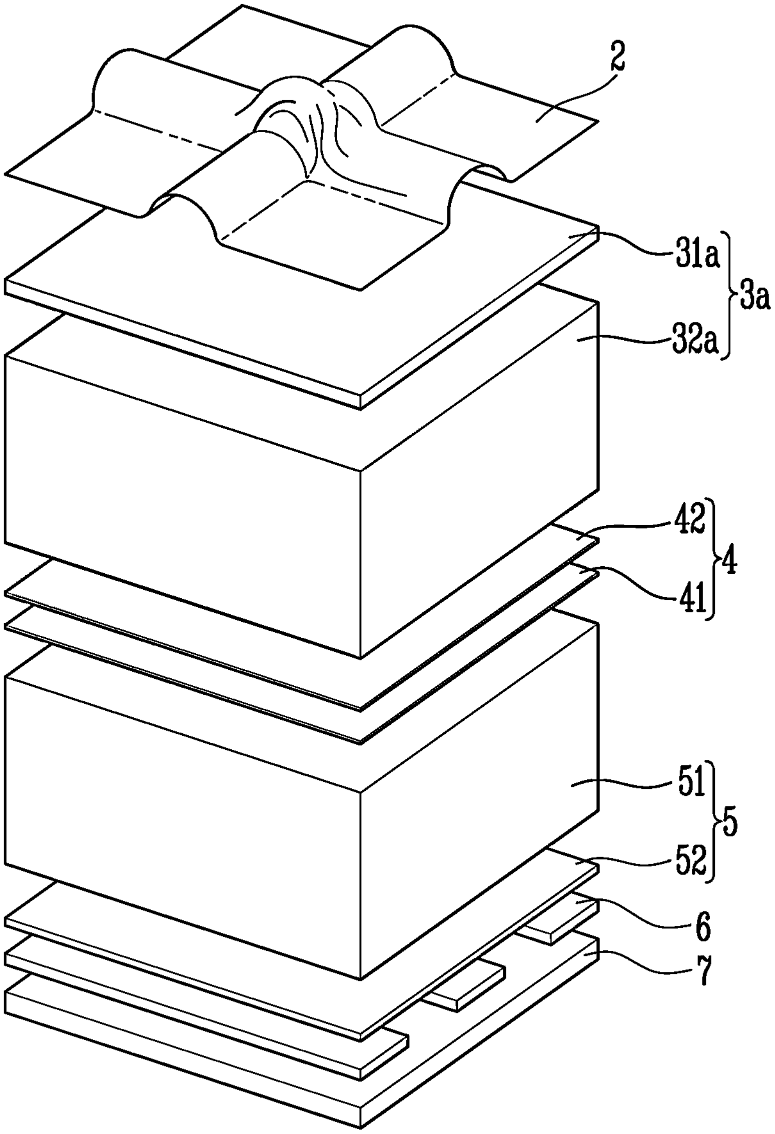
FIG. 2 is a partial perspective view showing the liquefied gas storage tank according to the first embodiment of the present invention.
Figure 3:
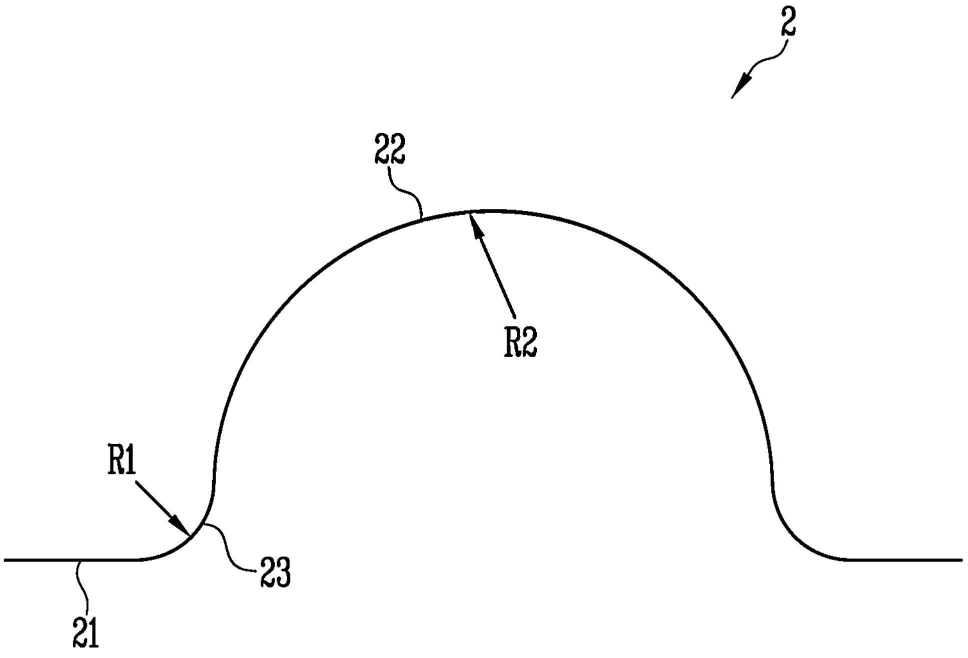
FIG. 3 is a view showing a primary barrier of the liquefied gas storage tank according to the first embodiment of the present invention.

FIG. 1 is a partial cross-sectional view showing a liquefied gas storage tank according to a first embodiment of the present invention, and FIG. 2 is a partial perspective view showing the liquefied gas storage tank according to the first embodiment of the present invention. FIG. 3 is a view showing a primary barrier of the liquefied gas storage tank according to the first embodiment of the present invention.

As shown in FIGS. 1 and 2, a liquefied gas storage tank 1 according to the first embodiment of the present invention may be provided in a ship to store liquefied gas, such as LNG that is a cryogenic (in a range of about −160° C. to −170° C.) substance.

Although not shown, it should be noted that the ship equipped with the liquefied gas storage tank 1 to be described below has a concept including offshore structures that float at a certain point at sea and perform specific tasks in addition to commercial ships that transport cargo from a departure to a destination. In addition, in the present invention, it should be noted that the liquefied gas storage tank 1 also includes any type of tank for storing liquefied gas.

The liquefied gas storage tank 1 may include a primary barrier 2 in contact with the liquefied gas, a primary insulation wall 3 installed outside the primary barrier 2, a secondary barrier 4 installed outside the primary insulation wall 3, and a secondary insulation wall 5 disposed outside the secondary barrier 4. The liquefied gas storage tank 1 may be supported on a hull 7 by a mastic 6 installed between the secondary insulation wall 5 and the hull 7.

The liquefied gas storage tank 1 may require the optimization of thicknesses of the primary insulation wall 3 and the secondary insulation wall 5 in order to optimize insulation performance and a storage capacity. For example, when polyurethane foam is used as main materials of the primary insulation wall 3 and the secondary insulation wall 5, the total thickness of the primary insulation wall 3 and the secondary insulation wall 5 may be in a range of 250 mm to 500 mm. This will be described with reference to FIGS. 4 to 20.

In the above description, the liquefied gas storage tank 1 may include a planar and corner structure. For example, a horizontal wall in a front-rear direction, a floor between the horizontal walls, a vertical wall, and a ceiling of the liquefied gas storage tank 1 may correspond to the planar structure. In addition, for example, a structure in which the horizontal wall, the floor, the vertical wall, and the ceiling of the liquefied gas storage tank 1 meet may correspond to the corner structure. Here, the corner structure may include an obtuse angle corner structure or a right angle corner structure. When the thickness of the primary insulation wall 3 or the secondary insulation wall 5 is changed, the obtuse angle corner structure or the right angle corner structure may be changed. This will be described with reference to FIGS. 25 and 26.

Referring to FIGS. 1 and 2, the primary barrier 2 may form an accommodation space for accommodating liquefied gas, which is a cryogenic substance, and may be made of a metal material. For example, the metal material may be stainless steel, but is not limited thereto. The primary barrier 2 together with the secondary barrier 4 can prevent the liquefied gas from leaking to the outside.

The primary barrier 2 may be fixedly coupled to an upper portion of the primary insulation wall 3 by anchor strips (not shown) and installed in direct contact with the liquefied gas, which is a cryogenic substance stored in the liquefied gas storage tank 1.

Referring to FIG. 3, the primary barrier 2 may be divided into a planar portion 21 in contact with an upper surface of the primary insulation wall 3, a curved portion 22 for mitigating a contraction or expansion stress depending on a temperature, and an interface 23 between the planar portion 21 and the curved portion 22. For example, the primary barrier 2 may be formed of a corrugation membrane sheet made of stainless steel having a thickness of 1.0 to 1.5 mm, and preferably, stainless steel having a thickness of 1.0 to 1.2 mm. In other words, the primary barrier may be formed in a wrinkled shape.

The primary barrier 2 may be formed in the wrinkle shape having a first curvature radius R1 and a second curvature radius R2. In other words, the primary barrier 2 in the embodiment may be formed to have two types of curvature radii R1 and R2 including the first curvature radius R1 at the interface 23 between the planar portion 21 and the curved portion 22 and the second curvature radius R2 at the curved portion 22. For example, the first curvature radius R1 may be formed to be smaller than the second curvature radius R2. The primary barrier 2 having the curvature radii R1 and R2 may be easy for an inspection of welding because an upper portion thereof has a smooth curve and may flexibly respond to sloshing because a fluid hitting laterally flows directly therethrough.

In addition, the primary barrier 2 in the embodiment may be formed to have the same sizes of horizontal and vertical wrinkles in the entire region without distinction between large corrugation and small corrugation. In other words, since the sizes of horizontal and vertical wrinkles are the same in the entire primary barrier 2, the primary barrier may be easily manufactured.

Referring to FIG. 1, the primary insulation wall 3 may be designed to withstand an external impact or an impact caused by internal sloshing of the liquefied gas while blocking an influence of external heat and installed between the primary barrier 2 and the secondary barrier 4.

The primary insulation wall 3 may have a structure in which a primary plywood 31 and a primary insulating material 32 are sequentially stacked outward from the primary barrier 2 and correspond to a total of a thickness of the primary plywood 31 and a thickness of the primary insulating material 32. The primary insulation wall 3 may be formed with a thickness of 160 mm to 250 mm.

The primary plywood 31 may be installed between the primary barrier 2 and the primary insulating material 32.

The primary plywood 31 may be formed with a thickness of 6.5 mm to 15 mm.

The primary insulating material 32 may be made of a material having excellent insulation performance and mechanical strength to withstand the external impact or the impact caused by the internal sloshing of the liquefied gas while blocking the influence of external heat.

The primary insulating material 32 may be made of polyurethane foam between the primary plywood 31 and the secondary barrier 4 and may correspond to a thickness of 150 mm to 240 mm.

Referring to FIG. 1, a unit element may be formed by stacking a portion of the primary insulation wall 3, the secondary barrier 4, and the secondary insulation wall 5. Here, a portion of the primary insulation wall 3 constituting the unit element may be defined as a fixed insulation wall 3*b*, and the fixed insulation wall 3*b* may have a smaller width than the secondary insulation wall 5 included in the unit element. In addition, the fixed insulation wall 3*b*, the secondary barrier 4, and the secondary insulation wall 5 may be disposed in a fixed state in advance, but the present invention is not limited thereto and may also be separately disposed in the liquefied gas storage tank 1. Therefore, a portion of the secondary barrier 4 may be exposed to both sides of the primary insulation wall 3. The unit elements may be disposed adjacent to each other, and in this case, a connection insulation wall 3*a* may be installed in a spatial portion between the adjacent primary insulation walls 3, that is, a spatial portion in which the secondary barrier 4 is exposed.

The secondary barrier 4 may be divided into a main barrier 41 and an auxiliary barrier 42, and the main barrier 41 is installed above the secondary insulation wall 5 in the unit element, and the auxiliary barrier 42 is installed between the exposed main barrier 41 and the connection insulation wall 3*a*. In this case, the auxiliary barrier 42 is provided to interconnect the main barriers 41 provided in the adjacent unit elements. In other words, the unit elements disposed adjacent to each other may be finished by the auxiliary barrier 42 stacked on the main barrier 41 and the connection insulation wall 3*a*.

A stacked structure of a portion in which the connection insulation wall 3*a* is provided will be described with reference to FIG. 2. The connection insulation wall 3*a* may be provided in the form of stacking a connection plywood 31*a* and a connection insulating material 32*a*, which are the same as or similar to those described in the primary insulation wall 3 constituting the unit element, and in the specification, it should be noted that the primary insulation wall 3 may include the connection insulation wall 3*a* and the fixed insulation wall 3*b*.

FIG. 2 shows a cross-sectional structure along line A-A' in FIG. 1, and the connection insulation wall 3*a* may have a structure in which the connection plywood 31*a* and the connection insulating material 32*a* are stacked. A thickness of the connection insulation wall 3*a* may correspond to a total of a thickness of the connection plywood 31*a* and a thickness of the connection insulating material 32*a*.

The connection plywood 31*a* may be formed with a thickness of 6.5 mm to 15 mm.

The connection insulating material 32*a* may be made of polyurethane foam between the connection plywood 31*a* and the auxiliary barrier 42 of the secondary barrier 4 and may correspond to a thickness of 150 mm to 240 mm.

As described above, the primary insulating material 32 of the primary insulation wall 3 and the connection insulating material 32*a* of the connection insulation wall 3*a* may have the same thickness. However, since the connection insulating material 32*a* of the connection insulation wall 3*a* has the auxiliary barrier 42 additionally stacked thereon in addition to the main barrier 41 of the secondary barrier 4, the connection insulating material 32*a* of the connection insulation wall 3*a* may have a smaller thickness than the primary insulating material 32 as much as the thickness of the auxiliary barrier 42.

When the unit elements are disposed adjacent to each other, the connection insulation wall 3*a* is installed to serve to block the influence of external heat while sealing the spatial portion generated between the adjacent secondary insulation walls 5 together with the auxiliary barrier 42.

However, since the connection insulation wall 3*a* has a structure inserted and installed between the adjacent fixed insulation walls 3*b* constituting the unit element, the connection insulation wall 3*a* is inevitably vulnerable to protect the secondary barrier 4 under the connection insulation wall 3*a* from a cryogenic temperature. Therefore, a problem highly likely occurs in the secondary barrier 4 under the connection insulation wall 3*a* in which the main barrier 41 and the auxiliary barrier 42 overlap. Therefore, hereinafter, the connection insulation wall 3*a* will be mainly described.

The secondary barrier 4 may be installed between the primary insulation wall 3 including the insulation wall 3*a* and the secondary insulation wall 5 and may prevent the liquefied gas from leaking to the outside together with the primary barrier 2.

The secondary barrier 4 under the fixed insulation wall 3*b* may include the main barrier 41 as a single barrier, and the secondary barrier 4 under the connection insulation wall 3*a* may include the main barrier 41 connecting the unit elements and the auxiliary barrier 42 provided on the secondary insulation wall 5 constituting the unit element.

The main barrier 41 may be provided on the secondary insulation wall 5 constituting the unit element and formed with a thickness of 0.6 mm to 1.0 mm, and the auxiliary barrier 42 may be stacked on the adjacent main barriers 41, thereby achieving airtightness.

The auxiliary barrier 42 may be formed with a thickness of 0.6 mm to 1.0 mm as a component connecting the unit elements and stacked on the main barrier 41.

Meanwhile, referring to FIGS. 1 and 2, the secondary insulation wall 5 may be designed to withstand the external impact or the impact caused by the internal sloshing of the liquefied gas while blocking the influence of external heat together with the fixed insulation wall 3*b* and the connection insulation wall 3*a*. In addition, the secondary insulation wall 5 may be installed between the secondary barrier 4 and the hull 7 and may include a secondary insulating material 51 and a secondary plywood 52.

The secondary insulation wall 5 may have a structure in which the secondary insulating material 51 and the secondary plywood 52 are sequentially stacked outward from the secondary barrier 4 and may be formed so that a total of a thickness of the secondary insulating material 51 and a thickness and the secondary plywood 52 is in a range of 150 mm to 240 mm.

The secondary insulating material 51 may be made of a material having excellent insulation performance and mechanical strength to withstand the external impact or the impact caused by the internal sloshing of the liquefied gas while blocking the influence of external heat.

The secondary insulating material 51 may be made of polyurethane foam between the secondary barrier 4 and the secondary plywood 52 and formed with a thickness of 140 mm to 230 mm.

The secondary plywood 52 may be installed between the secondary insulating material 51 and the hull 7. For example, the secondary insulating material 51 may also be installed in contact with the secondary plywood 52. The secondary plywood 52 may be formed with a thickness of 6.5 mm to 25 mm.

As described above, the liquefied gas storage tank 1 according to the embodiment may be formed so that the primary insulation wall 3 has a thickness of 66% to 166% of the secondary insulation wall 5 and the connection insulation wall 3*a* included in the primary insulation wall 3 has a thickness of 67% to 167% of the secondary insulation wall 5 so that the connection insulation wall 3*a* has a thickness that is the same as or similar to that of the secondary insulation wall 5. In connection with this configuration, the connection insulating material 32*a* of the connection insulation wall 3*a* may be formed to have a thickness of 90% to 110% of the secondary insulating material 51 so that the connection insulating material 32*a* of the connection insulation wall 3*a* has a thickness that is the same as or similar to that of the secondary insulating material 51. In the embodiment, in the case of including the connection insulation wall 3*a*, the fixed insulation wall 3*b* constituting the unit element is not described in detail, but it should be noted that in the relationship with the secondary insulation wall 5, the fixed insulation wall 3*b* is also the same as or similar to the connection insulation wall 3*a*.

When the connection insulation wall 3*a* and the secondary insulation wall 5 or the connection insulating material 32*a* of the connection insulation wall 3*a* and the secondary insulating material 51 are formed at such a thickness ratio, an upper limit value of stress of the secondary barrier 4 at low temperature may correspond to 50 MPa or less under the connection insulation wall 3*a*. In addition, specifically, a stress value of the secondary barrier 4 at low temperature may be in a range of 40 MPa to 50 MPa under the connection insulation wall 3*a*. The value was obtained according to results of structural analysis to be described below.

In the embodiment, the connection insulation wall 3*a* and the secondary insulation wall 5 or the connection insulating material 32*a* of the primary insulation wall 3 and the secondary insulating material 51 are formed to have the thicknesses that are the same or similar, and this will be described with reference to FIGS. 4 to 20.

Figure 4A:
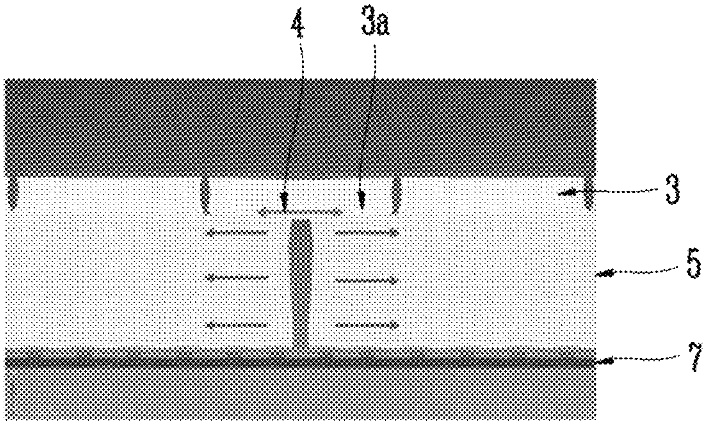
FIGS. 4A and 4B are views showing a tensile force of a secondary barrier depending on a change in thicknesses of a primary insulation wall and a secondary insulation wall.
Figure 4B:
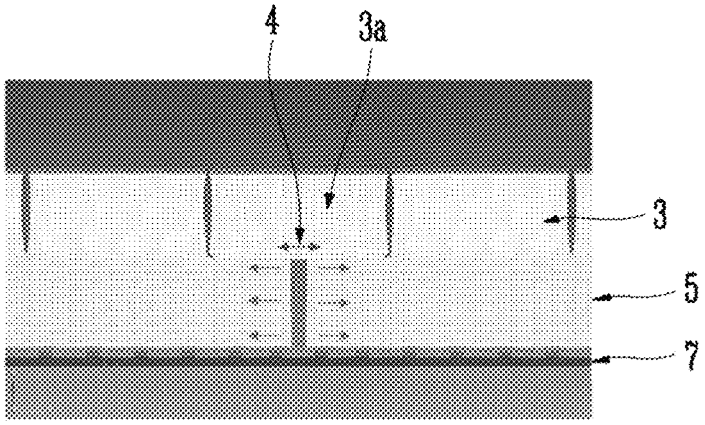

FIGS. 4A and 4B show a tensile force of the secondary barrier 4 under the connection insulation wall 3*a* depending on a change in the thicknesses of the connection insulation wall 3*a* included in the primary insulation wall 3 and the secondary insulation wall 5. In FIGS. 4A and 4B, it is assumed that the total thickness of the connection insulation wall 3*a*, the secondary barrier 4, and the secondary insulation wall 5 is the same.

Meanwhile, there is a difference in amounts of contraction of the secondary barrier 4 and the secondary insulation wall 5 depending on a temperature at which the secondary barrier 4 and the secondary insulation wall 5 are exposed, and the secondary barrier 4 and the secondary insulation wall 5 may be more affected by the cooling or heating of the cryogenic liquefied gas as the thickness of the connection insulation wall 3*a* is smaller. In addition, in this case, there is a problem that a risk of damage to the secondary barrier 4 increases because the temperatures of the secondary barrier 4 and the secondary insulation wall 5 are reduced and the amounts of contraction thereof are increased and thus the stress at low temperature increases. In particular, this problem may mainly occur in the auxiliary barrier 42 interconnecting the main barriers 41 provided in the adjacent unit elements under the connection insulation wall 3*a* by bonding or the like. Both ends of the auxiliary barrier 42 under the connection insulation wall 3*a* are connected to the main barrier 41 of each unit element, and this is because, as the secondary insulation wall 5 of the unit element contracts, the both ends of the auxiliary barrier 42 may be deformed by moving away from or being close to each other.

FIG. 4A shows a case in which the connection insulation wall 3*a* is formed to be relatively thinner than the secondary insulation wall 5 so that a height of the secondary barrier 4 is positioned upward from a center of the total thickness with respect to a thickness direction. In this case, as the thickness of the secondary insulation wall 5 is largely secured to reduce the mechanical stress applied to the secondary barrier 4 when the hull is structurally deformed due to a motion with six degrees of freedom of the hull 7, the thickness of the secondary insulation wall 5 may have a relatively greater thickness than the connection insulation wall 3*a*.

FIG. 4B shows a case in which the connection insulation wall 3*a* and the secondary insulation wall 5 are formed to have similar thicknesses so that the height of the secondary barrier 4 is positioned in a central region of the total thickness with respect to the thickness direction. Here, the central region may correspond to a range of 40% to 60% of the total thickness. In this case, compared to FIG. 4A, the amounts of contraction are reduced, and thus the stress at low temperature will be reduced. In addition, compared to FIG. 4A, the risk of damage to the secondary barrier will be relatively reduced.

In the present invention, the liquefied gas storage tank 1 is derived to reduce the low-temperature load and sloshing load of the secondary barrier 4 while maintaining the mechanical strength of the secondary insulation wall 5 at the predetermined level, which will be understood by the following description with reference to FIGS. 5 to 20.

FIGS. 5 to 20 are views showing results of the performance of a structural analysis while varying the thicknesses of the connection insulation wall 3*a* and the secondary insulation wall 5 in each of a first case (see FIGS. 5 to 8), a second case (see FIGS. 9 to 12), a third case (see FIGS. 13 to 16), and a fourth case (see FIGS. 17 to 20) in order to derive the thicknesses of the primary insulation wall 3 including the connection insulation wall 3*a* and the secondary insulation wall 5 of the liquefied gas storage tank 1 according to the embodiment. In the embodiment, the thickness of the connection insulation wall 3*a* is mainly described, but it should be noted that the thickness of the primary insulation wall 3 is also the same as or similar to that of the connection insulation wall 3*a*.

In performing the structural analysis on each case, analysis conditions are as follows.

First, the total thickness of the connection insulation wall 3*a* and the secondary insulation wall 5 in the first to fourth cases, which are analytical models, was identically formed with 400 mm.

Second, only a position of the secondary barrier 4 was changed by varying the thickness of each of the connection insulation wall 3*a* and the secondary insulation wall 5.

Third, considering the same linear temperature distribution condition, a temperature at the position of the primary barrier 2 was set to −163° C., which is a temperature of the liquefied gas, and a temperature at the position of the hull 7 was set to 20° C., which is room temperature.

Fourth, a minimum value and a maximum value of the stress value were fixed, and a difference in stress is indicated by colors, for example, red indicated the greatest stress value, and as the color went to blue, this indicated a smaller stress value.

Fifth, the thickness ratio was a ratio of the thickness of the connection insulation wall 3*a* to the total thickness (400 mm).

The structural analyses of the first to fourth cases, which are analysis models, were performed under the analysis conditions.

FIGS. 5 to 8 are views showing results of the performance of the structural analysis while varying the thicknesses of the connection insulation wall 3*a* and the secondary insulation wall 5 in the first case in order to derive the thicknesses of the connection insulation wall 3*a* included in the primary insulation wall 3 and the secondary insulation wall 5 of the liquefied gas storage tank 1 according to the first embodiment of the present invention.

Figure 5:
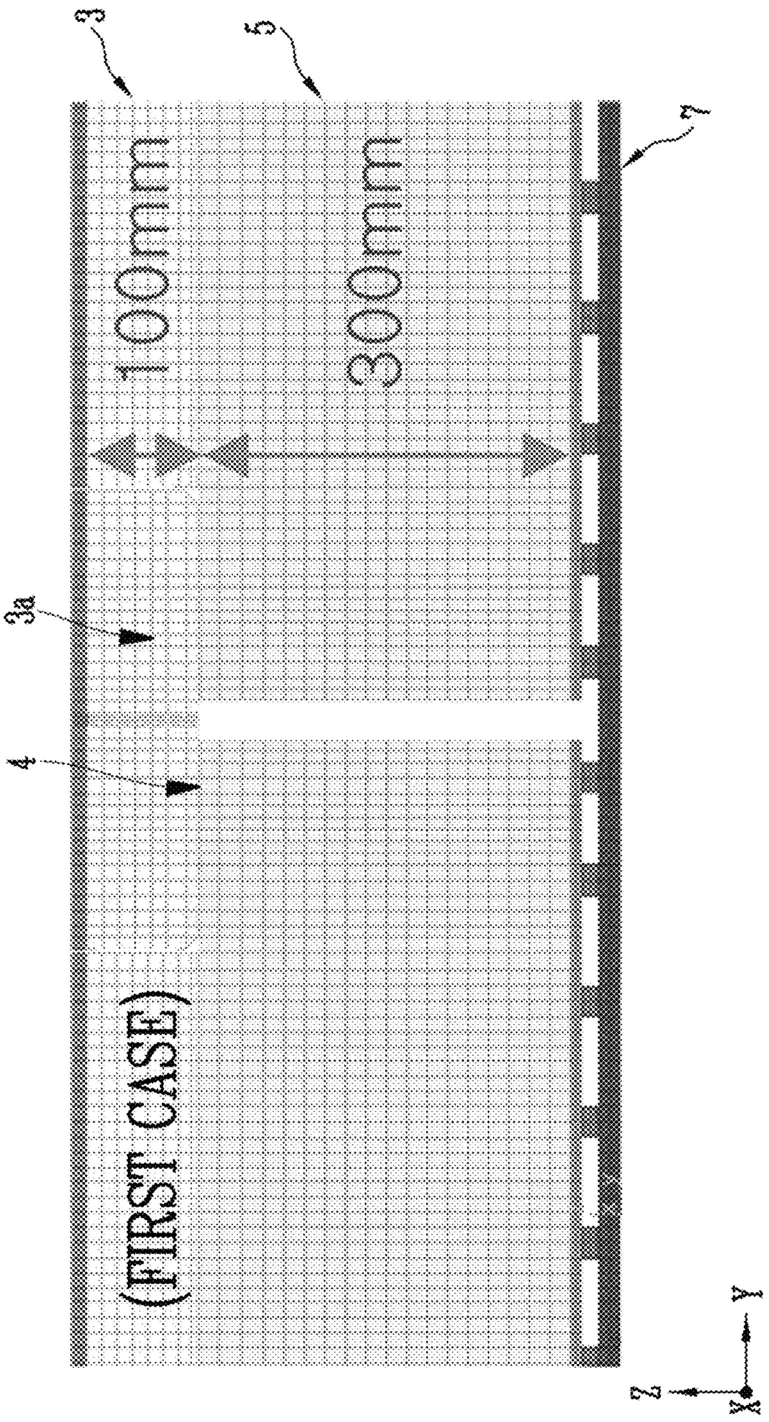
FIGS. 5 to 8 are views showing results of the performance of a structural analysis while varying the thicknesses of the primary insulation wall and the secondary insulation wall in a first case in order to derive the thicknesses of the primary insulation wall and the secondary insulation wall of the liquefied gas storage tank according to the first embodiment of the present invention.

As shown in FIG. 5, the first case is a case in which the thickness of the connection insulation wall 3*a* is 100 mm and the thickness of the secondary insulation wall 5 is 300 mm. In other words, in the first case, a ratio of the thickness of the connection insulation wall 3*a* to the total thickness (400 mm) of the connection insulation wall 3*a* and the secondary insulation wall 5 is 0.25, and the secondary barrier 4 is positioned close to the primary barrier 2, which is positioned at the top, from the center of the total thickness of the connection insulation wall 3*a* and the secondary insulation wall 5.

Figure 6:
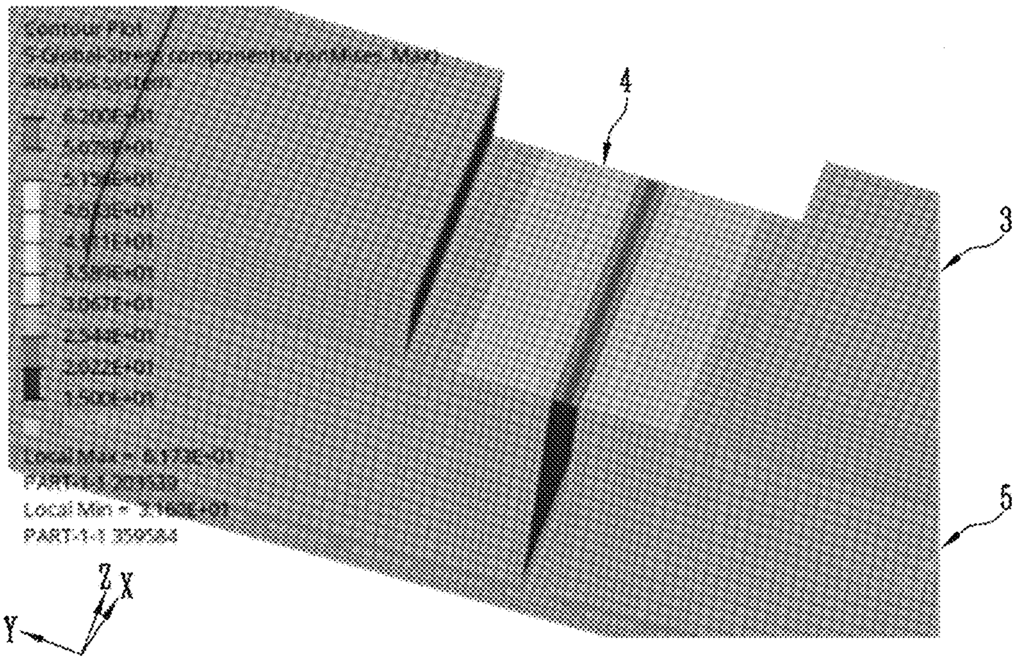
Figure 7:
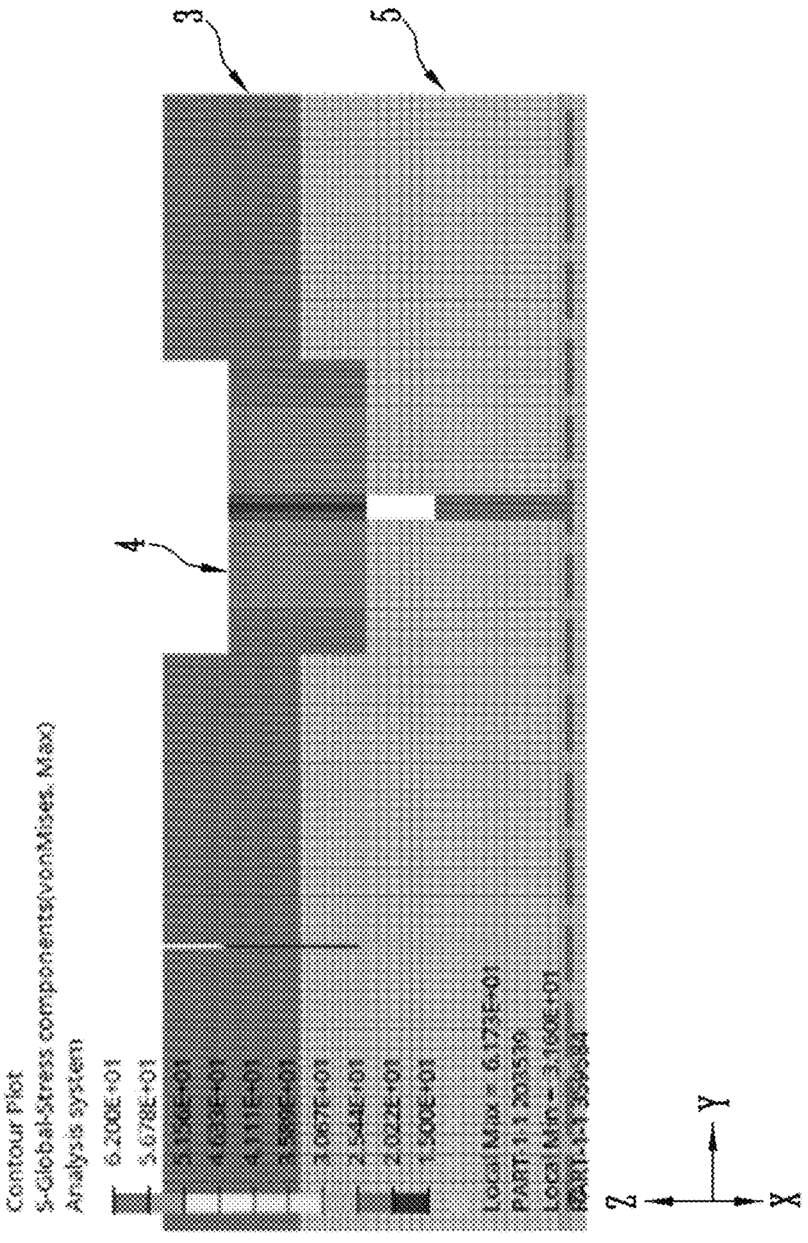
Figure 8:
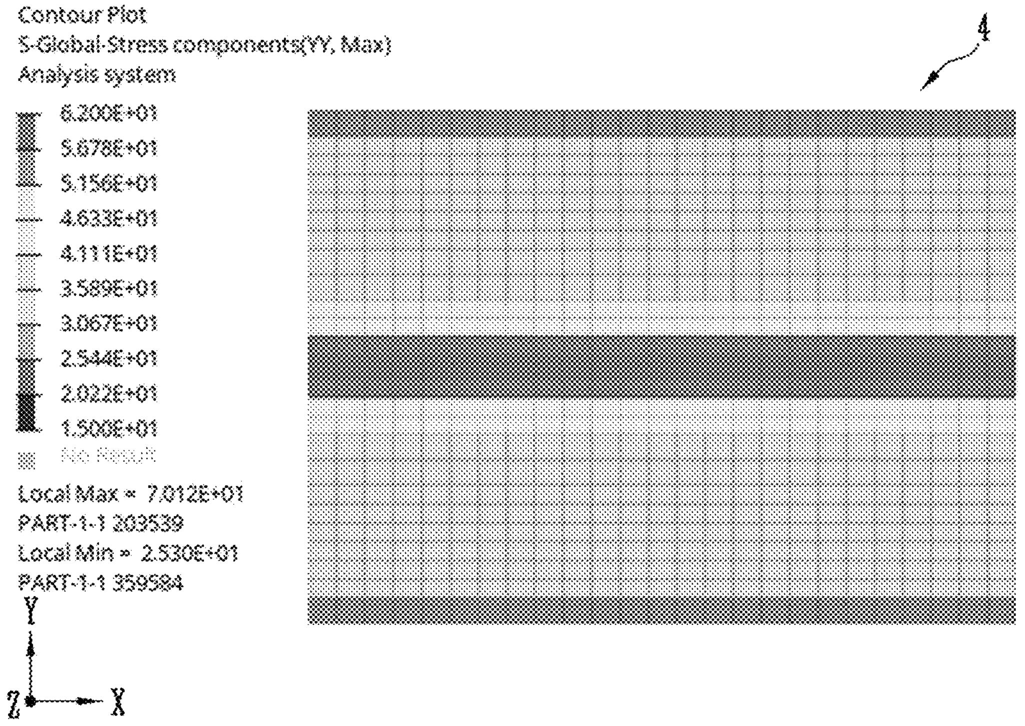

In the first case, as shown in FIGS. 6 to 8, as a result of the structural analysis, in a state in which the unit elements were disposed adjacent to each other, the secondary barrier 4 corresponding to a space between the adjacent secondary insulation walls 5 appeared in red-based color, and a stress value thereof was calculated as 70.12 MPa.

The reason why stress is generated in the secondary barrier 4 in the first case can be seen through FIG. 4. In other words, this is because, as the thickness of the connection insulation wall 3*a* is smaller, the secondary barrier 4 is more affected by the cooling or heating of the liquefied gas.

FIGS. 9 to 12 are views showing results of the performance of the structural analysis while varying the thicknesses of the connection insulation wall 3*a* and the secondary insulation wall 5 in the second case in order to derive the thicknesses of the connection insulation wall 3*a* included in the primary insulation wall 3 and the secondary insulation wall 5 of the liquefied gas storage tank according to the first embodiment of the present invention.

Figure 9:
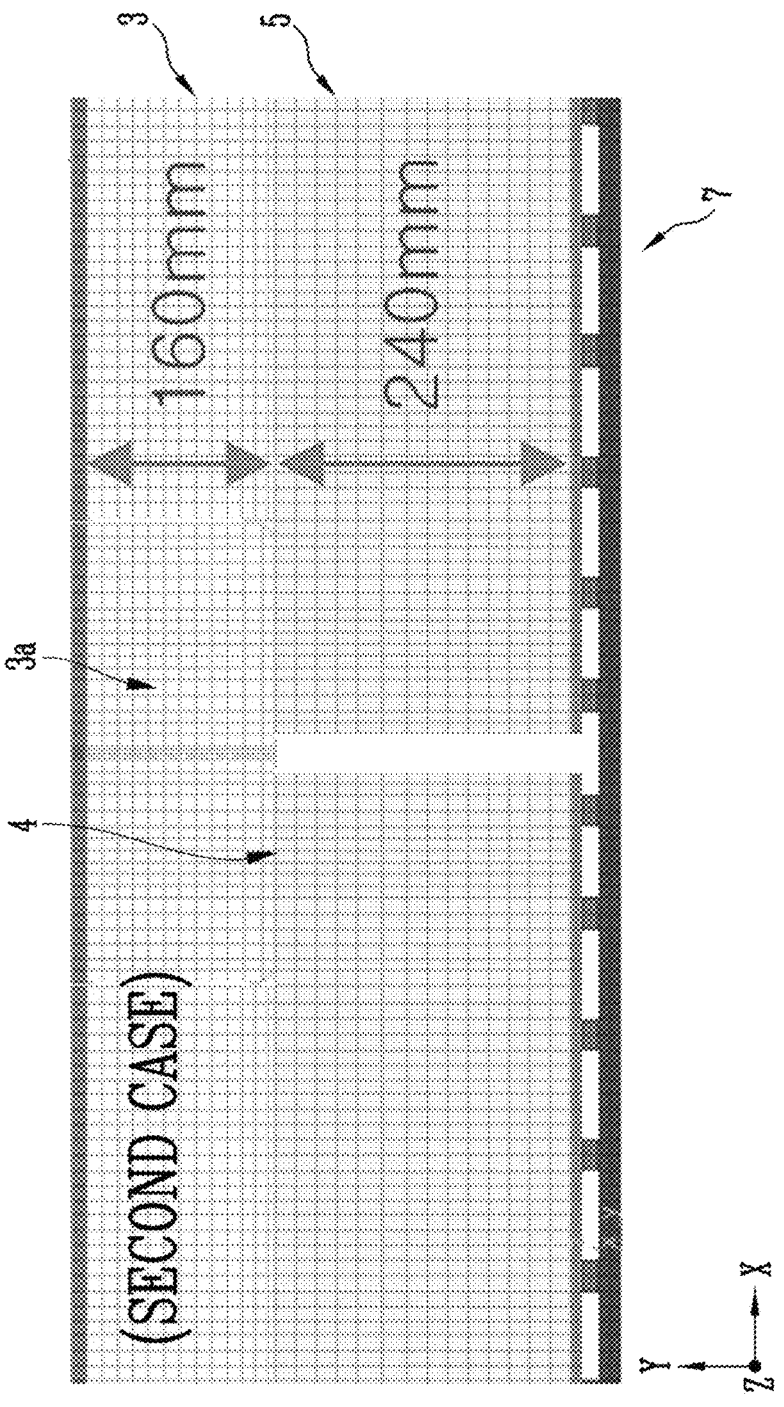
FIGS. 9 to 12 are views showing results of the performance of a structural analysis while varying the thicknesses of the primary insulation wall and the secondary insulation wall in a second case in order to derive the thicknesses of the primary insulation wall and the secondary insulation wall of the liquefied gas storage tank according to the first embodiment of the present invention.

As shown in FIG. 9, the second case was a case in which the thickness of the connection insulation wall 3*a* was 160 mm and the thickness of the secondary insulation wall 5 was 240 mm. In other words, in the second case, the ratio of the thickness of the connection insulation wall 3*a* to the total thickness (400 mm) of the connection insulation wall 3*a* and the secondary insulation wall 5 was 0.4, and the secondary barrier 4 was positioned to be slightly tilted to the primary barrier 2 from the center of the total thickness of the connection insulation wall 3*a* and the secondary insulation wall 5.

Figure 10:
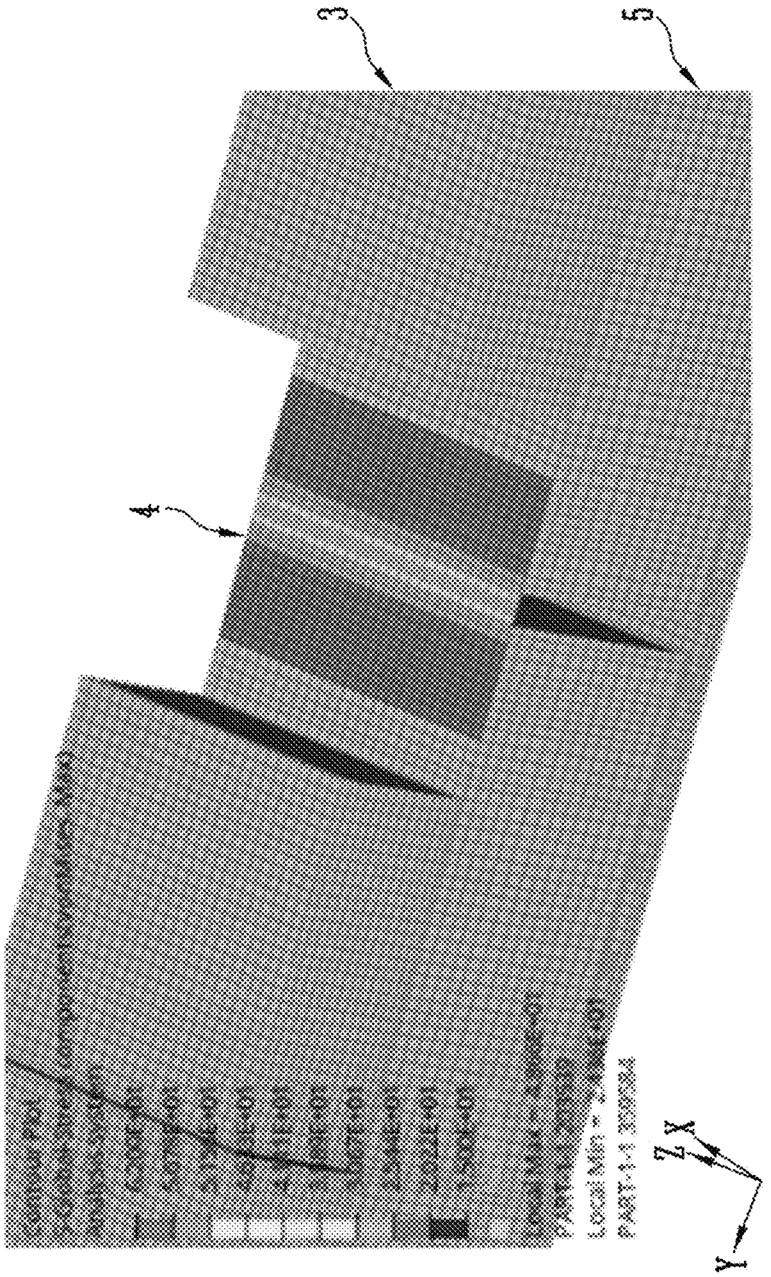
Figure 11:
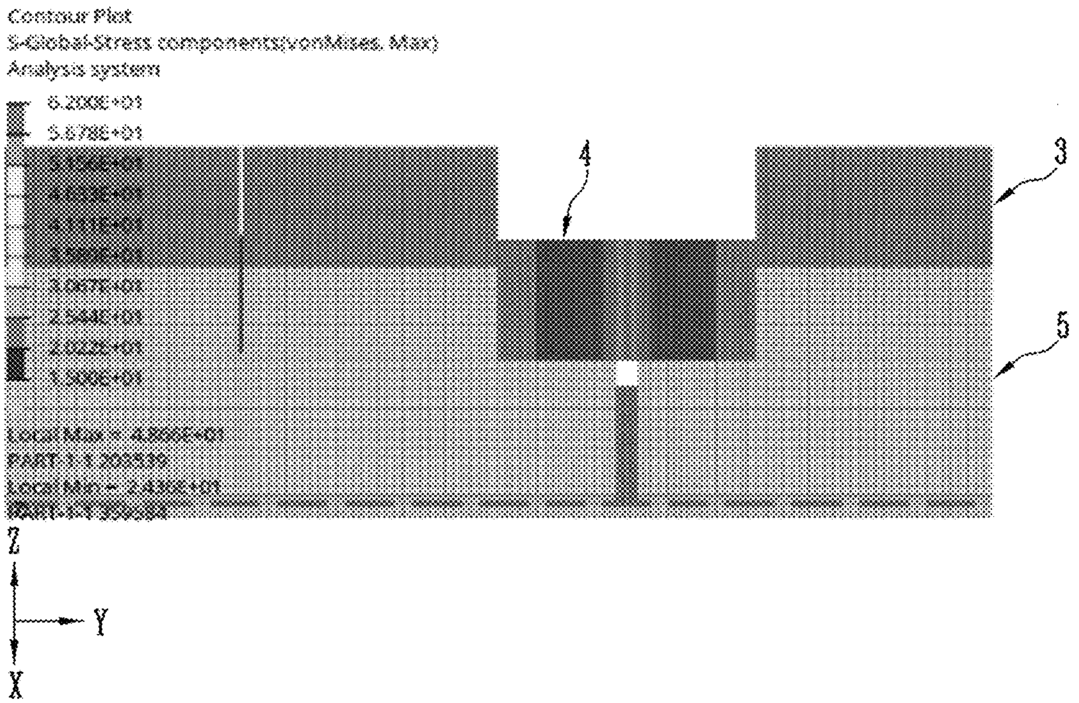
Figure 12:
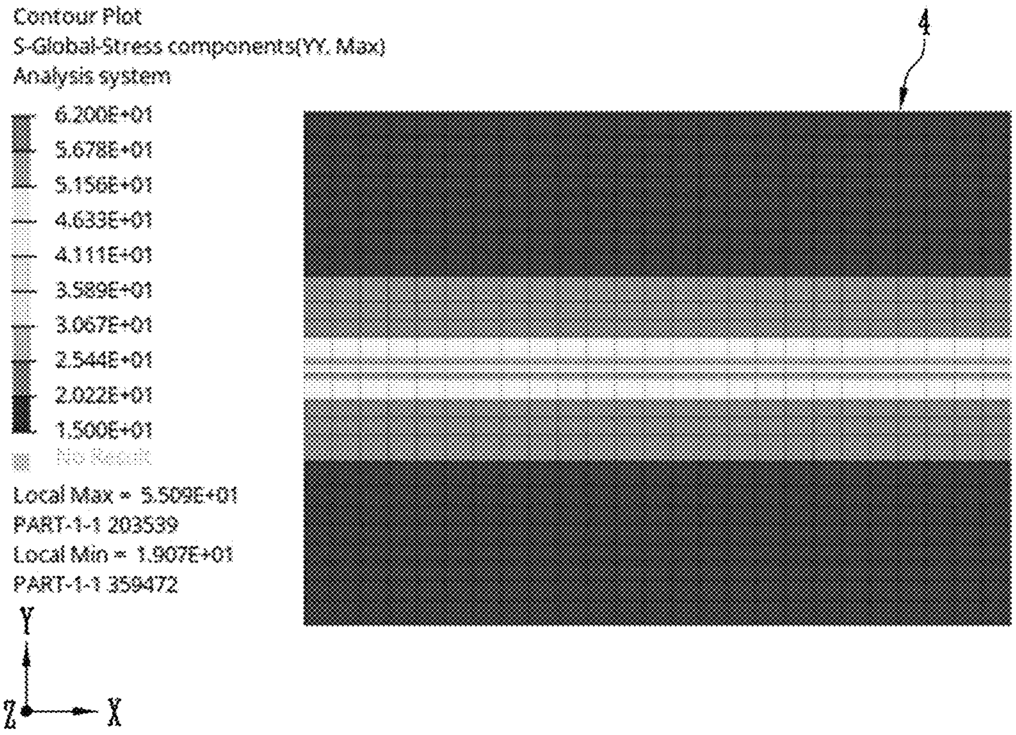

In the second case, as shown in FIGS. 10 to 12, as a result of the structural analysis, in a state in which the unit elements were disposed adjacent to each other, the secondary barrier 4 corresponding to the space between the adjacent secondary insulation walls 5 appeared in yellow-based color, and a stress value thereof was calculated as 55.09 MPa.

FIGS. 13 to 16 are views showing results of the performance of the structural analysis while varying the thicknesses of the connection insulation wall 3*a* and the secondary insulation wall 5 in the third case in order to derive the thicknesses of the connection insulation wall 3*a* included in the primary insulation wall 3 and the secondary insulation wall 5 of the liquefied gas storage tank according to the first embodiment of the present invention.

Figure 13:
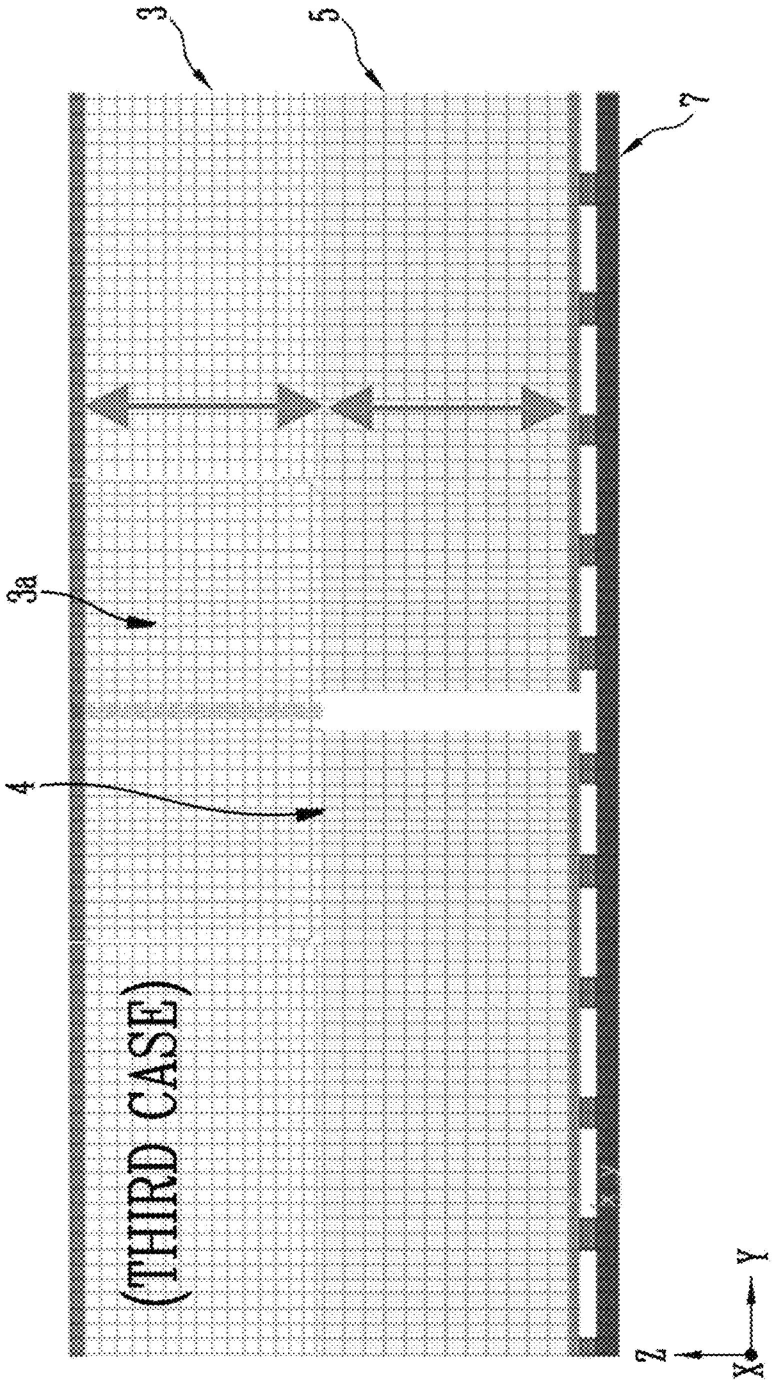
FIGS. 13 to 16 are views showing results of the performance of a structural analysis while varying the thicknesses of the primary insulation wall and the secondary insulation wall in a third case in order to derive the thicknesses of the primary insulation wall and the secondary insulation wall of the liquefied gas storage tank according to the first embodiment of the present invention.

As shown in FIG. 13, the third case was a case in which the connection insulation wall 3*a* and the secondary insulation wall 5 were formed to have the thicknesses that are the same or similar. In other words, in the third case, the ratio of the thickness of the connection insulation wall 3*a* to the total thickness (400 mm) of the connection insulation wall 3*a* and the secondary insulation wall 5 was about 0.5, and the secondary barrier 4 was positioned adjacent to the center of the total thickness of the connection insulation wall 3*a* and the secondary insulation wall 5.

Figure 14:
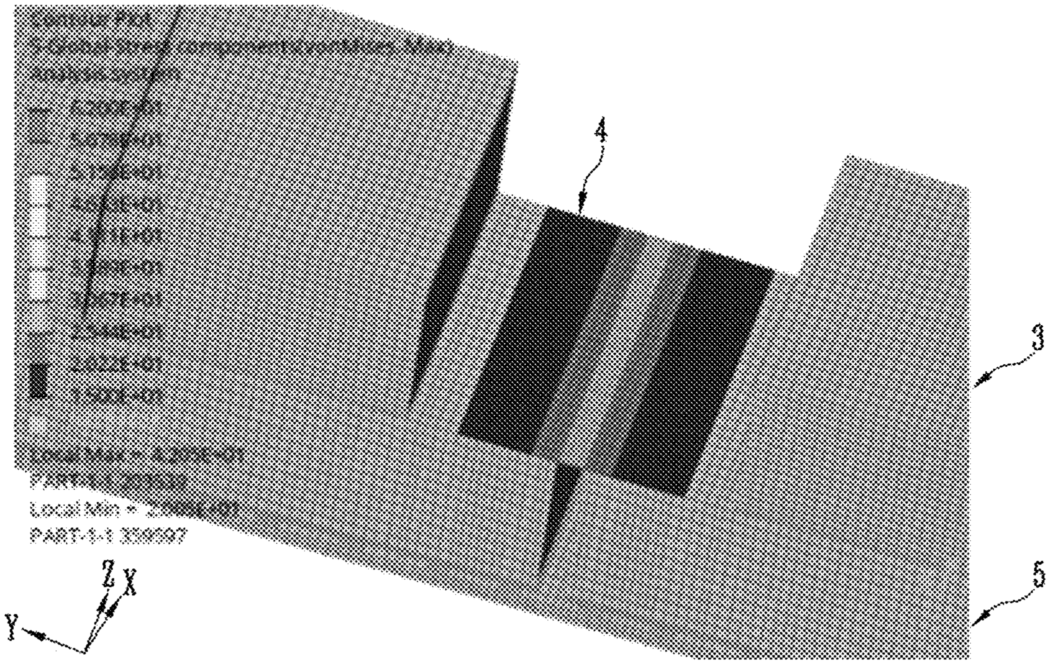
Figure 15:
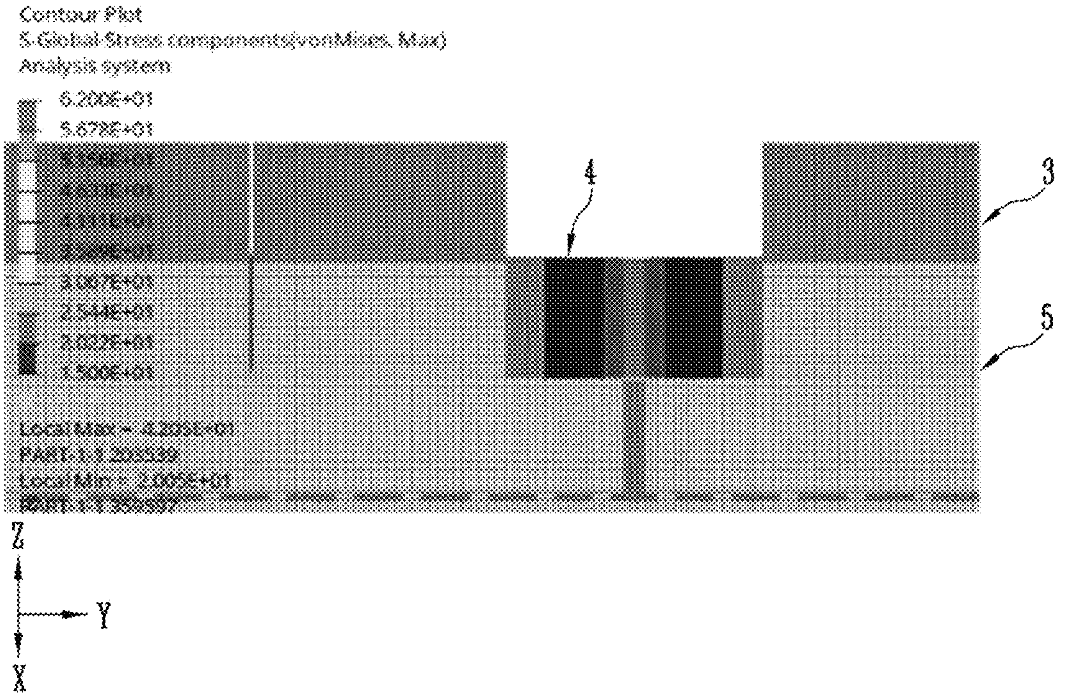
Figure 16:
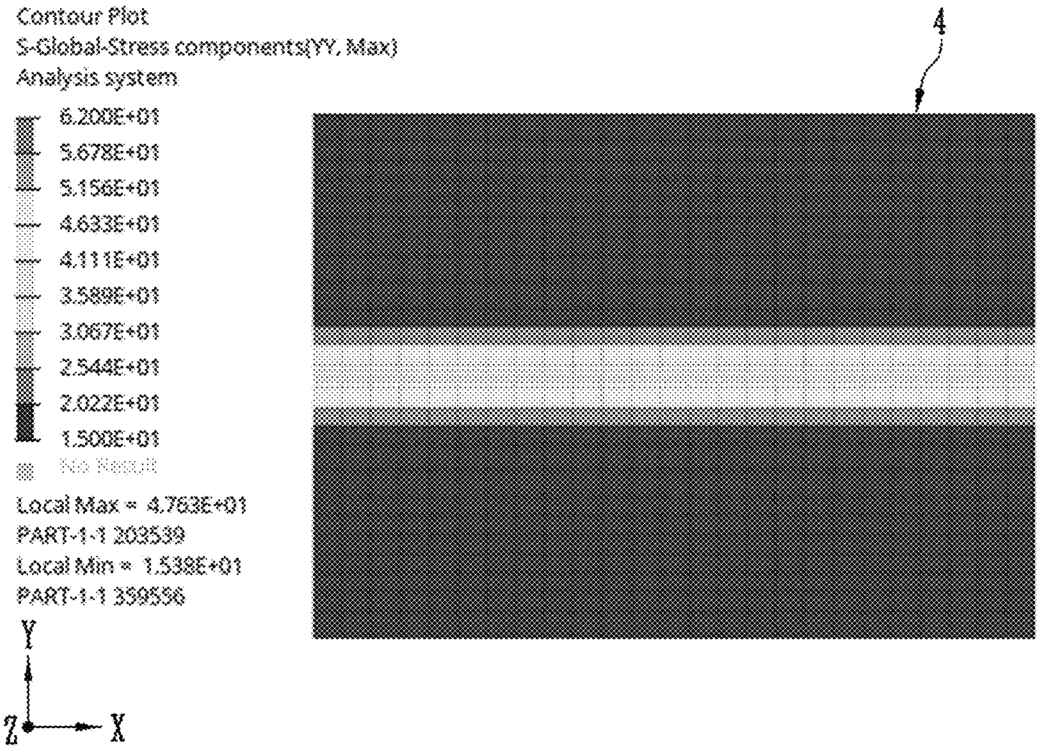

In the third case, as shown in FIGS. 14 to 16, as a result of the structural analysis, in a state in which the unit elements were disposed adjacent to each other, the secondary barrier 4 corresponding to the space between the adjacent secondary insulation walls 5 appeared in bright sky blue-based color, and a stress value thereof was calculated as 47.63 MPa.

FIGS. 17 to 20 are views showing results of the performance of the structural analysis while varying the thicknesses of the connection insulation wall 3*a* and the secondary insulation wall 5 in the fourth case in order to derive the thicknesses of the connection insulation wall 3*a* included in the primary insulation wall 3 and the secondary insulation wall 5 of the liquefied gas storage tank according to the first embodiment of the present invention.

Figure 17:
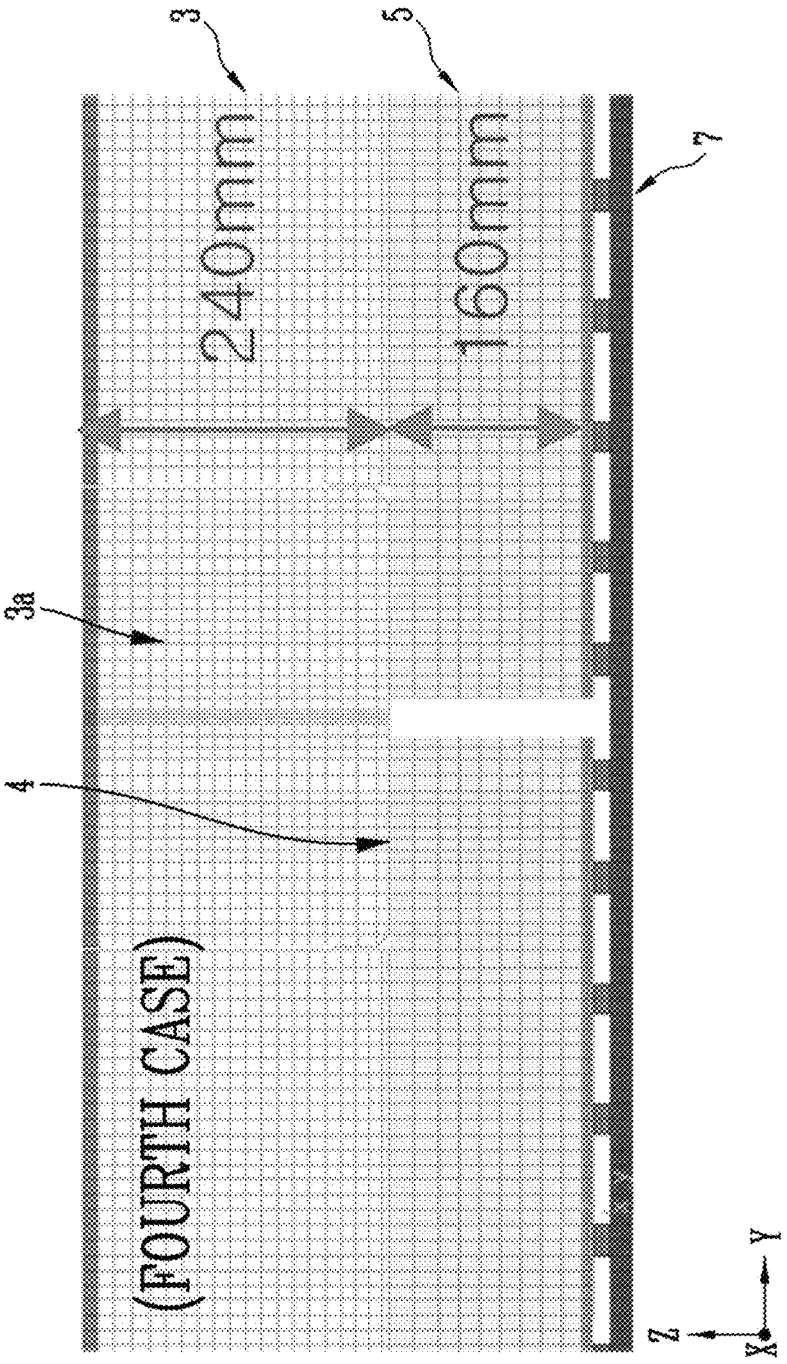
FIGS. 17 to 20 are views showing results of the performance of a structural analysis while varying the thicknesses of the primary insulation wall and the secondary insulation wall in a fourth case in order to derive the thicknesses of the primary insulation wall and the secondary insulation wall of the liquefied gas storage tank according to the first embodiment of the present invention.

As shown in FIG. 17, the fourth case is a case in which the thickness of the connection insulation wall 3*a* was 240 mm, and the thickness of the secondary insulation wall 5 was 160 mm. In other words, in the fourth case, the ratio of the thickness of the connection insulation wall 3*a* to the total thickness (400 mm) of the connection insulation wall 3*a* and the secondary insulation wall 5 was about 0.6, and the secondary barrier 4 was positioned downward from the center of the total thickness of the connection insulation wall 3*a* and the secondary insulation wall 5.

Figure 18:
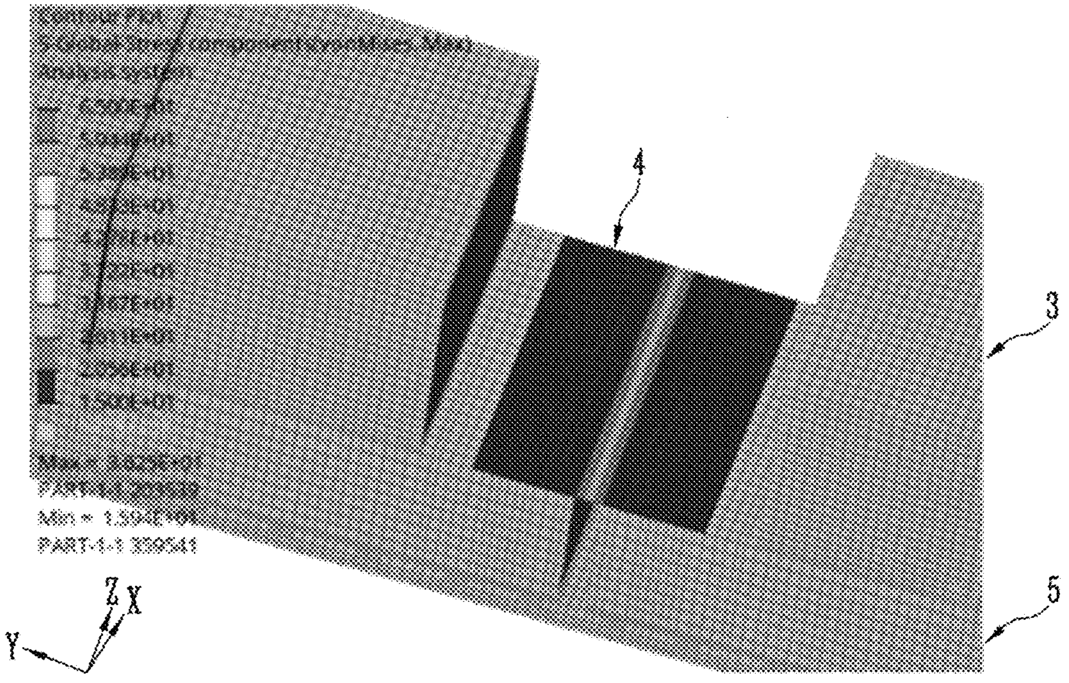
Figure 19:
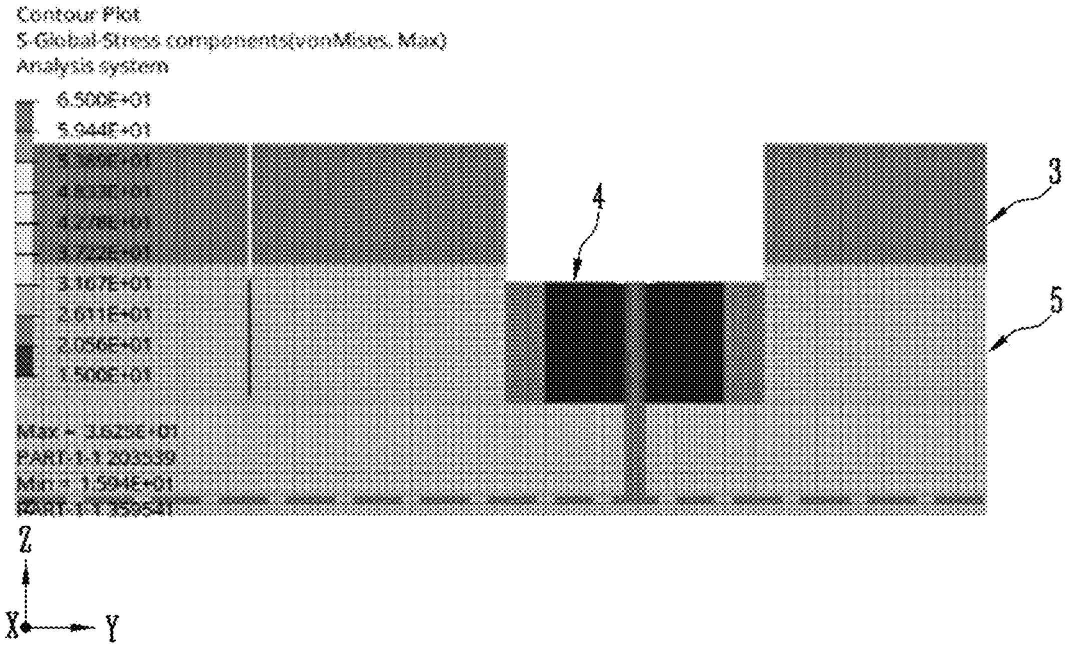
Figure 20:
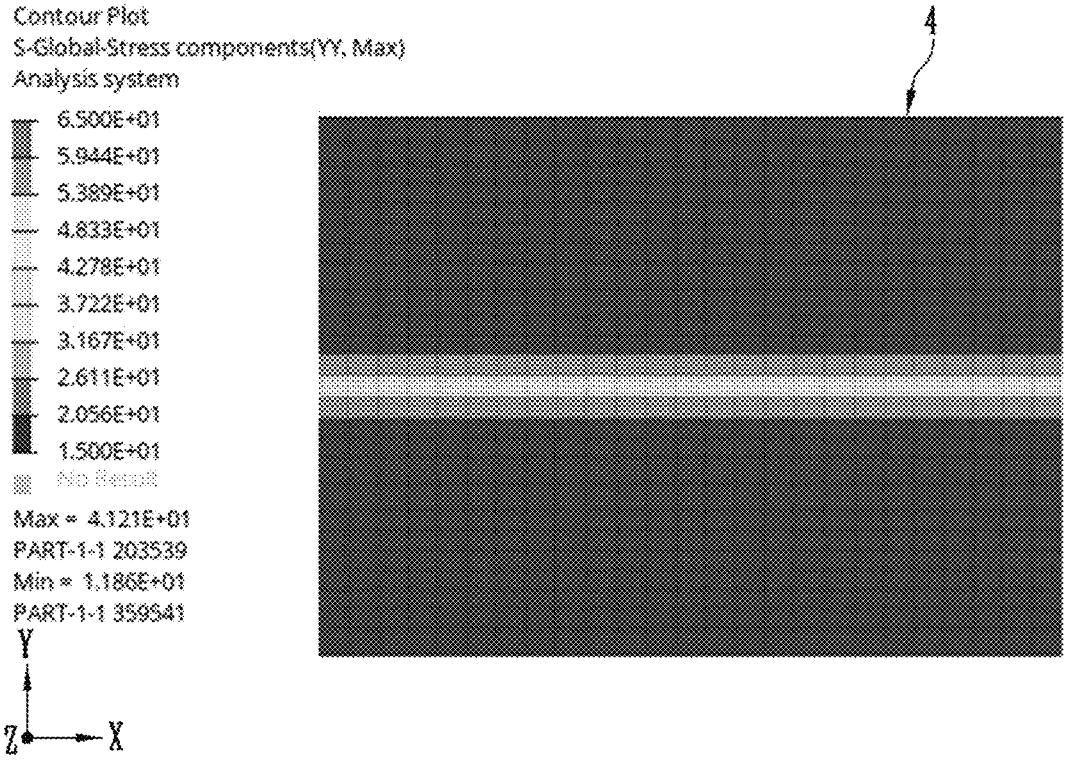

In the fourth case, as shown in FIGS. 18 to 20, as a result of the structural analysis, in a state in which the unit elements were disposed adjacent to each other, the secondary barrier 4 corresponding to the space between the adjacent secondary insulation walls 5 appeared in sky blue-based color, and a stress value was calculated as 41.21 MPa.

As described above, as a result of the structural analysis of each of the first to fourth cases, it can be seen that the low-temperatures stress due to heat contraction tends to be reduced in the secondary barrier 4 under the connection insulation wall 3*a* as the secondary barrier 4 moves away from the primary barrier 2. This will be described with reference to FIG. 21.

Figure 21:
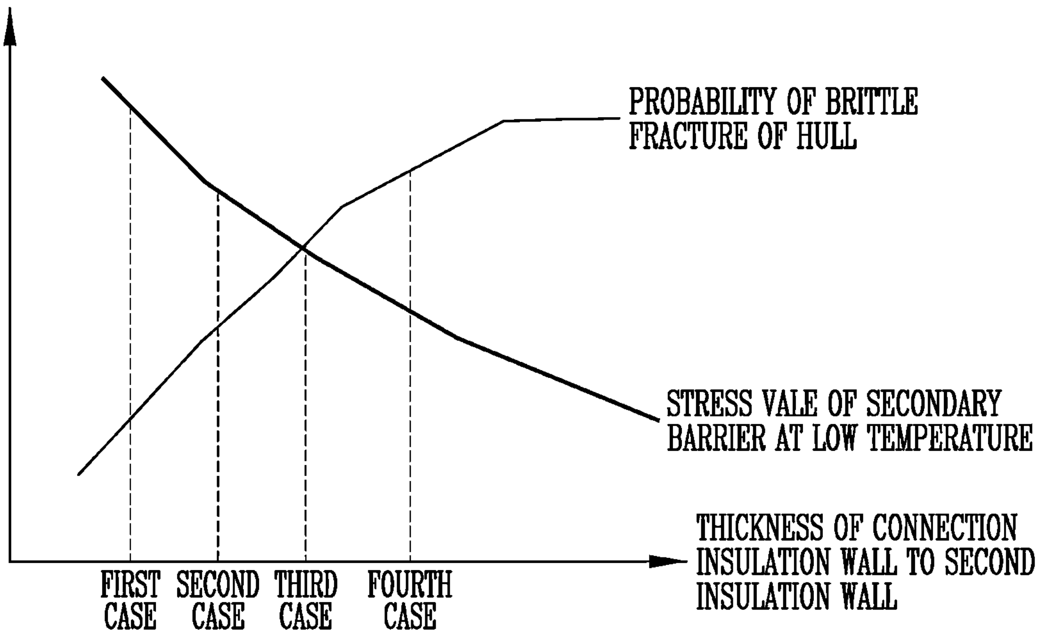
FIG. 21 is a graph showing a low-temperature stress of the secondary barrier and a probability of brittle fracture of a hull depending on the change in the thicknesses of the primary insulation wall and the secondary insulation wall.

FIG. 21 is a graph showing the relationship between a low-temperature stress of the secondary barrier and a probability of brittle fracture of a hull depending on the change in the thicknesses of the primary insulation wall and the secondary insulation wall.

As shown in the graph shown in FIG. 21, in addition to the first case to the fourth case, it can be predicted that the stress value due to the heat contraction at low temperature is more reduced in the secondary barrier 4 under the connection insulation wall 3*a* as the secondary barrier 4 further moves away from the primary barrier 2. In other words, it can be seen that since the secondary barrier 4 under the connection insulation wall 3*a* has a relatively higher temperature than when the secondary barrier 4 is closer to the primary barrier 2 as the secondary barrier 4 moves away from the primary barrier 2, the contraction is reduced and thus the stress is reduced. In the embodiment, the secondary barrier 4 under the connection insulation wall 3*a* is mainly described, but it will be apparent that the stress is also reduced in the secondary barrier 4 under the fixed insulation wall 3*b* constituting the unit element as the secondary barrier 4 moves away from the primary barrier 2. The secondary barrier 4 under the connection insulation wall 3*a* is in a state in which the main barrier 41 and the auxiliary barrier 42 are stacked, and the secondary barrier 4 under the primary insulation wall 3 is formed of only the main barrier 41.

In the liquefied gas storage tank 1 in the embodiment derived as described above, as the thickness of the connection insulation wall 3*a* from the total thickness of the connection insulation wall 3*a* and the secondary insulation wall 5 increases, the temperature received by the secondary barrier 4 is increased (influence by the cooling or the heating from the cryogenic liquefied gas is reduced). Therefore, it is possible to reduce the contraction of the secondary barrier 4 itself caused by the cooling or the heating and reduce the stress caused by the cooling or the heating, thereby preventing damage to the secondary barrier 4 caused by the cooling or the heating. It goes without saying that this principle is also applied to the secondary barrier 4 under the primary insulation wall 3 defined as including the connection insulation wall 3*a*.

In addition, as the thicknesses of the connection insulation wall 3*a* and the fixed insulation wall 3*b* increase (the thickness of the secondary insulation wall 5 is relatively reduced), a sloshing load and a hydrodynamic load transmitted to the secondary barrier 4 may be reduced, and the stress due to sloshing may be reduced, thereby preventing the damage to the secondary barrier 4 due to the sloshing. In addition, as the thickness of the secondary insulation wall 5 is smaller (the thickness of the primary insulation wall 3 is relatively larger), it may be easier to level the secondary barrier 4.

In addition, the thickness of the secondary insulation wall 5 may be relatively reduced as the thicknesses of the connection insulation wall 3*a* and the fixed insulation wall 3*b* increase, a contraction caused by the cooling or the heating of the secondary insulation wall 5 may also be reduced as the secondary insulation wall 5 relatively moves away from the primary barrier 2, and the tensile force of the secondary barrier 4 may be reduced as the contraction of the secondary insulation wall 5 is reduced, thereby preventing the damage to the secondary barrier 4 due to the contraction of the secondary insulation wall 5.

Considering the low-temperature stress of the secondary barrier 4, in the present invention, the connection insulation wall 3*a* may be disposed to correspond to 40% or more of the total thickness of the connection insulation wall 3*a* and the secondary insulation wall 5. Preferably, in the liquefied gas storage tank 1 according to the present invention, the connection insulation wall 3*a* may be disposed in the ranges in the second case to the fourth case, that is, disposed to correspond to a range of 40% to 60% of the total thickness of the connection insulation wall 3*a* and the secondary insulation wall 5. More preferably, in the liquefied gas storage tank 1 according to the present invention, the connection insulation wall 3*a* may be disposed in the range in the third case, that is, disposed to correspond to a range of 47% to 53% of the total thickness of the connection insulation wall 3*a* and the secondary insulation wall 5.

However, when the thicknesses of the connection insulation wall 3*a* and the primary insulation wall 3 are increased, since the thickness of the secondary insulation wall 5 is relatively reduced, the secondary insulation wall 5 is inevitably vulnerable to the mechanical stress applied when the hull 7 is structurally deformed by the motion with six degrees of freedom of the hull 7, and thus a level of the mechanical stress transmitted to the secondary barrier 4 through the secondary insulation wall 5 is inevitably increased.

In addition, in a state in which the liquefied gas is loaded, an emergency condition, such as breakage of the primary barrier 2, may occur. In this case, since the primary barrier 2 can no longer prevent the leakage of the liquefied gas, the liquefied gas may be in contact with the secondary barrier 4. In addition, when the secondary barrier 4 is in contact with the cryogenic liquefied gas, the temperature of the hull may be reduced, thereby increasing the probability of brittle fracture. In addition, as the temperature is reduced, a material strength of the hull increases but a brittle problem may occur, thereby increasing the probability of brittle fracture. Here, the brittle fracture may correspond to sudden fracture that occurs with almost no plastic deformation and may also be understood as brittle crack.

In this regard, referring to FIG. 21, in the emergency condition, the secondary barrier 4 in contact with the cryogenic liquefied gas may be closer to the hull as the corresponding case moves from the first case to the fourth case, thereby increasing the probability of brittle fracture. In other words, in FIG. 21, the probability of brittle fracture of the hull further increases as the corresponding case moves from the first case to the fourth case, that is, as the thickness of the connection insulation wall is greater than the thickness of the secondary insulation wall 5. In addition, when the thickness of the connection insulation wall 3*a* in the fourth case further increases, the probability of brittle fracture is close to 1, and the hull may crack or destruct.

Therefore, an insulation system of the liquefied gas storage tank 1 needs to be disposed in consideration of not only the above-described low-temperature stress but also the risk of crack or destruction of the hull. In the present invention, the second case to the fourth case in which the secondary barrier 4 is positioned in the central region of the total thickness of the connection insulation wall 3*a* and the secondary insulation wall 5 may be appropriate considering all aspects of the low-temperature stress and the crack of the hull. Preferably, the third case can be considered appropriate considering the mechanical aspects of the low-temperature stress and the crack of the hull.

Therefore, in the present invention, the second case to the fourth case in which the thicknesses of the connection insulation wall 3*a* and the primary insulation wall 3 may be sufficiently secured, thereby reducing the low-temperature stress of the secondary barrier 4 and the thickness of the secondary barrier 4 may be appropriately provided to have an interval between the hull 7 and the secondary barrier 4, thereby reducing the load on the structural stress transmitted from the hull 7 by the secondary barrier 4 can be considered appropriate embodiments. In addition, the third case among the second case to the fourth case will correspond to a preferred embodiment considering all aspects of the low-temperature stress and the mechanical strength.

Meanwhile, the secondary barrier 4 may be made of any of various materials, and this will be described with reference to FIGS. 22 to 24.

Figure 22:
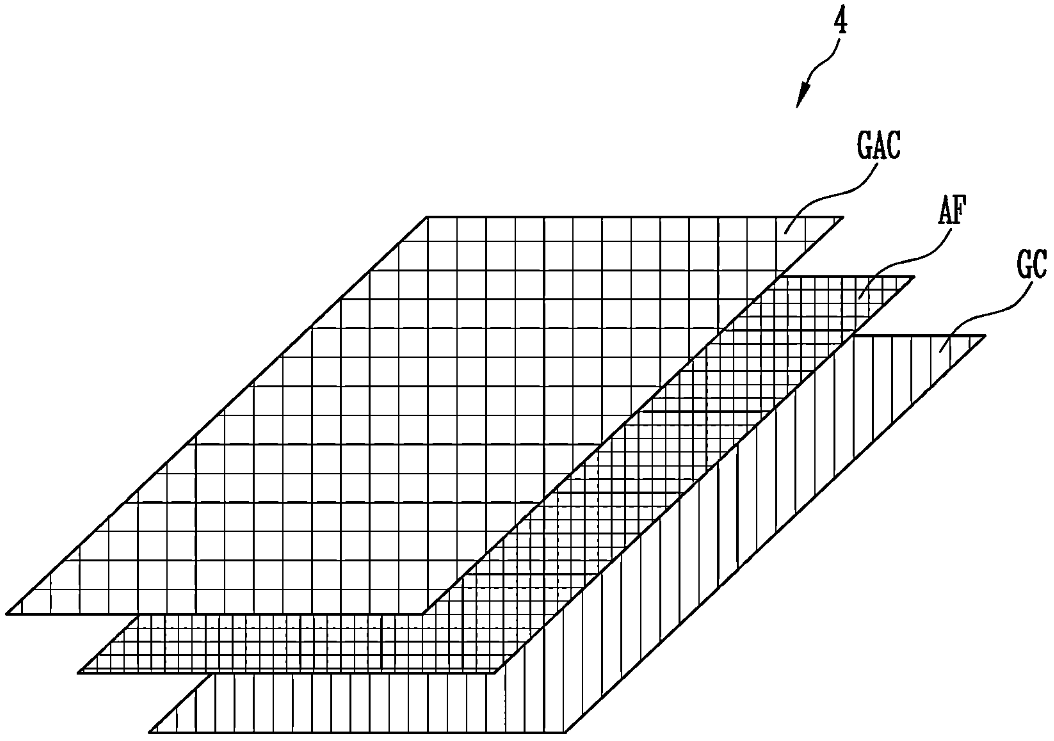
FIGS. 22, 23, and 24 are views showing various configurations of the secondary barrier of the liquefied gas storage tank according to the first embodiment of the present invention.
Figure 23:
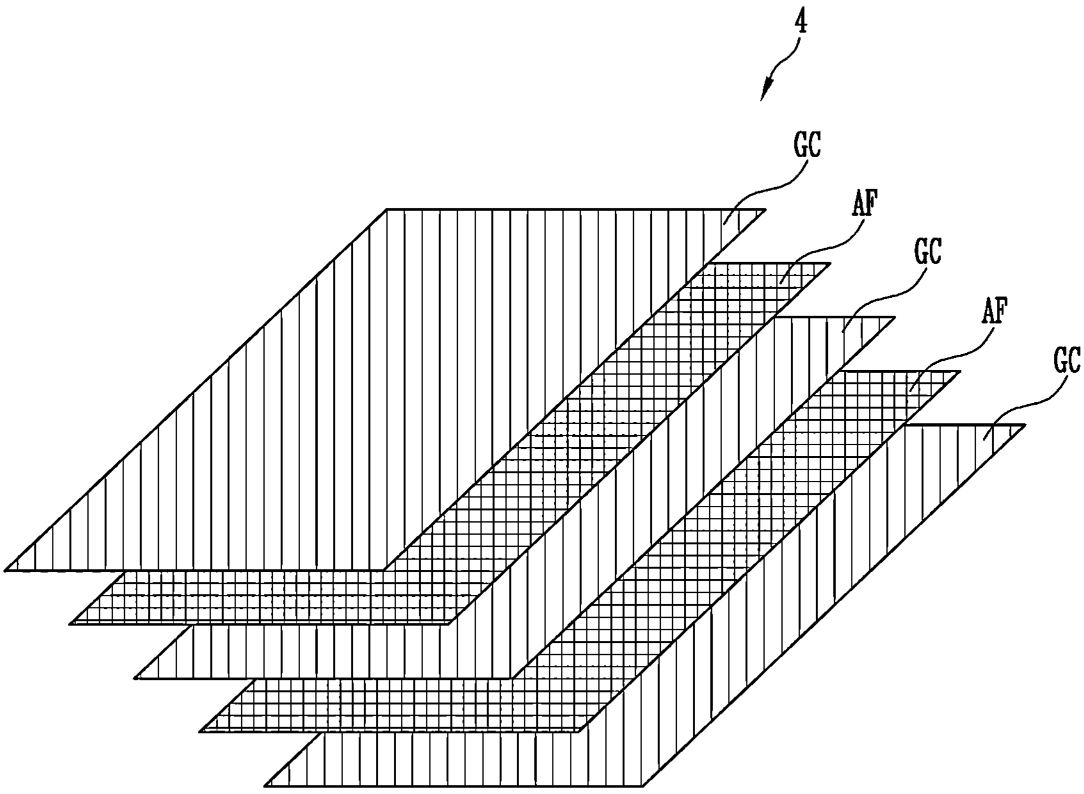
Figure 24:
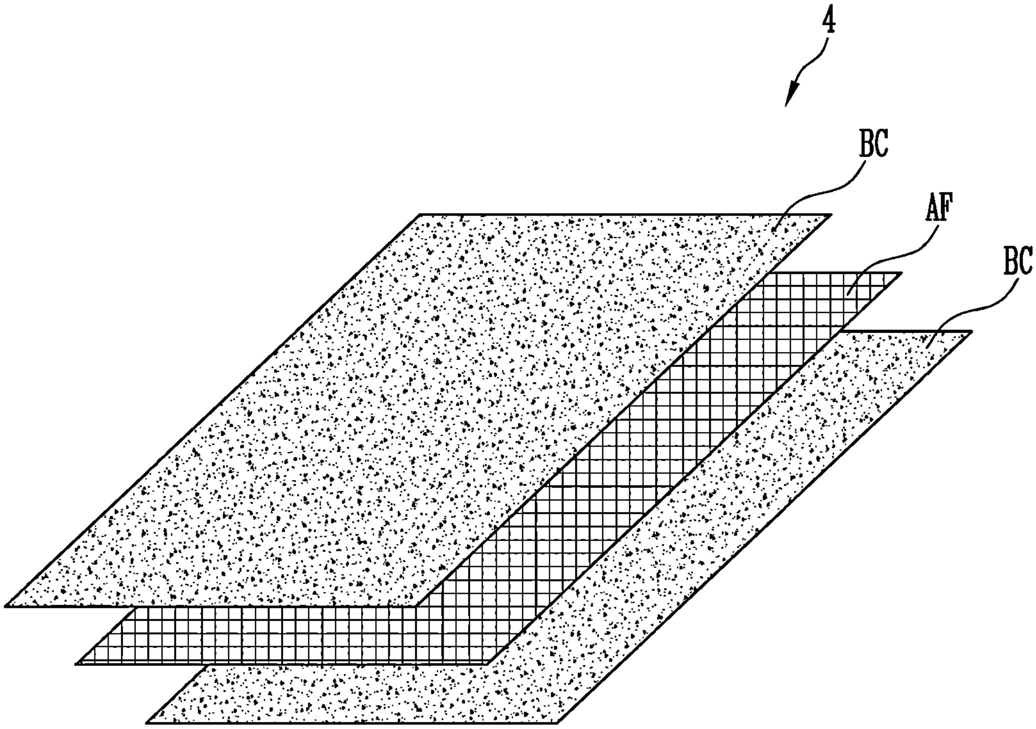

FIGS. 22, 23, and 24 are views showing various configurations of the secondary barrier of the liquefied gas storage tank according to the first embodiment of the present invention.

As shown in FIG. 22, the secondary barrier 4 may be made of a first material having a three-layer structure of stacked glass cloth (GC)/aluminum foil (AF)/glass-aramid cloth (GAC).

The GAC may be obtained by applying an aramid material to glass cloth and manufactured by mixing one line of aramid per two lines of glass fibers.

The first material may be applied to the auxiliary barrier 42 of the secondary barrier 4 and is not limited thereto, and it goes without saying that the first material may also be applied to the main barrier 41 of the secondary barrier 4.

As shown in FIG. 23, the secondary barrier 4 may be made of a second material having a five-layer structure of stacked GC/AF/GC/AF/GC.

The second material may be applied to the main barrier 41 of the secondary barrier 4 and is not limited thereto, and it goes without saying that the second material may also be applied to the auxiliary barrier 42 of the secondary barrier 4.

As shown in FIG. 24, the secondary barrier 4 may use inorganic basalt cloth extracted from basalt and may be made of a third material having a three-layer structure of stacked basalt cloth (BC)/AF/BC.

The third material may be applied to the main barrier 41 of the secondary barrier 4 and is not limited thereto, and it goes without saying that the third material may also be applied to the auxiliary barrier 42 of the secondary barrier 4.

As described in FIGS. 22 to 24, the secondary barrier 4 in the embodiment may be made of various materials having a multilayer structure of stacked first material/AF/second material. In this case, at least one of the first material and the second material may be GC, GAC, BC, or GC/AF/GC.

In addition, it goes without saying that various materials applied to the secondary barrier 4 may be applied to the main barrier 41 and the auxiliary barrier 42 of the secondary barrier 4 in various combinations.

Figure 25:
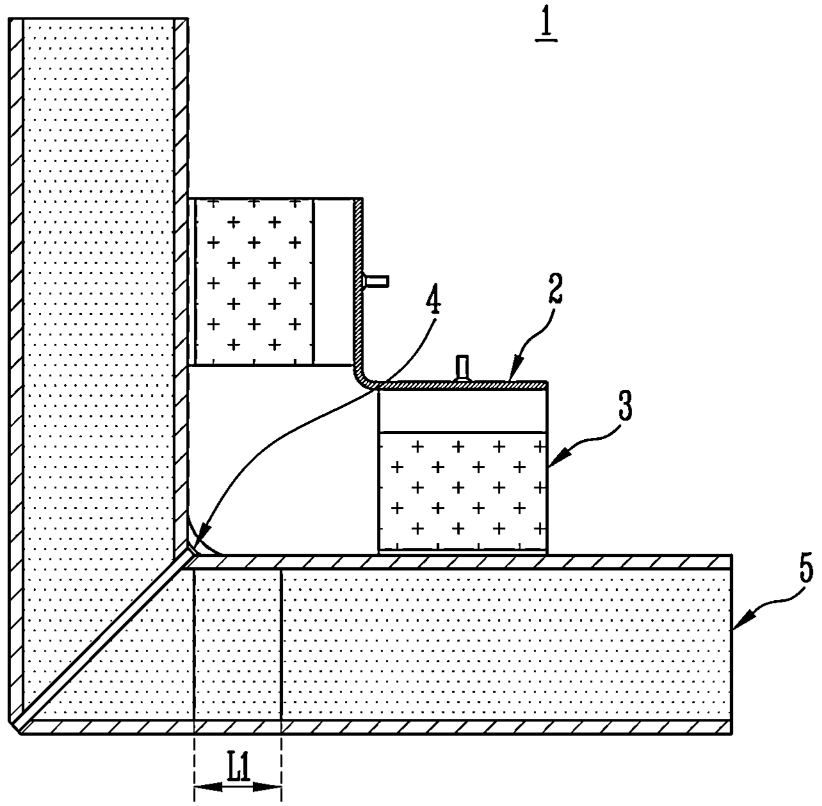
FIG. 25 is a partial cross-sectional view showing a right angle corner structure of the liquefied gas storage tank according to the first embodiment of the present invention.
Figure 26:
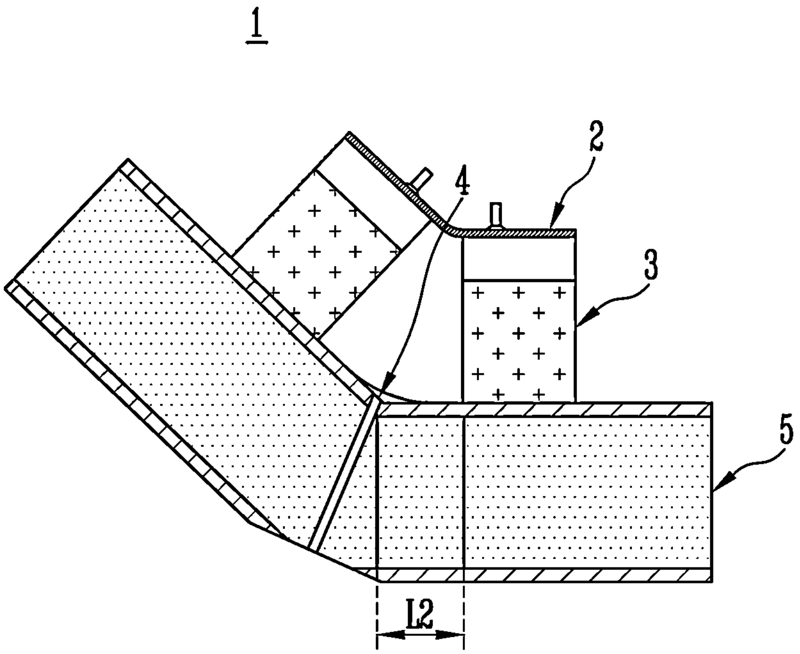
FIG. 26 is a partial cross-sectional view showing an obtuse angle corner structure of the liquefied gas storage tank according to the first embodiment of the present invention.

FIG. 25 is a partial cross-sectional view showing a right angle corner structure of the liquefied gas storage tank according to the first embodiment of the present invention, and FIG. 26 is a partial cross-sectional view showing an obtuse angle corner structure of the liquefied gas storage tank according to the first embodiment of the present invention.

In FIGS. 5 to 20, it can be seen that when the thickness of the connection insulation wall 3*a* or the primary insulation wall 3 and the thickness of the secondary insulation wall 5 is formed in the same or similar range, a more stable insulation system is secured. For example, the same or similar range may indicate a case in which the secondary barrier 4 is positioned in a range of 40% to 60% of the total thickness of the connection insulation wall 3*a* or the primary insulation wall 3 and the secondary insulation wall 5. This configuration may also be applied to the right angle corner structure of the liquefied gas storage tank 1 shown in FIG. 25 and the obtuse angle corner structure of the liquefied gas storage tank 1 shown in FIG. 26 in the same manner.

However, in the right angle corner structure and the obtuse angle corner structure of the liquefied gas storage tank 1, the secondary barrier 4 is inevitably formed in a curved shape, and when formed in the curve shape, the secondary barrier 4 is vulnerable to a load caused by the nearby environment compared to a linear portion, and in the embodiment, it is possible to mitigate the stress caused by the load. In addition, in the embodiment, the deformation of the hull may be easily absorbed.

Referring to FIG. 25, in the right angle corner structure, as the thickness of the primary insulation wall 3 becomes greater than in the first and second cases, the curvature radius of the secondary barrier 4 corresponds to 25% or more, for example, 25% to 50% of the thickness of the primary insulation wall 3.

In addition, in the right angle corner structure, as the thickness of the primary insulation wall 3 becomes greater than in the first and second cases, the secondary barrier 4 moves toward the hull 7 compared to the existing thin primary insulation wall. In this case, the curvature radius increases, and as the curvature radius increases, a length L1 of a portion in which the secondary barrier 4 is not attached to the secondary insulation wall 5 also increases. This means that the flexibility of the secondary barrier 4 increases in the right angle corner structure, and thus the secondary barrier 4 in the right angle corner structure easily absorbs the deformation of nearby portions, for example, the deformation of the hull, and the low-temperature stress is also reduced in the secondary barrier 4. For example, the length L1 of the non-adhesive portion may be in a range of 100 mm to 200 mm.

Referring to FIG. 26, in the obtuse angle corner structure, as the thickness of the primary insulation wall 3 becomes greater than in the first and second cases, the curvature radius of the secondary barrier 4 corresponds to 15% or more, for example, 15% to 35% of the thickness of the primary insulation wall 3.

In addition, in the obtuse angle corner structure, as the thickness of the primary insulation wall 3 becomes greater than in the first and second cases, the secondary barrier 4 moves toward the hull 7 compared to the existing thin primary insulation wall, thereby increasing the curvature radius. In this case, as the curvature radius of the secondary barrier 4 increases, a length L2 of a portion in which the secondary barrier is not attached to the secondary insulation wall 5 also increases. This means that the flexibility of the secondary barrier 4 increases in the obtuse angle corner structure, and thus the secondary barrier 4 in the obtuse angle corner structure easily absorbs the deformation of nearby portions, for example, the deformation of the hull, and the low-temperature stress is also reduced in the secondary barrier 4. For example, the length L2 of the non-adhesive portion may be in a range of 50 mm to 90 mm.

As described above, the low-temperature stress applied to the existing secondary barrier compared to the right angle corner structure and the obtuse angle corner structure of the primary insulation wall formed in a relatively smaller thickness may be reduced in the secondary barriers 4 in the right angle corner structure and the obtuse angle corner structure according to the present invention. In addition, since the non-adhesive portion increases, the deformation of the hull is easily absorbed as well.

Figure 27:
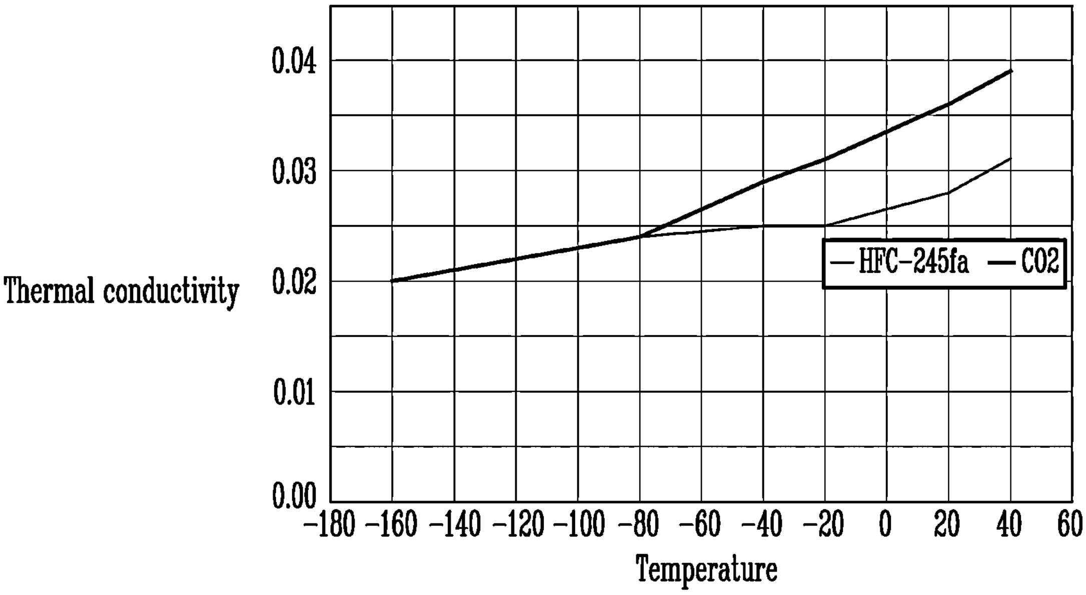
FIG. 27 is a graph showing a thermal conductivity according to materials used for a primary insulating material and a secondary insulating material of the liquefied gas storage tank according to the present invention.

FIG. 27 is a graph showing a thermal conductivity according to materials used for a primary insulating material and a secondary insulating material of the liquefied gas storage tank.

In the liquefied gas storage tank 1 according to the embodiment of the present invention, each of the connection insulation wall 3*a*, the primary insulating materials 32 and 32*a* of the primary insulation wall 3, and the secondary insulating material 51 of the secondary insulation wall 5 has been described as being made of polyurethane foam having the same material, but may selectively use polyurethane foam having different materials in some cases.

Specifically, reinforced polyurethane foam (RPUF) is manufactured by mixing polyol, isocyanate, and a blowing agent, and HFC-245fa or CO2 may be used as the blowing agent. HFC-245fa may be relatively more expensive than CO2.

In the embodiment, the primary insulating material 32 and 32*a* are made of the RPUF that uses the blowing agent CO2, and the secondary insulating material 51 is made of the RPUF that uses the blowing agent HFC-245fa.

Describing thermal conductivity characteristics of the blowing agent HFC-245fa and the blowing agent CO2 with reference to the graph in FIG. 27, the blowing agent HFC-245fa has a smaller thermal conductivity value than the blowing agent CO2 at room temperature, but shows a value that is the same as or similar to that of the blowing agent CO2 as the temperature is reduced to the cryogenic temperature.

In other words, the thermal conductivity values of the blowing agent HFC-245fa and the blowing agent CO2 show the same value or similar values at a temperature below −80° C., and the blowing agent HFC-245fa shows a lower value than the blowing agent CO2 at a temperature greater than or equal to −80° C.

Therefore, in the embodiment, the relatively expensive blowing agent HFC-245fa is not used for the primary insulating material 32 and 32*a* and the secondary insulating material 51, and considering the economic aspect, the primary insulating material 32 and 32*a* may be formed of the reinforced polyurethane foam that uses the blowing agent CO2, and the secondary insulating material 51 may be formed of the reinforced polyurethane foam that uses the blowing agent HFC-245fa.

Figure 28:
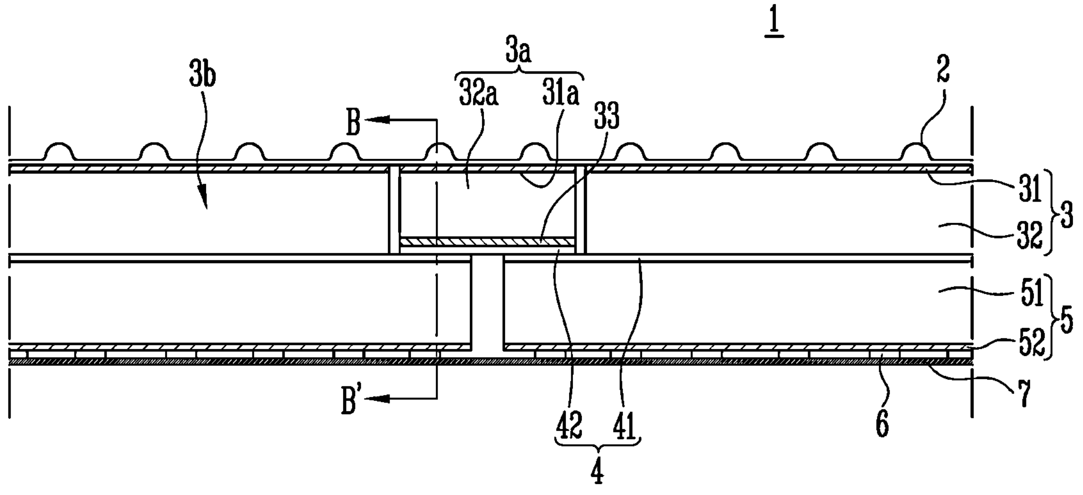
FIG. 28 is a partial cross-sectional view showing a liquefied gas storage tank according to a second embodiment of the present invention.
Figure 29:
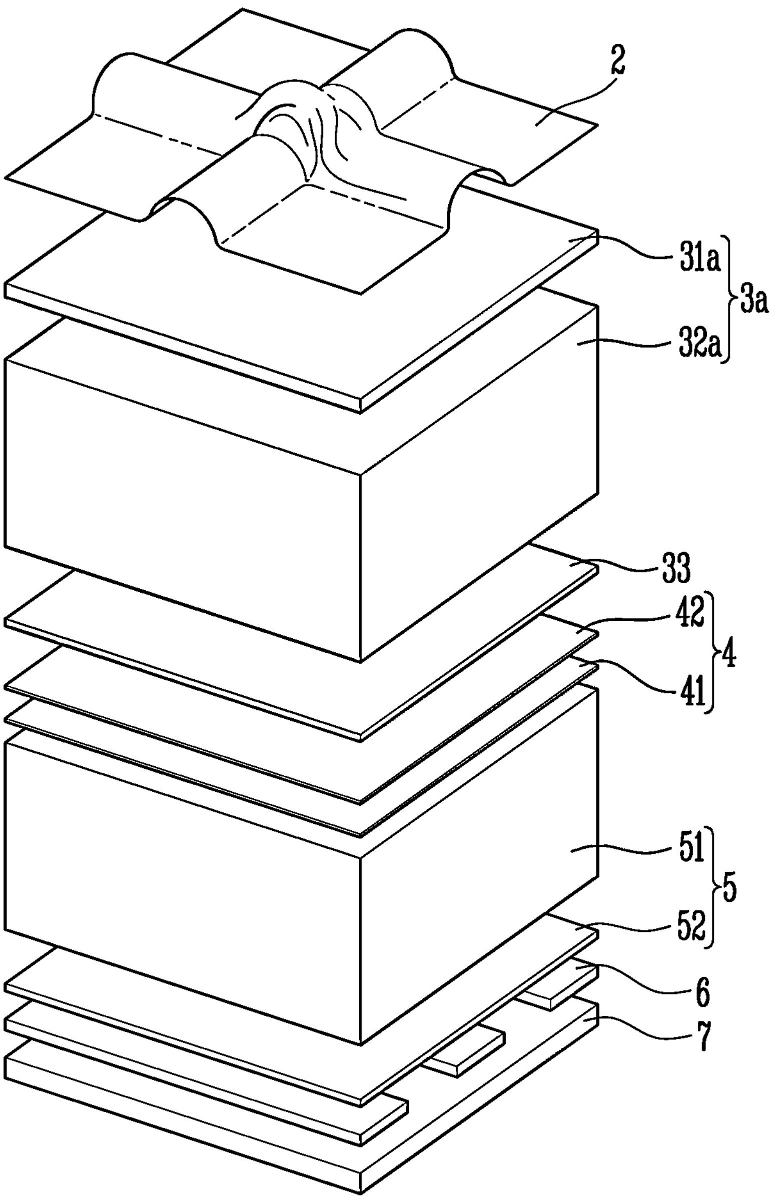
FIG. 29 is a partial perspective view showing the liquefied gas storage tank according to the second embodiment of the present invention.

FIG. 28 is a partial cross-sectional view showing a liquefied gas storage tank according to a second embodiment of the present invention, and FIG. 29 is a partial perspective view showing the liquefied gas storage tank according to the second embodiment of the present invention.

As shown in FIGS. 28 and 29, the liquefied gas storage tank 1 according to the second embodiment of the present invention may include a primary barrier 2 in contact with liquefied gas therein, a primary insulation wall 3 and a connection insulation wall 3*a* installed outside the primary barrier 2, a secondary barrier 4 installed outside the primary insulation wall 3 and the connection insulation wall 3*a*, and a secondary insulation wall 5 disposed outside the secondary barrier 4 and fixed to a hull 7, and since the configuration of the connection insulation wall 3*a* in the embodiment is different from that of the first embodiment and other configurations are the same as or similar to those of the first embodiment, only changed portions will be described below in order to avoid overlapping descriptions.

In the embodiment, the configuration of the connection insulation wall 3*a* may be different from that of the first embodiment.

Specifically, compared to the first embodiment, the connection insulation wall 3*a* may further include an auxiliary insulation plate 33.

In other words, the connection insulation wall 3*a* may have a structure in which a connection plywood 31*a*, a connection insulating material 32*a*, and the auxiliary insulation plate 33 are stacked.

The auxiliary insulation plate 33 may have a thickness of 5 mm to 10 mm and may be made of plywood, high-density polyurethane foam (HD PUF), fiber reinforced plastic (FRP), etc. to obtain the load distribution effect of the secondary barrier 4. Alternatively, the auxiliary insulation plate 33 may be formed of vacuum insulation panel (VIP), low-density polyurethane foam (LD PUF), etc. having excellent insulation characteristics to compensate for the insulation weakness of a portion in which the connection insulation wall 3*a* is formed.

The connection insulating material 32*a* of the connection insulation wall 3*a* and the primary insulating material 32 of a fixed insulation wall 3*b* constituting a unit element may have the same thickness. However, since the connection insulation wall 3*a* has an auxiliary barrier 42 stacked thereunder in addition to a main barrier 41 of the secondary barrier 4 and also includes the auxiliary insulation plate 33, a thickness of the connection insulating material 32*a* of the connection insulation wall 3*a* may be smaller than the primary insulating material 32 of the primary insulation wall 3 as much as a thickness of the auxiliary barrier 42 and a thickness of the auxiliary insulation plate 33.

It goes without saying that the auxiliary insulation plate 33 may be installed not only under the connection insulating material 32*a* of the connection insulation wall 3*a* but also under the primary insulating material 32 of the primary insulation wall 3 constituting the unit element.

Figure 30:
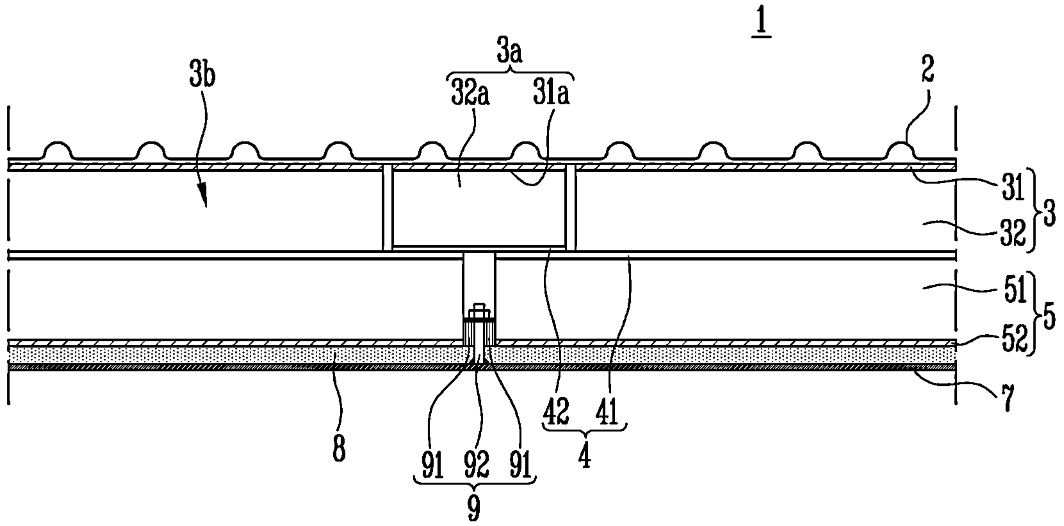
FIG. 30 is a partial cross-sectional view showing a liquefied gas storage tank according to a third embodiment of the present invention.
Figure 31:
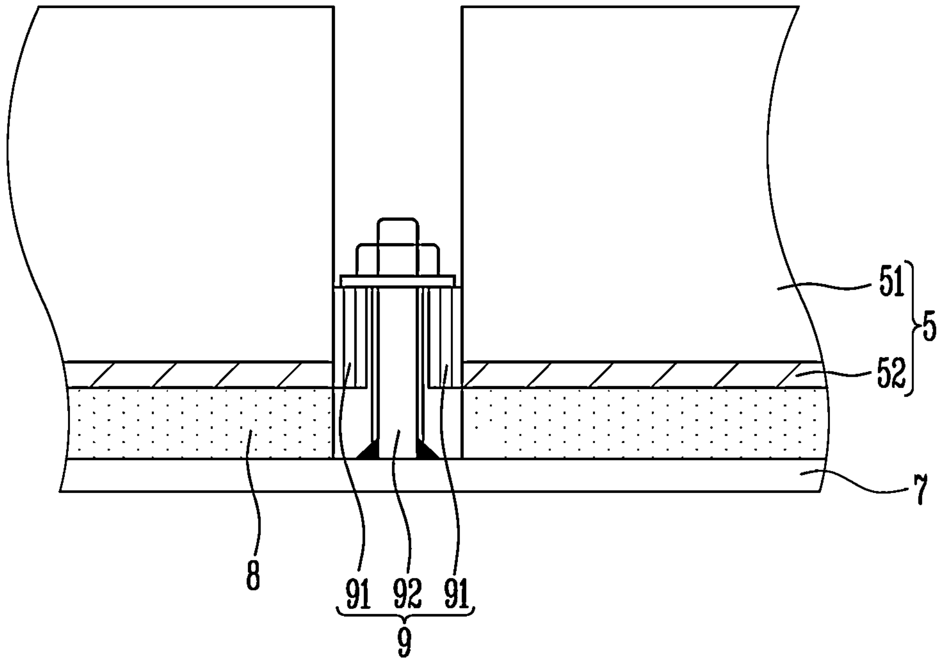
FIG. 31 is an enlarged view of a main part of the liquefied gas storage tank according to the third embodiment of the present invention.

FIG. 30 is a partial cross-sectional view showing a liquefied gas storage tank according to a third embodiment of the present invention, and FIG. 31 is an enlarged view of a main part of the liquefied gas storage tank according to the third embodiment of the present invention.

As shown in FIGS. 30 and 31, the liquefied gas storage tank 1 according to the third embodiment of the present invention may include a primary barrier 2 in contact with liquefied gas therein, a primary insulation wall 3 and a connection insulation wall 3*a* installed outside the primary barrier 2, a secondary barrier 4 installed outside the primary insulation wall 3 and the connection insulation wall 3*a*, a secondary insulation wall 5 disposed outside the secondary barrier 4 and fixed to a hull 7, a leveling member 8 installed between the secondary insulation wall 5 and the hull 7, and a fixing member 9 for fixing the secondary insulation wall 5 to the hull 7, and since the embodiment is different from the first embodiment in that the leveling member 8 and the fixing member 9 are formed and other configurations are the same as or similar to those of the first embodiment, the leveling member 8 and the fixing member 9, which are components different from those of the first embodiment, and only portions changed by the leveling member 8 and the fixing member 9 will be described below in order to avoid overlapping descriptions.

The leveling member 8 may be installed between the secondary insulation wall 5 and the hull 7.

The leveling member 8 may be a non-adhesive elastic insulating material capable of leveling a deformed portion of the hull 7, increasing the insulation performance of the tank, and supporting the secondary insulation wall 5 and may be made of expanded polystyrene (EPS), etc.

An upper surface of the leveling member 8 in close contact with the secondary insulation wall 5 by an elastic force may become flat, and a lower surface of the leveling member 8 in close contact with the hull 7 may have a curved surface to match the deformation of the hull 7. The hull 7 may be deformed, for example, upon welding between blocks of the hull 7.

In other words, the leveling member 8 may level the deformed portion of the hull even without using the existing mastic and leveling wedge. Here, it goes without saying that the leveling wedge may be selectively used.

In the embodiment, by applying the leveling member 8, unlike the existing mastic applied in various types according to a size of a gap, the leveling member 8 may be constructed in a single size and does not require a mastic curing time, thereby shortening a work time and may apply the insulating material, thereby increasing heat retention.

The fixing member 9 may have a cleat structure including protrusions 91 and a stud bolt 92 to fix the secondary insulation wall 5 to the hull 7.

The protrusions 91 may be provided to protrude outward from lower portions of both side surfaces of the unit panel of the secondary insulation wall 5 and made of plywood.

The protrusion 91 may have one side surface fixedly installed over a side surface of a secondary plywood 52 of the secondary insulation wall 5 and a partial side surface of a secondary insulating material 51 from the secondary plywood 52 to a predetermined height and have a lower surface having the same level as a lower surface of the secondary plywood 52.

Widths and thicknesses of the protrusions 91 may be sizes sufficient for inserting the stud bolt 92 between the protrusions 91 facing each other when a plurality of unit panels constituting the secondary insulation wall 5 are disposed.

The stud bolt 92 may be fixed to the hull 7.

The stud bolt 92 may fixedly installed to the hull 7 to match a space between the unit panels of the adjacent secondary insulation walls 5 when the plurality of unit panels constituting the secondary insulation wall 5 are disposed.

The stud bolt 92 may be provided on a side surface of each of the unit panels of the adjacent secondary insulation walls 5 and may fix the secondary insulation wall 5 to the hull 7 by tightening the bolt in a state of being positioned between two protrusions 91 facing each other.

Figure 32:
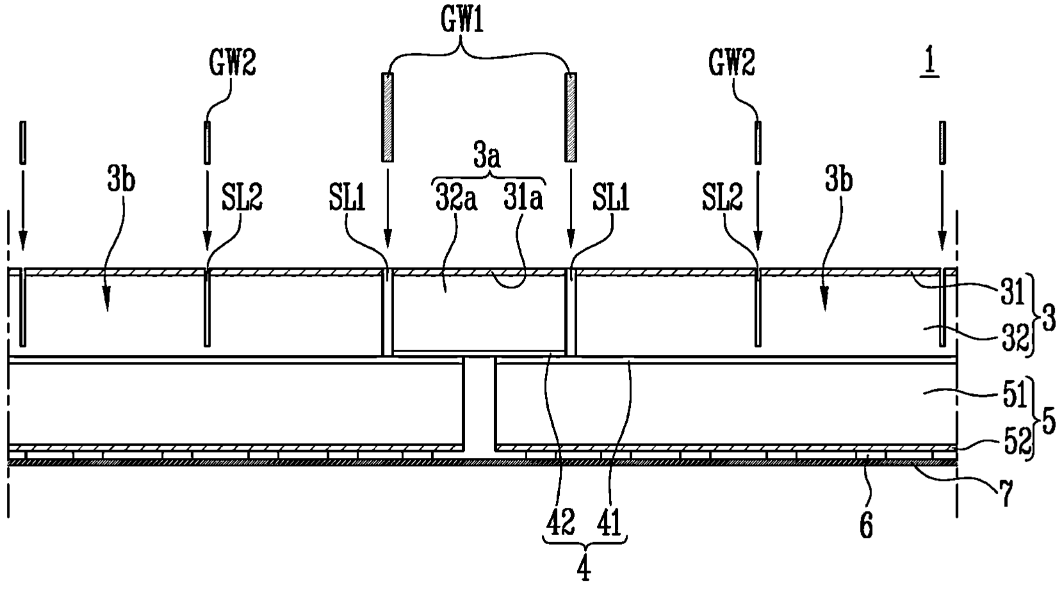
FIG. 32 is a partial cross-sectional view showing a liquefied gas storage tank according to a fourth embodiment of the present invention.
Figure 33:
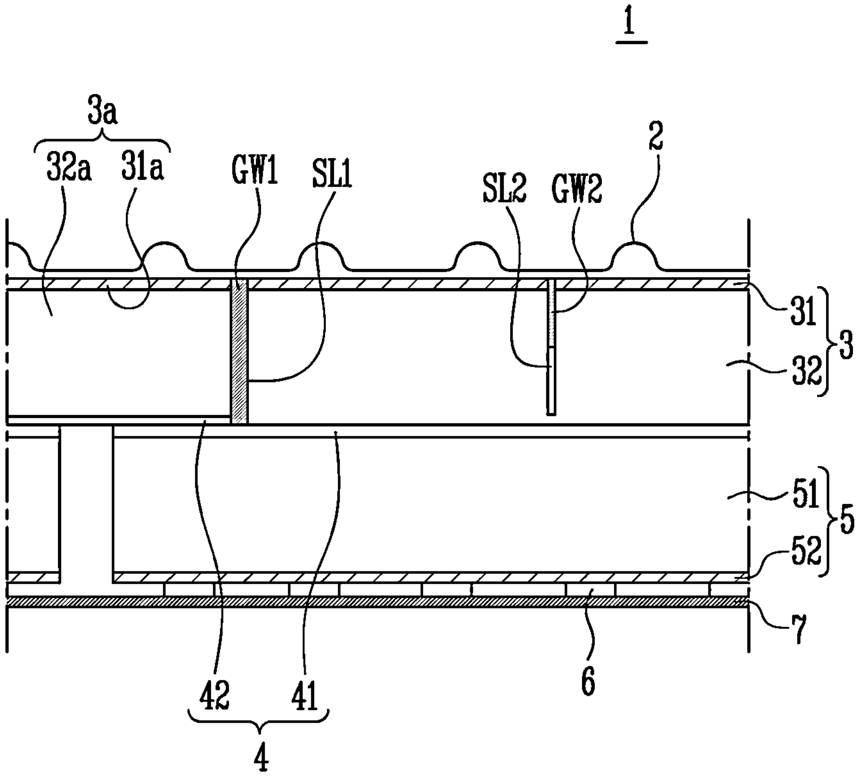
FIG. 33 is a view showing an insulating filler material for filling a first slit forming a gap between a connection insulation wall and a fixed insulation wall, which constitute a primary insulation wall, and a plurality of second slits provided in the fixed insulation wall.
Figure 34:
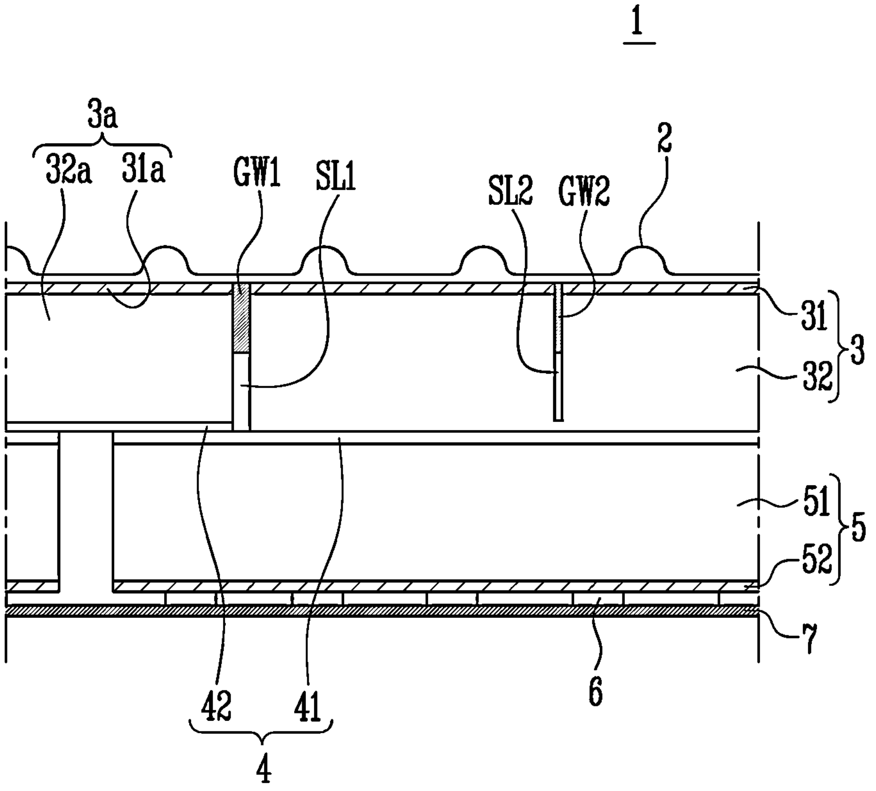
FIG. 34 is a view showing an insulating filler material for filling the first slit forming the gap between the connection insulation wall and the fixed insulation wall, which constitute the primary insulation wall, and the plurality of second slits provided in the fixed insulation wall, according to another embodiment.
Figure 35:
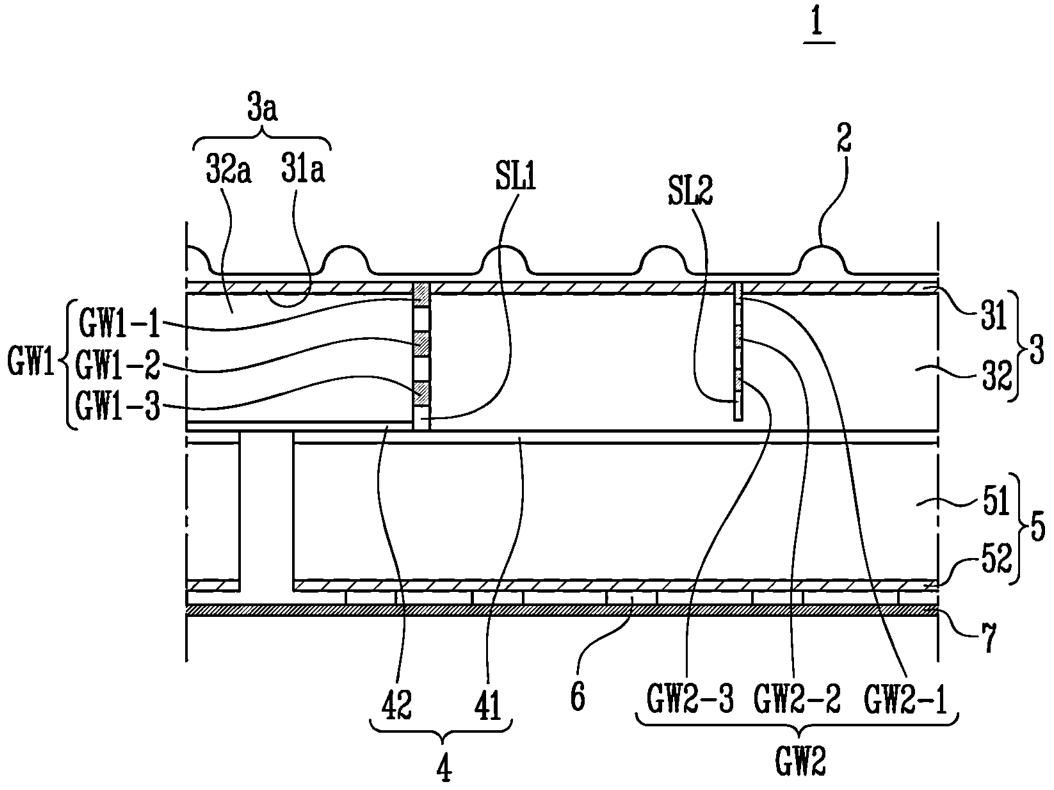
FIG. 35 is a view showing an insulating filler material for filling the first slit forming the gap between the connection insulation wall and the fixed insulation wall, which constitute the primary insulation wall, and the plurality of second slits provided in the fixed insulation wall, according to still another embodiment.

FIG. 32 is a partial cross-sectional view showing a liquefied gas storage tank according to a fourth embodiment of the present invention, FIG. 33 is a view showing an insulating filler material for filling a first slit forming a gap between a connection insulation wall and a fixed insulation wall, which constitute a primary insulation wall, and a plurality of second slits provided in the fixed insulation wall, FIG. 34 is a view showing an insulating filler material for filling the first slit forming the gap between the connection insulation wall and the fixed insulation wall, which constitute the primary insulation wall, and the plurality of second slits provided in the fixed insulation wall according to another embodiment, and FIG. 35 is a view showing an insulating filler material for filling the first slit forming the gap between the connection insulation wall and the fixed insulation wall, which constitute the primary insulation wall, and the plurality of second slits provided in the fixed insulation wall according to still another embodiment.

As shown in FIGS. 32 to 35, the liquefied gas storage tank 1 according to the fourth embodiment of the present invention may include a primary barrier 2 in contact with liquefied gas therein, a primary insulation wall 3 installed outside the primary barrier 2 and including a connection insulation wall 3*a* and a fixed insulation wall 3*b*, a secondary barrier 4 installed outside the primary insulation wall 3, and a secondary insulation wall 5 disposed outside the secondary barrier 4 and fixed to a hull 7, and since the embodiment is different from the first embodiment in that a first slit SL1 forming a gap between the connection insulation wall 3*a* and the fixed insulation wall 3*b* is filled and a plurality of second slits SL2 are provided in the fixed insulation wall 3*b* and other configurations are the same as or similar to those of the first embodiment, changed portions will be mainly described below in order to avoid overlapping descriptions.

The primary insulation wall 3 and the secondary insulation wall 5 in the embodiment may have the same thickness or similar thicknesses as described above.

The primary insulation wall 3 may include the connection insulation wall 3*a* and the fixed insulation wall 3*b*.

The connection insulation wall 3*a* may be inserted and installed between the adjacent fixed insulation walls 3*b* to seal a spatial portion formed between the adjacent secondary insulation walls 5 when unit elements including the fixed insulation wall 3*b* are disposed adjacent to each other, and in this case, the gap may be formed between the connection insulation wall 3*a* and the fixed insulation wall 3*b*.

The first slit SL1 may be the gap formed between the connection insulation wall 3*a* and the fixed insulation wall 3*b* and formed to a depth corresponding to a thickness of the primary insulation wall 3.

In addition, in the embodiment, the plurality of second slits SL2 may be formed in the fixed insulation wall 3*b* at regular intervals to cope with contraction and expansion of the fixed insulation wall 3*b*.

The second slit SL2 may be formed to a depth that is similar to the thickness of the fixed insulation wall 3*b* to maximally mitigate a contraction or expansion stress due to a temperature applied to the fixed insulation wall 3*b*. For example, when the thickness of the fixed insulation wall 3*b* is 200 mm, the depth of the second slit SL2 may be in a range of 185 mm to 195 mm, but is not limited thereto.

The first slit SL1 and the second slit SL2 can mitigate the contraction or expansion stress due to the temperature, thereby preventing damage to the primary insulation wall 3, but may serve as a convection path to increase the low-temperature load of the secondary barrier 4.

Therefore, in the embodiment, the first slit SL1 may be fully or partially filled with a first insulating filler material GW1, and the second slit SL2 may be partially filled with a second insulating filler material GW2, thereby preventing damage due to contraction and expansion of the fixed insulation wall 3*b* and also reducing the low-temperature load of the secondary barrier 4, which will be described in detail below.

The first insulating filler material GW1 and the second insulating filler material GW2 may be inserted into and fill the first slit SL1 and the second slit SL2 using a jig.

As shown in FIGS. 33 to 35, the first insulating filler material GW1 may be formed to fully fill the first slit SL1 (see FIG. 33), formed to fill the first slit SL1 from an inlet of the first slit SL1 to a predetermined depth so that a space is formed in a lower portion of the first slit SL1 (see FIG. 34), or formed to fill an inside of the first slit SL1 in multiple layers so that a plurality of spaces are formed inside the first slit SL1 (see FIG. 35).

In addition, as shown in FIGS. 33 to 35, the second insulating filler material GW2 may be formed to fill the second slit SL2 from an inlet of the second slit SL2 to a predetermined depth so that a space is formed in a lower portion of the second slit SL2 (see FIGS. 33 and 34) or formed to fill an inside of the second slit SL2 in multiple layers so that a plurality of spaces are formed inside the second slit SL2 (see FIG. 35).

In the above description, each of the first insulating filler material GW1 filling in the first slit SL1 and the second insulating filler material GW2 filling the second slit SL2 may be formed to have a (+) tolerance to completely seal the space in a state of filling the spaces of the first slit SL1 and the second slit SL2, thereby absorbing contraction and expansion.

Referring to FIG. 33, the first insulating filler material GW1 may be formed to fully fill the first slit SL1, and the second insulating filler material GW2 may be formed to fill the second slit SL2 from the inlet of the second slit SL2 to the predetermined depth so that the space is formed in a lower portion of the second slit SL2.

The first insulating filler material GW1 and the second insulating filler material GW2 may be made of glass wool, but are not limited thereto.

In the above description, the first insulating filler material GW1 may be formed to fully fill the first slit SL1, thereby increasing the insulation performance of a connected portion between the connection insulation wall 3*a* and the fixed insulation wall 3*b*. The second insulating filler material GW2 may be formed so that the space is formed in a lower portion of the second slit SL2, thereby not only increasing the insulation performance of the fixed insulation wall 3*b* by the second insulating filler material GW2 but also absorbing the contraction and expansion of the fixed insulation wall 3*b* in the spatial portion of the second slit SL2.

Referring to FIG. 34, the first insulating filler material GW1 may be formed to fill the first slit SL1 from the inlet of the first slit SL1 to the predetermined depth so that the space is formed in a lower portion of the first slit SL1, and the second insulating filler material GW2 may be formed to fill the second slit SL2 from the inlet of the second slit SL2 to the predetermined depth so that the space is formed in a lower portion of the second slit SL2.

The first insulating filler material GW1 and the second insulating filler material GW2 may be made of glass wool, but are not limited thereto.

In the above description, the first insulating filler material GW1 may be formed so that the space is formed in a lower portion of the first slit SL1, thereby not only increasing the insulation performance of the connected portion between the connection insulation wall 3*a* and the fixed insulation wall 3*b* by the first insulating filler material GW1 but also absorbing the contraction and expansion of the connection insulation wall 3*a* and the fixed insulation wall 3*b* in the spatial portion of the first slit SL1. The second insulating filler material GW2 may be formed so that the space is formed in a lower portion of the second slit SL2, thereby not only increasing the insulation performance of the fixed insulation wall 3*b* by the second insulating filler material GW2 but also absorbing the contraction and expansion of the fixed insulation wall 3*b* in the spatial portion of the second slit SL2.

Referring to FIG. 35, the first insulating filler material GW1 may be formed to fill the first slit SL1 in multiple layers so that the plurality of spaces are formed inside the first slit SL1, and the second insulating filler material GW2 may be formed to fill the second slit SL2 in multiple layers so that the plurality of spaces are formed inside the second slit SL2.

The first insulating filler material GW1 may include a first upper insulating filler material GW1-1 formed on an upper portion of the first slit SL1, a first middle insulating filler material GW1-2 spaced a predetermined interval from the first upper insulating filler material GW1-1 and formed in the middle of the first slit SL1, and a first lower insulating filler material GW1-3 spaced a predetermined interval from the first middle insulating filler material GW1-2 and formed in a lower portion of the first slit SL1.

Each of the first upper insulating filler material GW1-1, the first middle insulating filler material GW1-2, and the first lower insulating filler material GW1-3 may be formed of the same insulating material or different insulating materials, and in this case, as the insulating material, glass wool, super lite, a soft foam material, an aerogel blanket, etc. may be used.

The second insulating filler material GW2 may include a second upper insulating filler material GW2-1 formed on an upper portion of the second slit SL2, a second middle insulating filler material GW2-2 spaced a predetermined interval from the second upper insulating filler material GW2-1 and formed in the middle of the second slit SL2, and a second lower insulating filler material GW2-3 spaced a predetermined interval from the second middle insulating filler material GW2-2 and formed in a lower portion of the second slit SL2.

Each of the second upper insulating filler material GW2-1, the second middle insulating filler material GW2-2, and the second lower insulating filler material GW2-3 may be formed of the same insulating material or different insulating materials, and in this case, as the insulating material, glass wool, super lite, a soft foam material, an aerogel blanket, etc. may be used.

In the above description, the first insulating filler material GW1 may be formed in multiple layers so that the plurality of spaces are formed inside the first slit SL1, thereby not only increasing the insulation performance of the connected portion between the connection insulation wall 3*a* and the fixed insulation wall 3*b* by the multi-layered first insulating filler materials GW1-1, GW1-2, and GW1-3 but also absorbing the contraction and expansion of the connection insulation wall 3*a* and the fixed insulation wall 3*b* in the plurality of spatial portions of the first slit SL1. The second insulating filler material GW2 may be formed so that the plurality of spaces are formed inside the second slit SL2, thereby not only increasing the insulation performance of the fixed insulation wall 3*b* by the multi-layered second insulating filler materials GW2-1, GW2-2, and GW2-3 but also absorbing the contraction and expansion of the fixed insulation wall 3*b* in the plurality of spatial portions of the second slit SL2.

Figure 36:
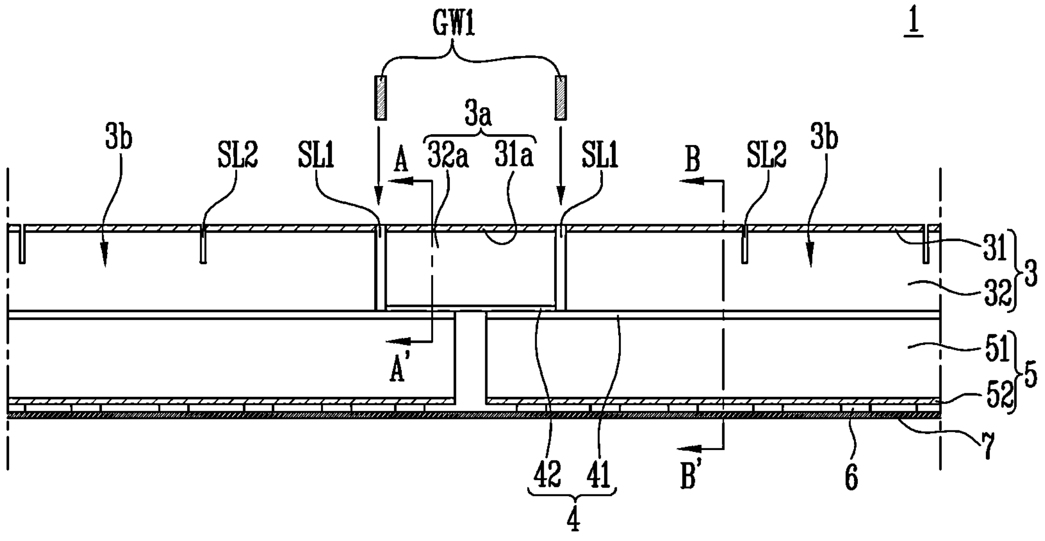
FIG. 36 is a partial cross-sectional view showing a liquefied gas storage tank according to a fifth embodiment of the present invention.
Figure 37:
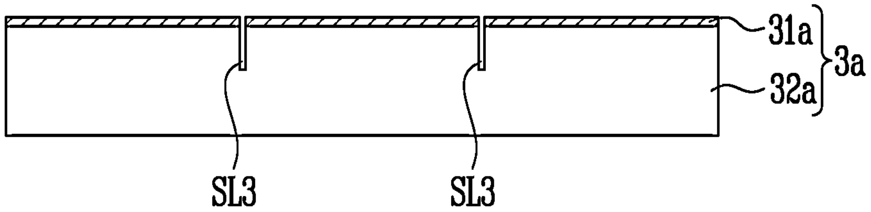
FIG. 37 is a cross-sectional view of a connection insulation wall along line A-A' in FIG. 36.
Figure 38:
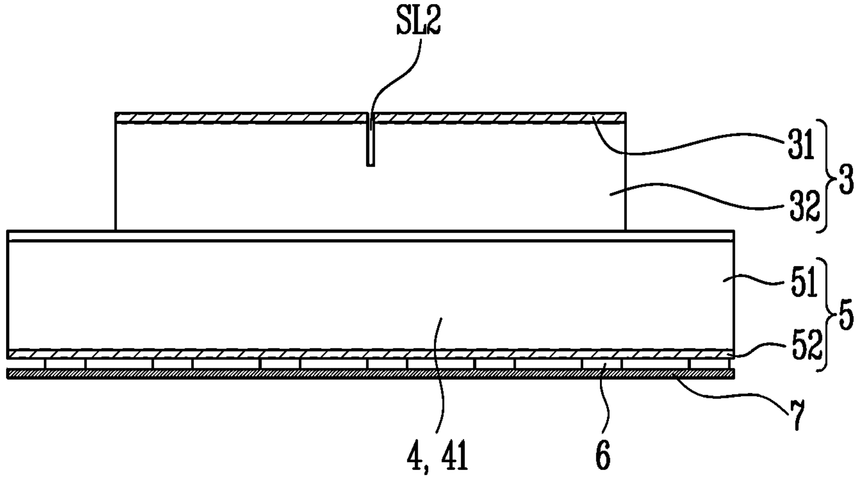
FIG. 38 is a cross-sectional view of a unit element formed by stacking a secondary insulation wall, a secondary barrier, and a fixed insulation wall constituting a primary insulation wall along line B-B' in FIG. 36.
Figure 39:
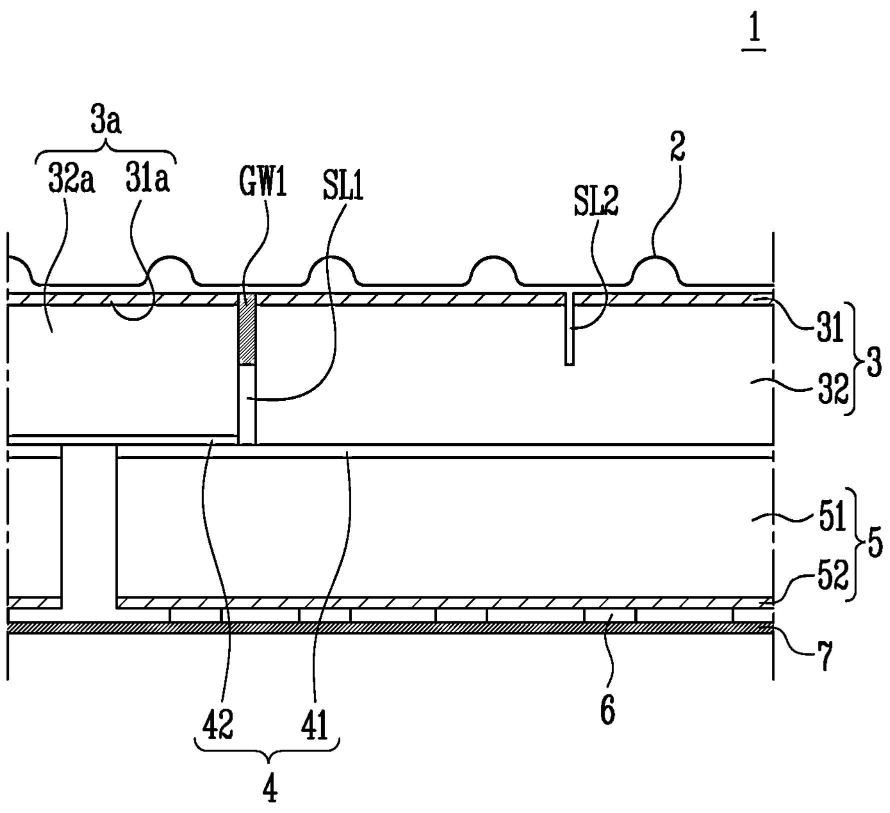
FIGS. 39 and 40 are views showing an insulating filler material for filling a first slit forming a gap between the fixed insulation wall and a connection insulation wall, which constitute the primary insulation wall.
Figure 40:
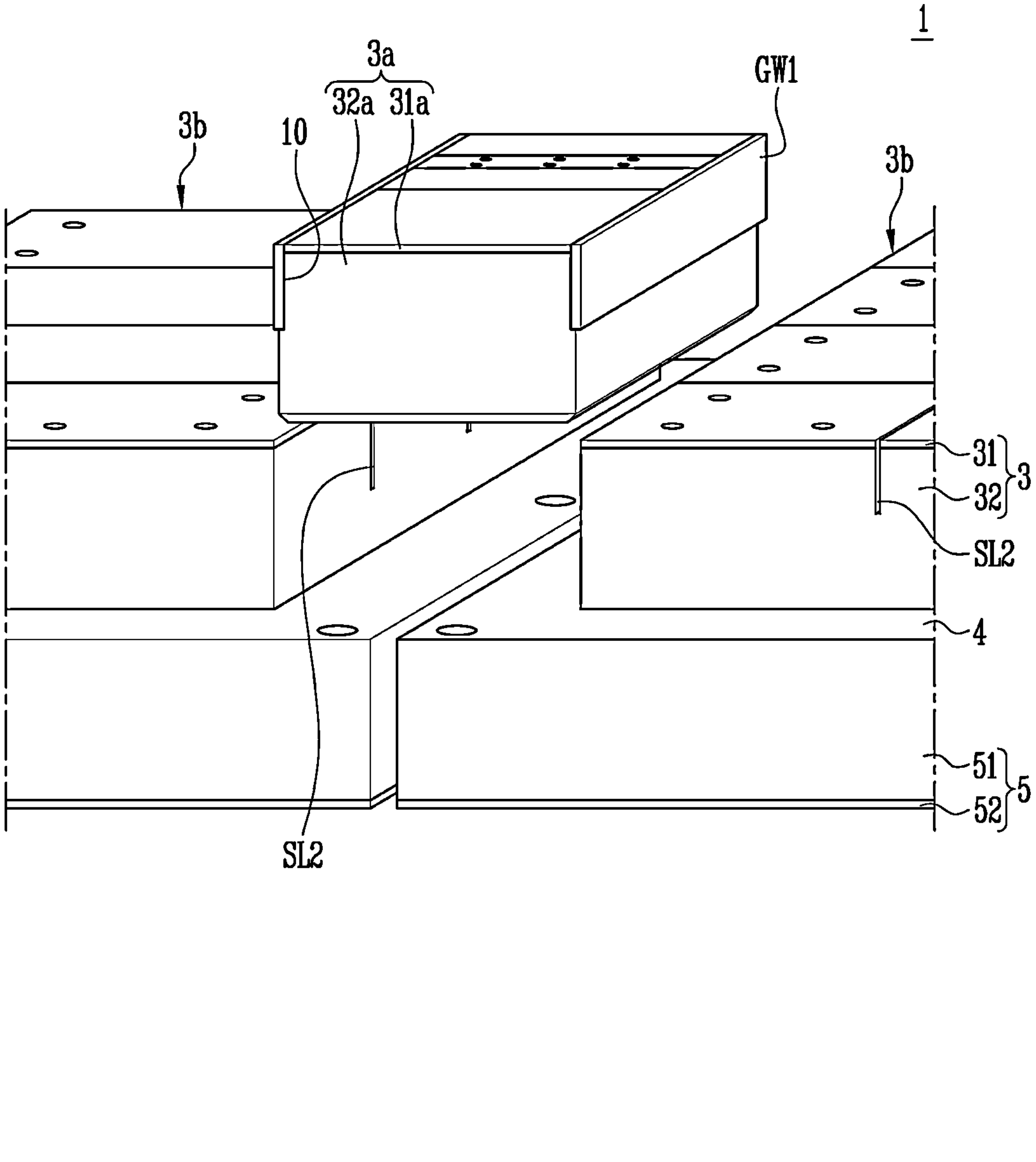
Figure 41:
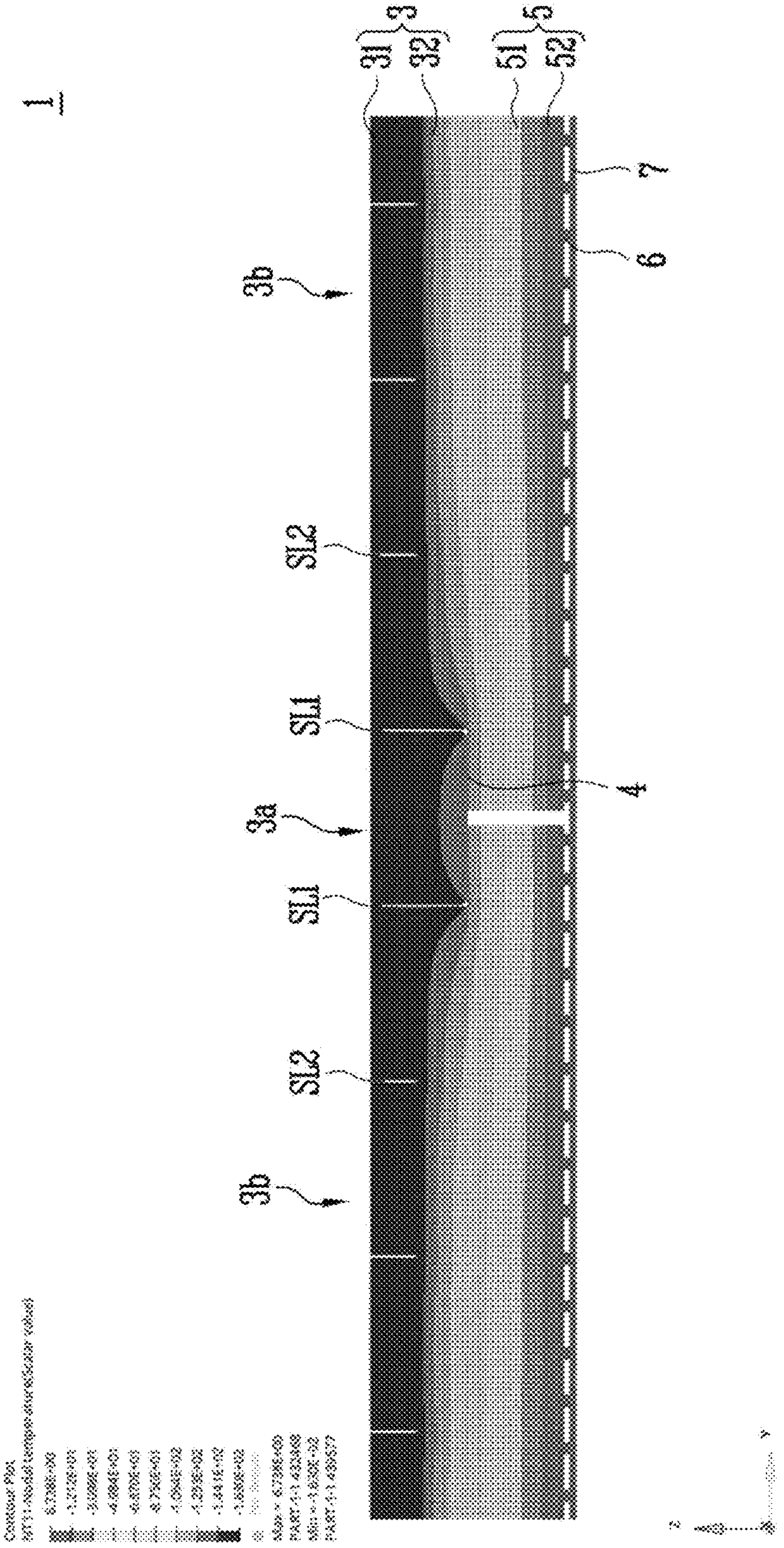
FIGS. 41 and 42 are views showing structural analysis results of the liquefied gas storage tank according to the fifth embodiment of the present invention.
Figure 42:
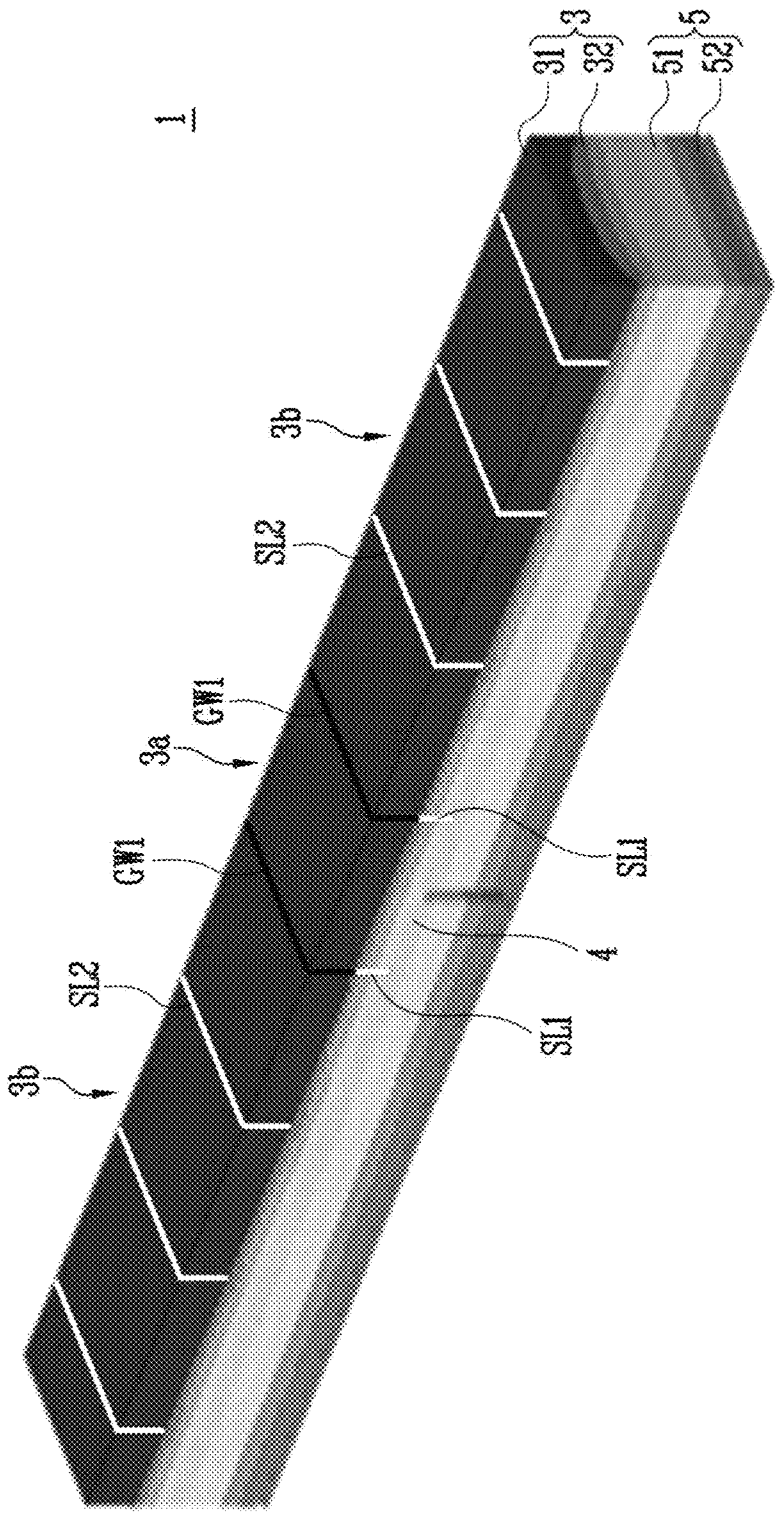
Figure 45:
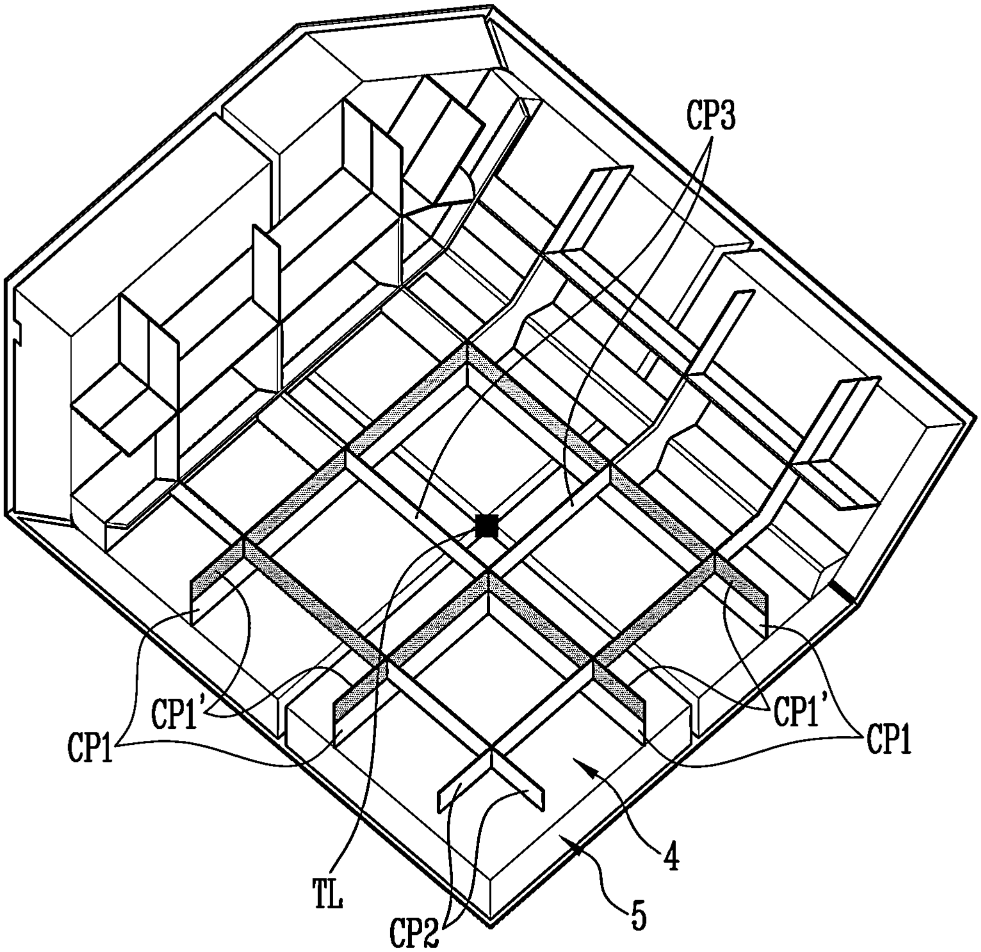
Figure 46:
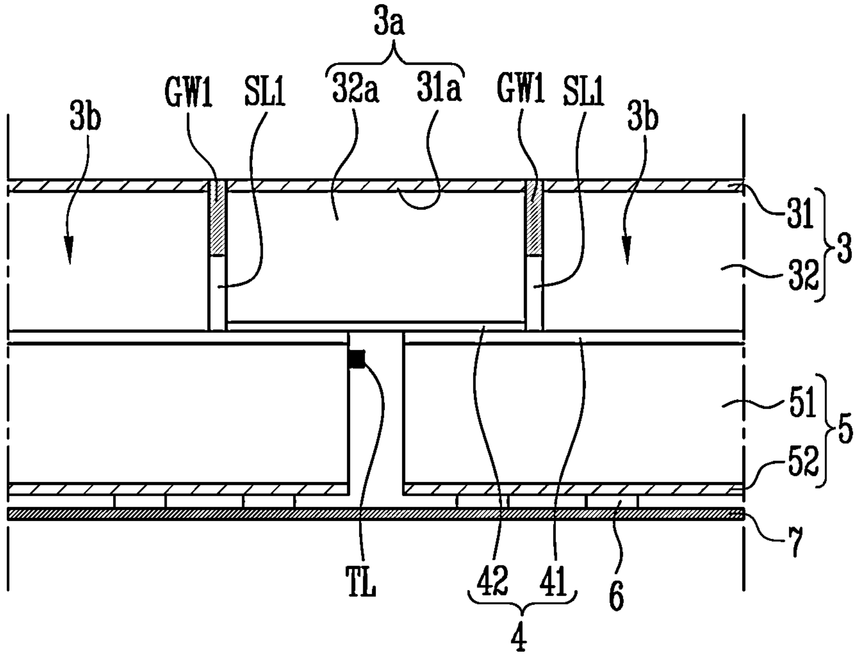
Figure 47:
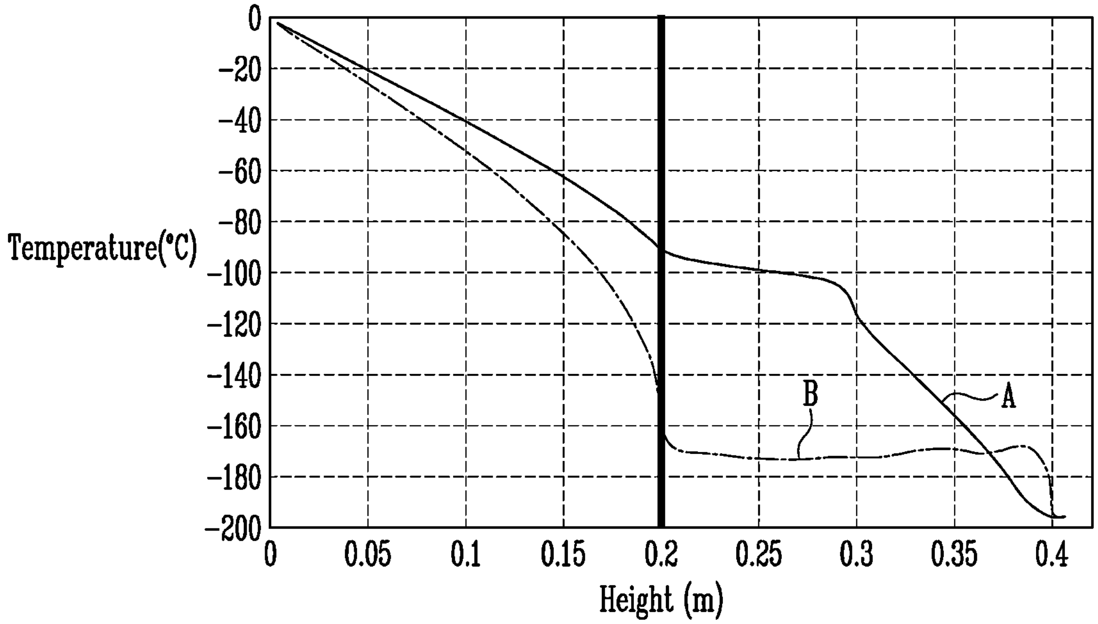
FIG. 47 is a graph showing a comparison between the temperatures of the secondary barriers under the slits depending on whether the insulating filler material for filling the slit is present in the liquefied gas storage tank according to the fifth embodiment of the present invention and the liquefied gas storage tank according to the comparative example.

FIG. 36 is a partial cross-sectional view showing a liquefied gas storage tank according to a fifth embodiment of the present invention, FIG. 37 is a cross-sectional view of a connection insulation wall along line A-A' in FIG. 36, FIG. 38 is a cross-sectional view of a unit element formed by stacking a secondary insulation wall, a secondary barrier, and a fixed insulation wall constituting a primary insulation wall along line B-B' in FIG. 36, FIGS. 39 and 40 are views showing an insulating filler material for filling a first slit forming a gap between the fixed insulation wall and a connection insulation wall, which constitute the primary insulation wall, FIGS. 41 and 42 are views showing structural analysis results of the liquefied gas storage tank according to the fifth embodiment of the present invention, FIGS. 43 to 46 are views showing a comparison of convection paths and temperatures of secondary barriers that vary depending on a structure of the slit and whether the insulating filler material is applied thereto in the liquefied gas storage tank according to the fifth embodiment of the present invention and a liquefied gas storage tank according to a comparative example, and FIG. 47 is a graph showing a comparison between the temperatures of the secondary barriers under the slits depending on whether the insulating filler material for filling the slit is present in the liquefied gas storage tank according to the fifth embodiment of the present invention and the liquefied gas storage tank according to the comparative example.

As shown in FIGS. 36 to 40, the liquefied gas storage tank 1 according to the fifth embodiment of the present invention may include a primary barrier 2 in contact with liquefied gas therein, a primary insulation wall 3 installed outside the primary barrier 2 and including a connection insulation wall 3*a* and a fixed insulation wall 3*b*, a secondary barrier 4 installed outside the primary insulation wall 3, and a secondary insulation wall 5 disposed outside the secondary barrier 4 and fixed to a hull 7, and since a first insulating filler material GW1 for filling a first slit SL1 forming a gap between the connection insulation wall 3*a* and the fixed insulation wall 3*b* and a plurality of second slits SL2 provided in the fixed insulation wall 3*b* in the embodiment are different from those of the above-described fourth embodiment and other configurations are the same as or similar to those of the first embodiment, changed portions will be mainly described below in order to avoid overlapping descriptions.

The primary insulation wall 3 and the secondary insulation wall 5 in the embodiment may have the same thickness or similar thicknesses as described above.

The primary insulation wall 3 may include the connection insulation wall 3*a* and the fixed insulation wall 3*b*, and in this case, the connection insulation wall 3*a* may be inserted and installed between the adjacent fixed insulation walls 3*b* to seal a space formed between the adjacent secondary insulation walls 5 when unit elements including the fixed insulation wall 3*b* are disposed adjacent to each other. In this case, the gap may be formed between the connection insulation wall 3*a* and the fixed insulation wall 3*b*.

The first slit SL1 may be a gap formed between the connection insulation wall 3*a* and the fixed insulation wall 3*b* and formed to a depth corresponding to a thickness of the primary insulation wall 3.

In addition, in the embodiment, the plurality of second slits SL2 may be formed in the fixed insulation wall 3*b* at regular intervals to cope with contraction and expansion of the fixed insulation wall 3*b*. One or more second slits SL2 may be formed not only in a longitudinal direction of the fixed insulation wall 3*b* but also as shown in FIG. 38, in a width direction of the fixed insulation wall 3*b*.

In addition, in the embodiment, one or more third slits SL3 may be formed in the connection insulation wall 3*a* to cope with contraction and expansion of the connection insulation wall 3*a*. The third slit SL3 is not formed in a relatively narrower width direction, and as shown in FIG. 37, one or more third slits SL3 may be formed in a relatively longer longitudinal direction. The third slit SL3 formed in the longitudinal direction may be positioned collinearly with the second slit SL2 formed in the longitudinal direction when the connection insulation wall 3*a* is inserted between the fixed insulation walls 3*b*.

In the above description, the second slit SL2 may be formed to a depth corresponding to about half of the thickness of the fixed insulation wall 3*b* to secure insulation performance while mitigating a contraction or expansion stress due to a temperature applied to the fixed insulation wall 3*b*, and the insulating filler material does not fill the inside of the second slit SL2. For example, when the thickness of the fixed insulation wall 3*b* is 200 mm, the second slit SL2 may have a depth of about 90 mm but is not limited thereto, and it goes without saying that the second slit SL2 may be formed in a range of 100 mm to 50 mm. The third slit SL3 may be formed similarly or identically to the second slit SL2.

It can be seen that when the first slit SL1, the second slit SL2, and the third slit SL3 are not filled with any insulating filler material, as in the structural analysis results shown in FIG. 41, the insulation performance of the fixed insulation wall 3*b* and the connection insulation wall 3*a* around the first slit SL1 formed to a greater depth is smaller than that of the fixed insulation wall 3*b* in which the second slit SL2 is formed, which is formed to a smaller depth. This is because a convection phenomenon mainly occurs through the deeper first slit SL1.

Therefore, in the embodiment, it can be seen that by partially filling the first slit SL1 with the first insulating filler material GW1, as in the structural analysis results shown in FIG. 42, it can be seen that the first insulating filler material GW1 prevents the heat convection phenomenon, and thus the insulation performance of the fixed insulation wall 3*b* and the connection insulation wall 3*a* around the first slit SL1 formed to the greater depth is shown as being similar to the insulation performance of the fixed insulation wall 3*b* in which the second slit SL2 is formed, which is formed to the smaller depth. In other words, it can be seen that when the first insulating filler material GW1 fills the first slit SL1, a low-temperature transmission depth is flattened in all portions.

In the embodiment, the first insulating filler material GW1 filling the first slit SL1 needs to be formed to be at least longer than a depth of the second slit SL2 or the third slit SL3 formed to the depth corresponding to about half of the thickness of the fixed insulation wall 3*b* or the connection insulation wall 3*a* in order to reduce the heat convection phenomenon through the slit.

Specifically, since the heat convection phenomenon increases when a convection path formed in the spatial portion of the first slit SL1 partially filled with the first insulating filler material GW1 is connected to a convection path formed in the spatial portion of the second slit SL2 of the fixed insulation wall 3*b* and a convection path formed in the spatial portion of the third slit SL3 of the connection insulation wall 3*a*, the path needs to be blocked by the first insulating filler material GW1 in order to prevent the heat convection phenomenon.

For example, when the depths of the second slit SL2 and the third slit SL3 are 90 mm, a connection path of 10 mm needs to be formed when the first insulating filler material GW1 is formed to a length of 80 mm from the inlet of the first slit SL1, and thus the first insulating filler material GW1 needs to be formed in a length of at least 90 mm or more to block the connection path.

In addition, as shown in FIG. 40, the first insulating filler materials GW1 in the embodiment may be attached to both side surfaces of the connection insulation wall 3*a* facing a side surface of the fixed insulation wall 3*b* using an adhesive member 10.

Conventionally, the connection insulation wall 3*a* is installed between the adjacent fixed insulation walls 3*b* and then the first insulating filler material GW1 is inserted and installed using the jig, but in the embodiment, the connection insulation wall 3*a* in a state in which the first insulating filler materials GW1 are attached to both side surfaces thereof may be directly inserted and installed between the adjacent fixed insulation walls 3*b*, thereby reducing the number of installation processes. In this case, the first insulating filler material GW1 attached to the fixed insulation wall 3*b* may maintain a compressed state (reduced volume state) before the connection insulation wall 3*a* is inserted and installed between the adjacent fixed insulation walls 3*b* and may be in an uncompressed state (increased volume state) after the installation, thereby completely blocking the first slit SL1.

In the above description, the first insulating filler material GW1 in the embodiment has been described as partially filling the first slit SL1, but it goes without saying that in a state in which the first insulating filler material GW1 is variously formed such as being formed identically or similarly to the first insulating filler material GW1 in the fourth embodiment described with reference to FIGS. 33 to 35, after the first insulating filler materials GW1 are attached to both side surfaces of the connection insulation wall 3*a* using the adhesive member 10, the connection insulation wall 3*a* may be inserted and installed between the adjacent fixed insulation walls 3*b*.

Hereinafter, referring to FIGS. 43 to 47, in the liquefied gas storage tank 1 according to the embodiment and a liquefied gas storage tank 1' according to a comparative example, a comparison of convection paths that vary depending on the structures of the slits formed in the connection insulation wall 3*a* and the fixed insulation wall 3*b* and whether the insulating filler material for filling the slits is applied and a temperature difference due to the convection paths will be described.

Figure 43A:
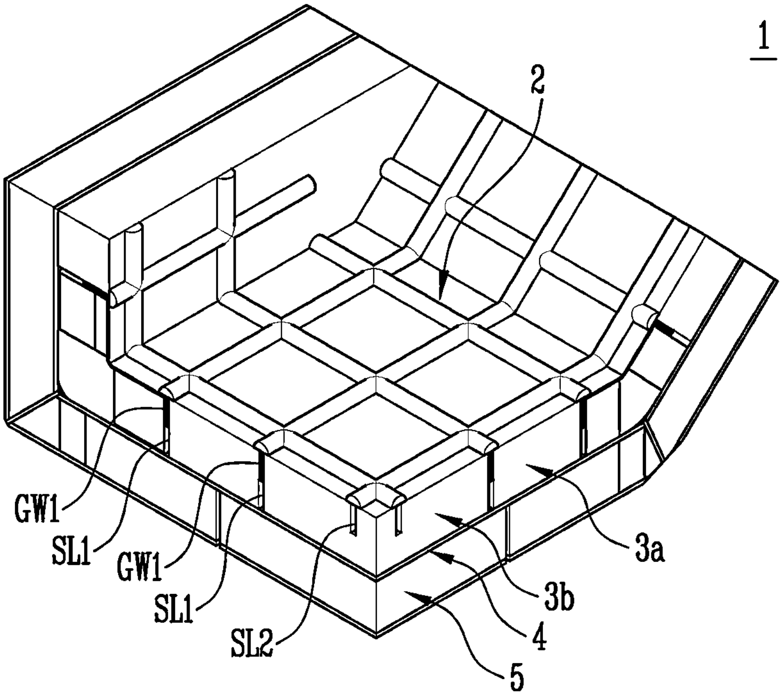
FIGS. 43 to 46 are views showing a comparison of convection paths and temperatures of secondary barriers that vary depending on a structure of the slit and whether the insulating filler material for filling the slit is applied thereto in the liquefied gas storage tank according to the fifth embodiment of the present invention and a liquefied gas storage tank according to a comparative example.

FIGS. 43A and 45 show the liquefied gas storage tank 1 according to the embodiment, and the connection insulation wall 3*a* and the fixed insulation wall 3*b* have the same configurations as described above. In the case of the right angle corner structure and the obtuse angle corner structure, those shown in FIGS. 25 and 26 are applied but the present invention is not limited thereto, and another right angle corner structure and obtuse angle corner structure may also be applied.

Figure 43B:
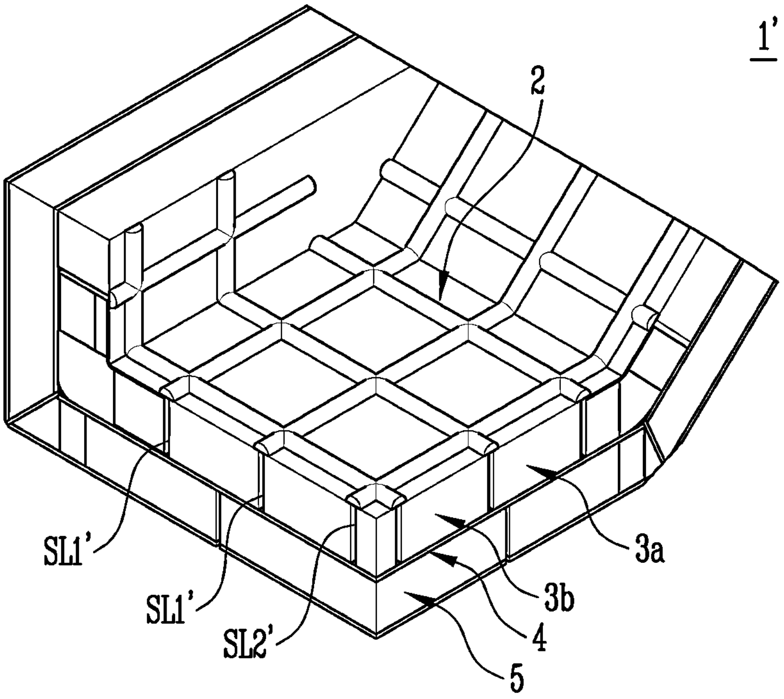

FIG. 43B shows the liquefied gas storage tank 1' according to the comparative example, and a first slit SL1' has the same depth as in the liquefied gas storage tank 1 according to the embodiment but the comparative example is different from the liquefied gas storage tank 1 according to the embodiment in that an first insulating filler material GW1 does not fill the first slit SL1' and a second slit SL2' is formed to a depth that is similar to the thickness of the fixed insulation wall 3*b*, and other configurations may be the same as or similar to those of the embodiment.

Figure 44A:
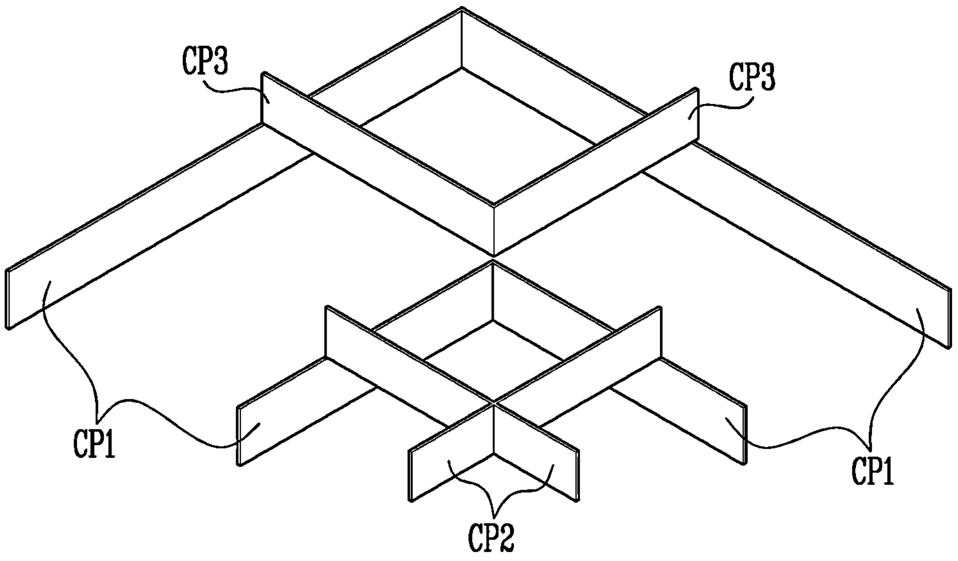

FIG. 44A shows first, second, and third convection paths CP1, CP2, and CP3 in the liquefied gas storage tank 1 according to the embodiment.

The first convection path CP1 is a path corresponding to the first slit SL1, which is the gap formed between the connection insulation wall 3*a* and the fixed insulation wall 3*b*, and it can be seen that the path is formed only to a lower spatial portion of the first slit SL1 as a convection blocking path CP1' is formed by the first insulating filler material GW1 above the first slit SL1.

The second convection path CP2 is a path corresponding to the second slit SL2 formed to a depth corresponding to about half of the thickness of the fixed insulation wall 3*b*, and it can be seen that the path is formed to the spatial portion of the second slit SL2 but is blocked at the portion of the first insulating filler material GW1 filling the first slit SL1.

The third convection path CP3 is a path corresponding to the third slit SL3 formed to a depth corresponding to about half of the thickness of the connection insulation wall 3*a*, and it can be seen that the path is formed to the spatial portion of the third slit SL3 but is blocked at the portion of the first insulating filler material GW1 filling the first slit SL1.

Figure 44B:
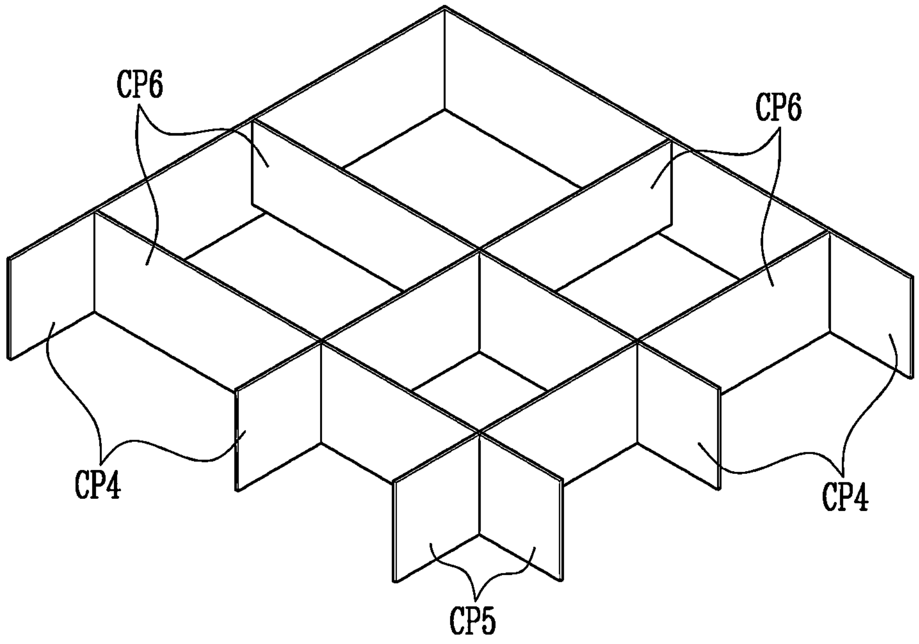

FIG. 44B shows fourth, fifth, and sixth convection paths CP4, CP5, and CP6 in the liquefied gas storage tank 1' according to the comparative example.

The fourth convection path CP4 is a path corresponding to the first slit SL1', which is the gap formed between the connection insulation wall 3*a* and the fixed insulation wall 3*b*, and unlike the embodiment, it can be seen that the path is formed to the entire spatial portion of the first slit SL1' because an insulating filler material does not fill the first slit SL1'.

The fifth convection path CP5 is a path corresponding to the second slit SL2' formed to the depth similar to the thickness of the fixed insulation wall 3*b*, and it can be seen that the fifth convection path CP5 formed to the spatial portion of the second slit SL2' is connected to the fourth convection path CP4 formed to the spatial portion of the first slit SL1'.

The sixth convection path CP6 is a path corresponding to the third slit (not shown) formed to the depth similar to the thickness of the connection insulation wall 3*a*, and it can be seen that the sixth convection path CP6 formed to the spatial portion of the third slit is connected to the fourth convection path CP4 and the fifth convection path CP5.

As described above, in the liquefied gas storage tank 1 according to the embodiment, it can be seen that the first, second, and third convection paths CP1, CP2, and CP3 are mutually intermittent and convection regions are reduced, and in the liquefied gas storage tank 1' according to the comparative example, it can be seen that the fourth, fifth, and sixth convection paths CP4, CP5, and CP6 are continuous and convection regions are increased.

In addition, as shown in FIG. 44B, in the liquefied gas storage tank 1' according to the comparative example, since each of the fourth, fifth, and sixth convection paths CP4, CP5, and CP6 forms a convection space from the primary barrier 2 to the secondary barrier 4, the temperature in the primary barrier 2 directly affects the secondary barrier 4, and thus the temperature is significantly reduced in the secondary barrier 4. On the other hand, in the liquefied gas storage tank 1 according to the embodiment, each of the first, second, and third convection paths CP1, CP2, and CP3 can prevent the temperature of the primary barrier 2 from being conducted to the secondary barrier 4 by the first insulating filler material GW1, and thus the temperature is less reduced in the secondary barrier 4 of the liquefied gas storage tank 1 according to the embodiment than in the liquefied gas storage tank 1' according to the comparative example.

Due to a difference in the convection paths, a temperature difference also occurs in the secondary barrier 4 of each of the liquefied gas storage tank 1 according to the embodiment and the liquefied gas storage tank 1' according to the comparative example.

As shown in FIGS. 45 and 46, when the unit elements are disposed adjacent to each other, a temperature sensor TL is attached close to the secondary barrier 4 in the spatial portion formed between the adjacent secondary insulation walls 5.

As a result of measuring the temperature through the temperature sensor TL in a state in which the temperature of the primary barrier 2 was −196° C. and the temperature of the hull 7 was 10° C., the temperature in the liquefied gas storage tank 1 according to the embodiment was −79.3° C., and the temperature in the liquefied gas storage tank 1' according to the comparative example was −100.9° C. As described above, it can be seen that the result is due to the fact that the convection path of the liquefied gas storage tank 1 according to the embodiment is intermittent and the convection region is reduced compared to the liquefied gas storage tank 1' according to the comparative example.

FIG. 47 is a graph showing a comparison between the temperatures of the secondary barriers 4 under the first slits SL1 and SL1' when an insulating filler material does not fill the first slit SL1' in the liquefied gas storage tank 1' according to the comparative example compared to a case in which the first insulating filler material GW1 fills the first slit SL1 in the liquefied gas storage tank 1 according to the embodiment.

In a state in which the temperature of the primary barrier 2 was −196° C. and the temperature of the hull 7 was 10° C., when heights of the first slits SL1 and SL1' were 0.2 mm, the temperature of the secondary barrier 4 under the first slit SL1 filled with the first insulating filler material GW1 according to the embodiment was about −90° C. (graph A), and the temperature of the secondary barrier 4 under the first slit SL1' not filled with an insulating filler material according to the comparative example was about −150° C. (graph B).

Therefore, it can be seen that the temperature is less reduced in the secondary barrier 4 of the liquefied gas storage tank 1 according to the embodiment than in the liquefied gas storage tank 1' according to the comparative example.

Figure 48:
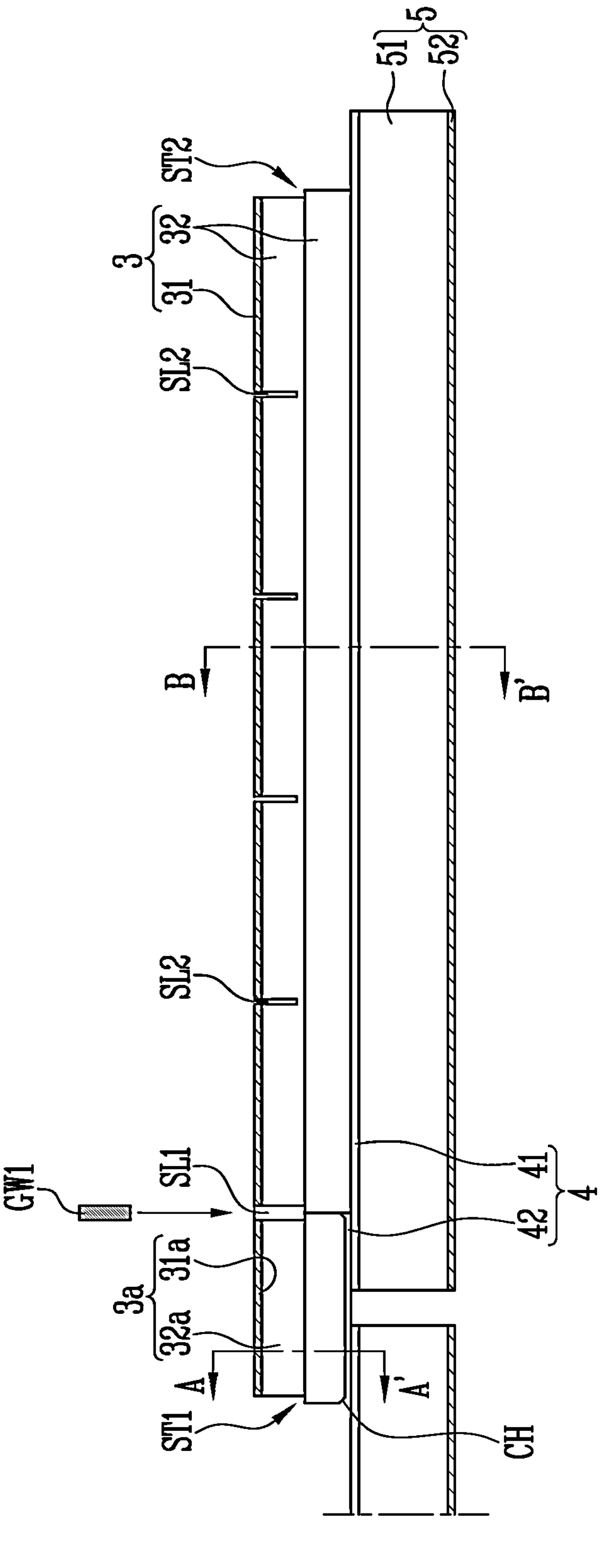
FIG. 48 is a partial cross-sectional view showing a liquefied gas storage tank according to a sixth embodiment of the present invention.
Figure 49:
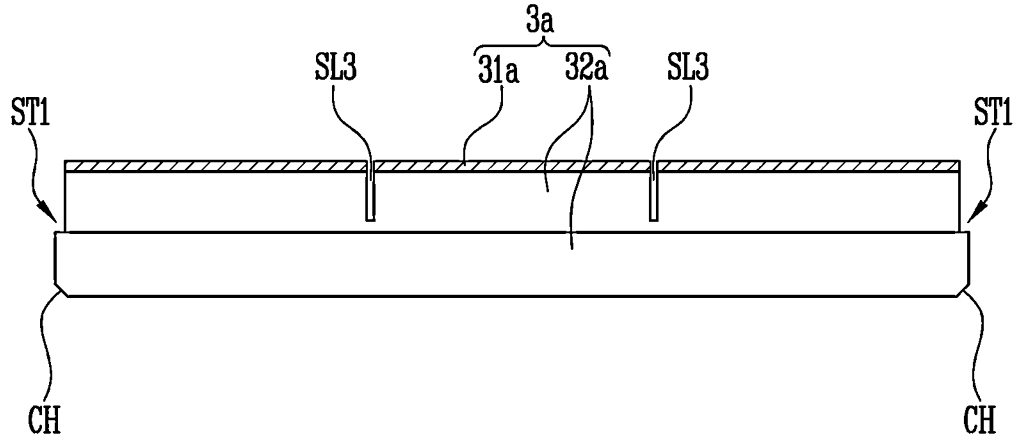
FIG. 49 is a cross-sectional view of a connection insulation wall along line A-A' in FIG. 48.
Figure 50:
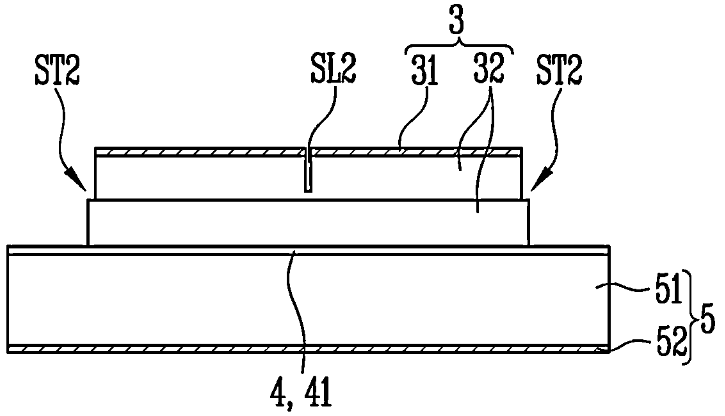
FIG. 50 is a cross-sectional view of a unit element formed by stacking a secondary insulation wall, a secondary barrier, and a fixed insulation wall constituting a primary insulation wall along line B-B' in FIG. 48.
Figure 51:
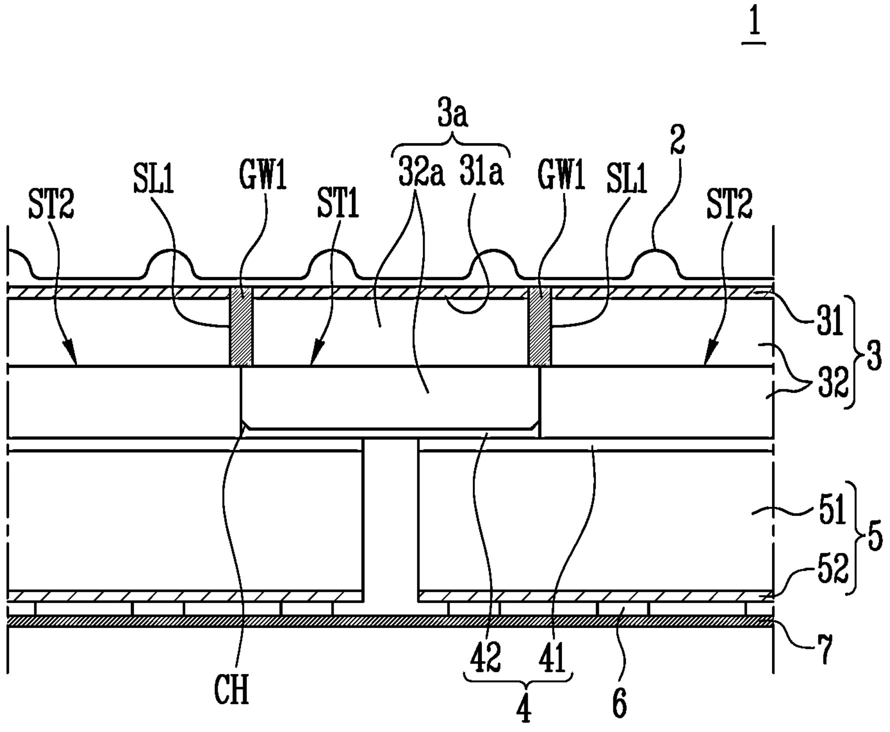
FIG. 51 is an enlarged view showing a state in which an insulating filler material fills a first slit forming a gap between a connection insulation wall and the fixed insulation wall, which constitute the primary insulation wall.

FIG. 48 is a partial cross-sectional view showing a liquefied gas storage tank according to a sixth embodiment of the present invention, FIG. 49 is a cross-sectional view of a connection insulation wall along line A-A' in FIG. 48, FIG. 50 is a cross-sectional view of a unit element formed by stacking a secondary insulation wall, a secondary barrier, and a fixed insulation wall constituting a primary insulation wall along line B-B' in FIG. 48, and FIG. 51 is an enlarged view showing a state in which an insulating filler material fills a first slit forming a gap between a connection insulation wall and the fixed insulation wall, which constitute the primary insulation wall.

As shown in FIGS. 48 to 51, the liquefied gas storage tank 1 according to the sixth embodiment of the present invention may include a primary barrier 2 in contact with liquefied gas therein, a primary insulation wall 3 installed outside the primary barrier 2 and including a connection insulation wall 3*a* and a fixed insulation wall 3*b*, a secondary barrier 4 installed outside the primary insulation wall 3, and a secondary insulation wall 5 disposed outside the secondary barrier 4 and fixed to a hull 7, and since the embodiment is different from the fifth embodiment in that steps ST1 and ST2 formed on side surfaces of each of the connection insulation wall 3*a* and the fixed insulation wall 3*b* are formed and other configurations are the same as or similar to those of the first embodiment, changed portions will be mainly described below in order to avoid overlapping descriptions.

The primary insulation wall 3 and the secondary insulation wall 5 in the embodiment may have the same or similar thickness as described above.

The primary insulation wall 3 may include the connection insulation wall 3*a* and the fixed insulation wall 3*b*, and in this case, the connection insulation wall 3*a* may be inserted and installed between the adjacent fixed insulation walls 3*b* to seal a space formed between the adjacent secondary insulation walls 5 when unit elements including the fixed insulation wall 3*b* are disposed adjacent to each other.

As shown in FIGS. 48 and 49, the connection insulation wall 3*a* may be divided into an upper portion and a lower portion, and front-rear and left-right widths of the upper portion may be formed to be smaller than front-rear and left-right widths of the lower portion, and thus the positive-shaped first steps ST1 may be formed on the front, rear, left, and right side surfaces of the connection insulation wall 3*a*.

The upper portion and the lower portion of the connection insulation wall 3*a* may be divided with respect to a position of about half of the thickness of the connection insulation wall 3*a* but are not limited thereto, and may be determined depending on the depth of the third slit SL3 formed to the depth that is similar to the thickness of the connection insulation wall 3*a*, which will be understood by the following description. Here, one or more third slits SL3 may be formed in the longitudinal direction of the connection insulation wall 3*a* and positioned collinearly with the second slit SL2 formed in the longitudinal direction when the connection insulation wall 3*a* is inserted and installed between the fixed insulation walls 3*b*.

In addition, as shown in FIGS. 48 and 49, negative-shaped chamfers CH may be formed at bottom edges of the connection insulation wall 3*a*.

The chamfer CH serves to facilitate insertion when the connection insulation wall 3*a* is installed between the adjacent fixed insulation walls 3*b*.

As shown in FIGS. 48 and 50, the fixed insulation wall 3*b* may be divided into an upper portion and a lower portion, and front-rear and left-right widths of the upper portion may be formed to be smaller than front-rear and left-right widths of the lower portion, and thus the positive-shaped second steps ST2 may be formed on front, rear, left, and right side surfaces of the fixed insulation wall 3*b*.

The upper portion and the lower portion of the fixed insulation wall 3*b* may be divided with respect to a position of about half of the thickness of the fixed insulation wall 3*b* but are not limited thereto, and may be determined depending on the depth of the second slit SL2 formed to the depth that is similar to the thickness of the fixed insulation wall 3*b*, which will be understood by the following description.

In the above description, the first step ST1 and the second step ST2 may have the same or similar shapes, and when the connection insulation wall 3*a* is inserted and installed between the adjacent fixed insulation walls 3*b*, the first slit SL1 defining the space while facing each other and filled with the first insulating filler material GW1 between the connection insulation wall 3*a* and the fixed insulation wall 3*b* may be formed.

In other words, when the connection insulation wall 3*a* is divided into the upper portion and the lower portion, the first step PS1 may be formed to have the front-rear and left-right widths of the upper portion smaller than the front-rear and left-right widths of the lower portion, and when the fixed insulation wall 3*b* is divided into the upper portion and the lower portion, the second step PS2 may be formed to have the front-rear and left-right widths of the upper portion smaller than the front-rear and left-right widths of the lower portion, and in this case, the first insulating filler material GW1 may fills the first slit SL1, which is the space provided between the upper portion of the connection insulation wall 3*a* and the upper portion of the fixed insulation wall 3*b* by installing the lower portion of the connection insulation wall 3*a* to be adjacent to the lower portion of the fixed insulation wall 3*b*. The first insulating filler material GW1 filling the first slit SL1 may be formed to have a (+) tolerance to completely seal the space in a state of filling the space of the first slip SL1, and thus the heat convection path is not generated in the first slit SL1 even upon contraction and expansion of the connection insulation wall 3*a* and the fixed insulation wall 3*b*.

For example, in order to insert the first insulating filler material GW1 having a thickness of 10 mm into the first slit SL1, the first slit SL1 has a minimum width of about 6 mm in consideration of the compressed state of the first insulating filler material GW1, and thus in the embodiment, a width between a side surface of the lower portion of the connection insulation wall 3*a* and a side surface of the lower portion of the fixed insulation wall 3*b* is installed to be 2 mm (generally, a distance between the connection insulation wall and the fixed insulation wall), a width of the first step ST1 provided on the connection insulation wall 3*a* may be formed to be 2 mm, and a width of the second step ST2 provided on the fixed insulation wall 3*b* may be formed to be 2 mm. Since the thickness of the first insulating filler material GW1 filling the first slit SL1 may vary, it goes without saying that the width of each of the first step ST1 and the second step ST2 in the embodiment may also vary.

In the embodiment, depths of the first step ST1 and the second step ST2 forming the first slit SL1 are not specially limited when the second slit SL2 or the third slit SL3 formed to the depth corresponding to about half of the thickness of the fixed insulation wall 3*b* or the connection insulation wall 3*a* is not formed, but needs to be limited to prevent the heat convection phenomenon when the second slit SL2 or the third slit SL3 is formed.

In other words, as described above in the fifth embodiment, in order to prevent the heat convection phenomenon through the slit, when considering that the first insulating filler material GW1 filling the first slit SL1 needs to be formed to be at least longer than a depth of the second slit SL2 or the third slit SL3, the depth of the first slit SL1 filled with the first insulating filler material GW1 in the embodiment needs to be formed to be greater than the depth of the second slit SL2 or the third slit SL3.

For example, when the depths of the second slit SL2 and the third slit SL3 not filled with an insulating filler material are 90 mm, the depth of the first slit SL1 filled with the first insulating filler material GW1 needs to be formed to be 90 mm or more, for example, 105 mm.

Figure 52:
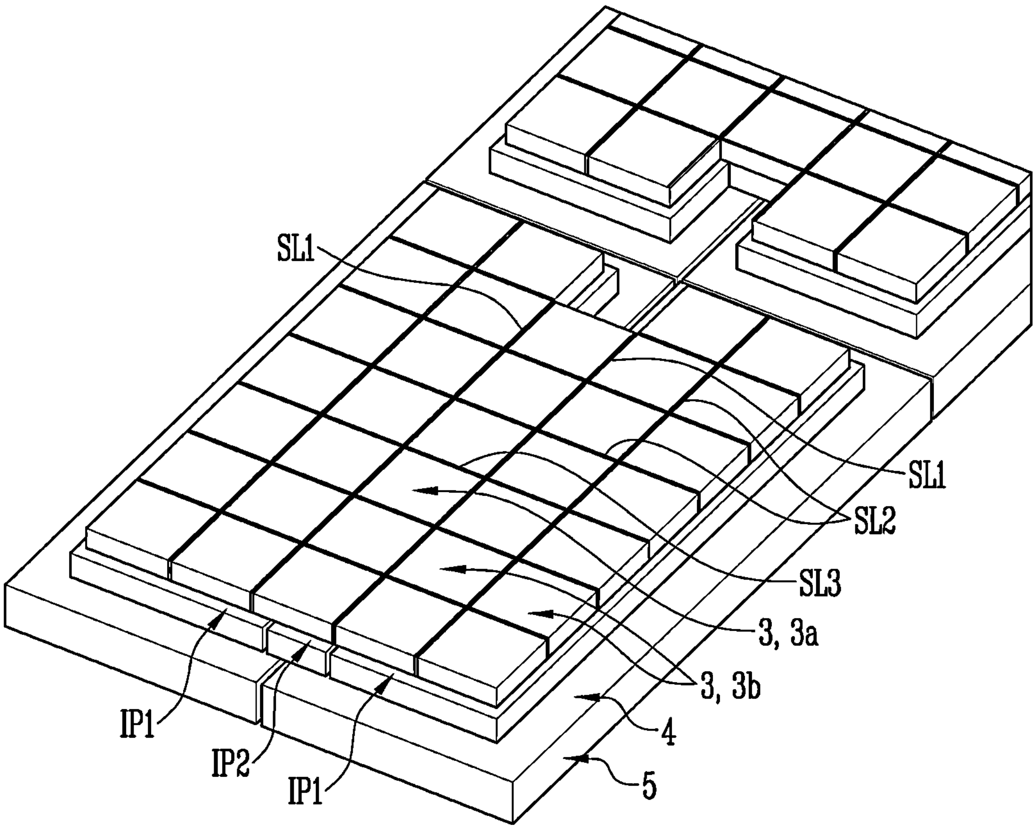
FIG. 52 is a perspective view showing a liquefied gas storage tank according to a seventh embodiment of the present invention.
Figure 53A:
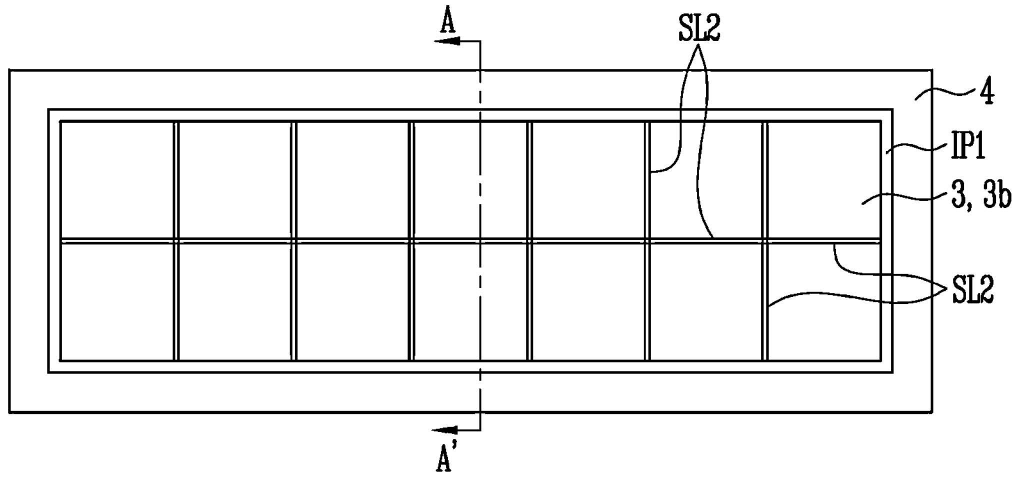
FIGS. 53A to 53C are plane, side, and cross-sectional views of the unit element in which the secondary insulation wall, the secondary barrier, and the fixed insulation wall constituting a primary insulation wall in FIG. 52 are stacked.
Figure 53B:
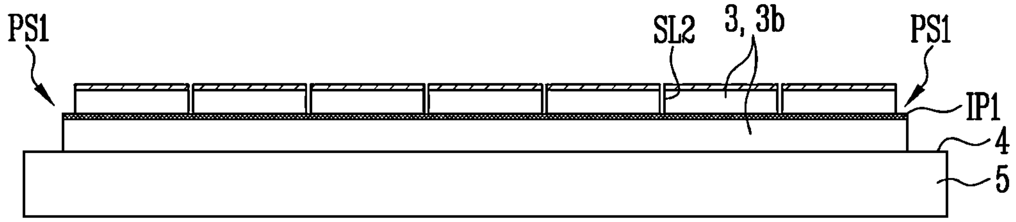
Figure 53C:
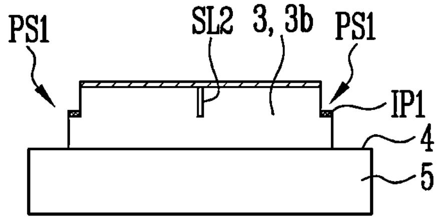
Figure 54A:
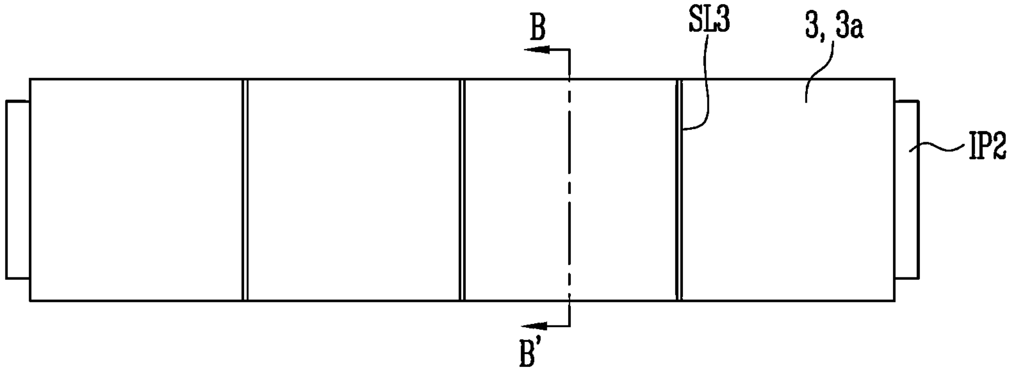
FIGS. 54A to 54C are plane, side, and cross-sectional views of the connection insulation wall constituting the primary insulation wall in FIG. 52.
Figure 54B:
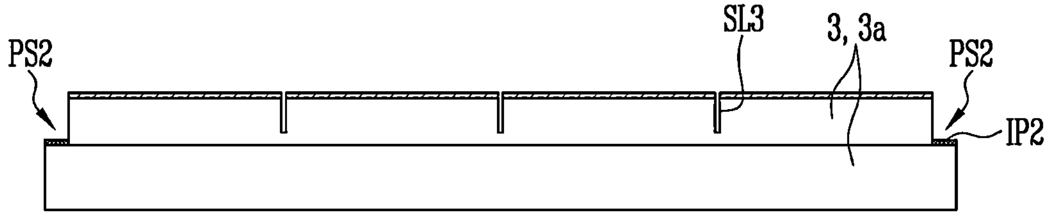
Figure 54C:
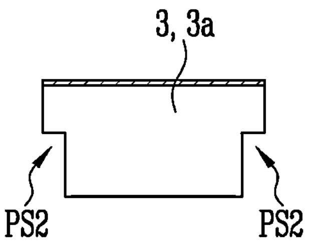
Figure 55A:
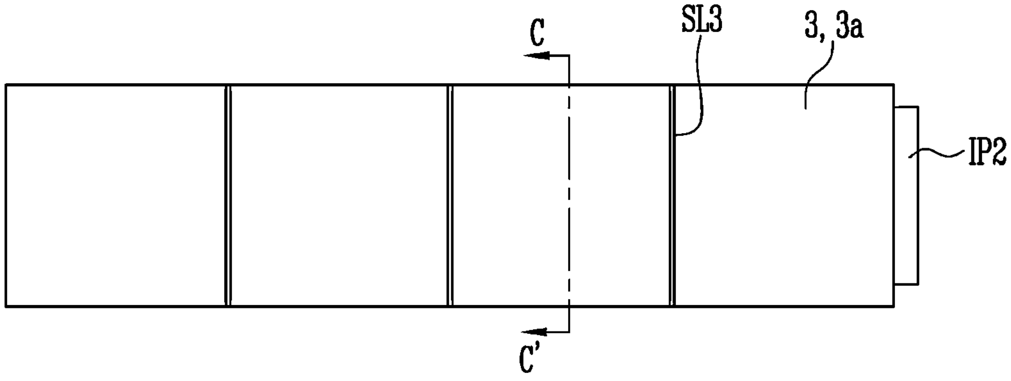
FIGS. 55A to 55C are plane, side, and cross-sectional views of a connection insulation wall according to another embodiment constituting the primary insulation wall in FIG. 52.
Figure 55B:
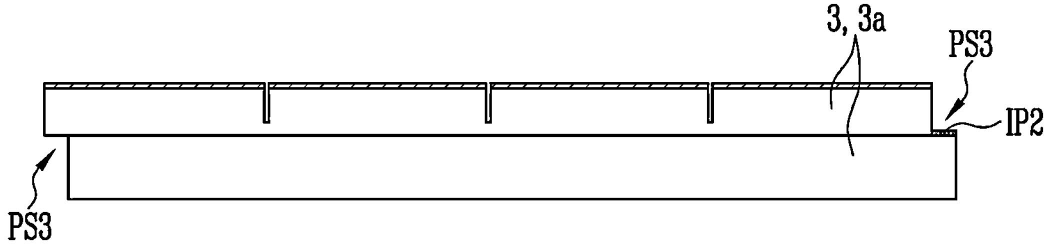
Figure 55C:
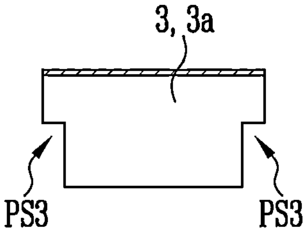
Figure 56:
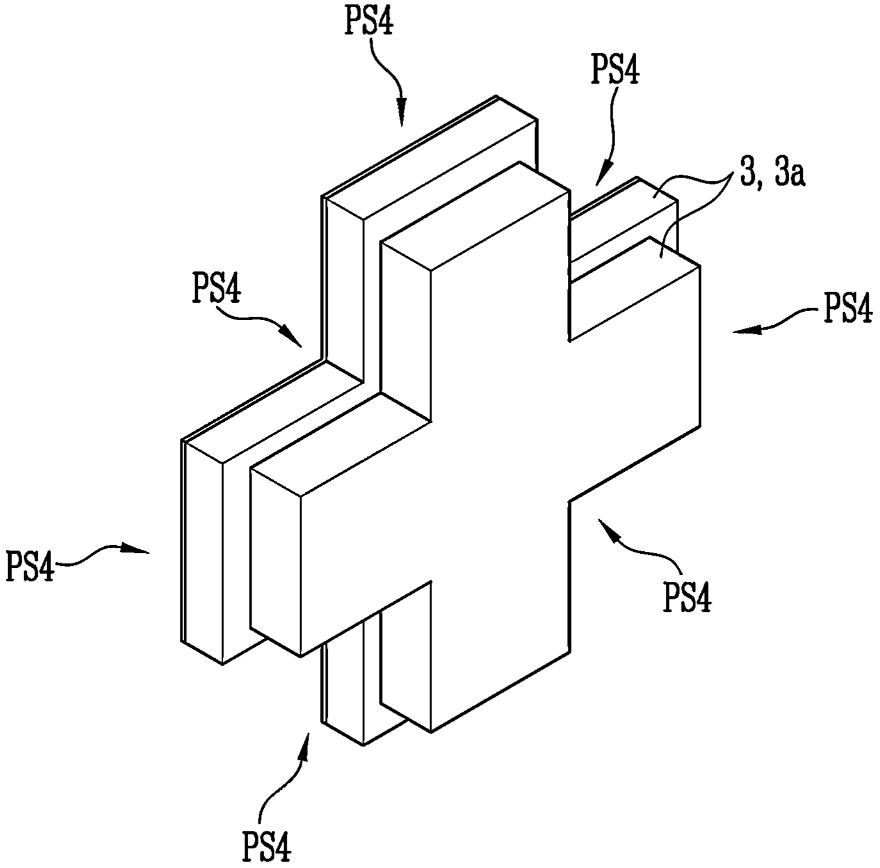
FIG. 56 is a rear perspective view of a connection insulation wall according to still another embodiment constituting the primary insulation wall in FIG. 52.
Figure 57:
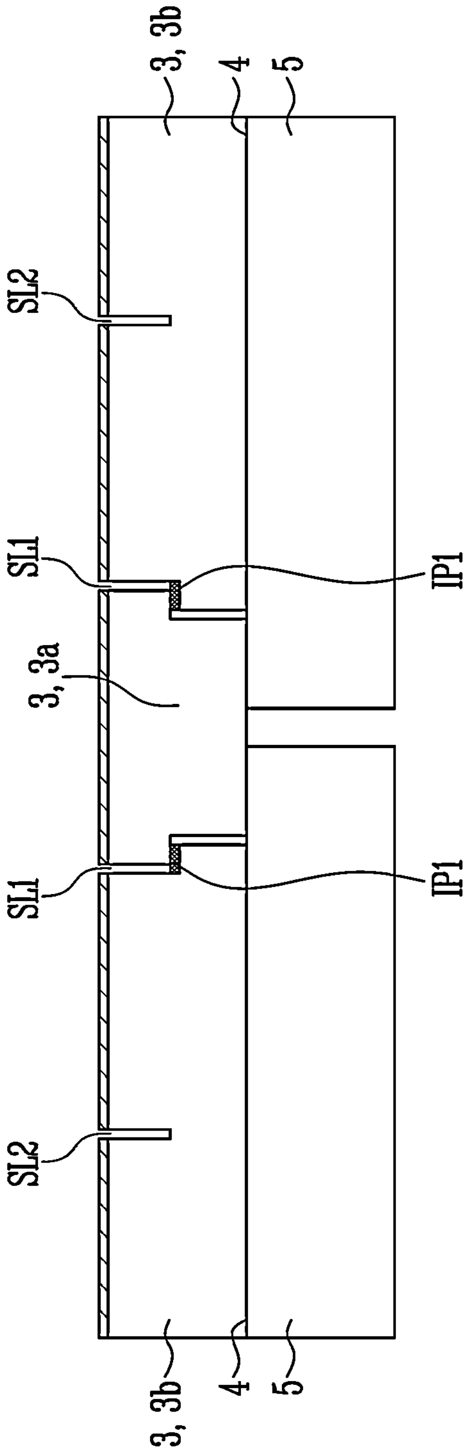
FIG. 57 is a cross-sectional view of a portion in which the fixed insulation wall and the connection insulation wall, which constitute the primary insulation wall, are alternately connected.
Figure 58:
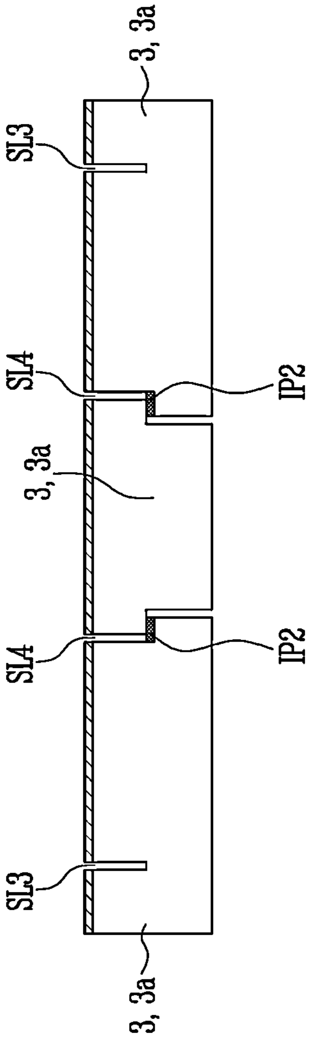
FIG. 58 is a cross-sectional view of a portion in which a plurality of connection insulation walls constituting the primary insulation wall are consecutively connected.

FIG. 52 is a perspective view showing a liquefied gas storage tank according to a seventh embodiment of the present invention, FIGS. 53A to 53C are plane, side, and cross-sectional views of a unit element in which the secondary insulation wall, the secondary barrier, and the fixed insulation wall constituting the primary insulation wall in FIG. 52 are stacked, FIGS. 54A to 54C are plane, side, and cross-sectional views of a connection insulation wall constituting the primary insulation wall in FIG. 52, FIGS. 55A to 55C are plane, side, and cross-sectional views of a connection insulation wall according to another embodiment constituting the primary insulation wall in FIG. 52, FIG. 56 is a rear perspective view of a connection insulation wall according to still another embodiment constituting the primary insulation wall in FIG. 52, FIG. 57 is a cross-sectional view of a portion in which the fixed insulation wall and the connection insulation wall, which constitute the primary insulation wall, are alternately connected, and FIG. 58 is a cross-sectional view of a portion in which a plurality of connection insulation walls constituting the primary insulation wall are consecutively connected.

In the above description, FIG. 53C is a cross-sectional view of the connection insulation wall along line A-A' in FIG. 53A, FIG. 54C is a cross-sectional view of the connection insulation wall along line B-B' in FIG. 54A, and FIG. 55C is a cross-sectional view of the connection insulation wall along line C-C' in FIG. 55A.

As shown in FIGS. 52 to 58, the liquefied gas storage tank 1 according to the seventh embodiment of the present invention may include a primary barrier in contact with liquefied gas therein, a primary insulation wall 3 installed outside the primary barrier and composed of a connection insulation wall 3*a* and a fixed insulation wall 3*b*, a secondary barrier 4 installed outside the primary insulation wall 3, and a secondary insulation wall 5 disposed outside the secondary barrier 4 and fixed to a hull 7, and since the embodiment is different from the fifth embodiment in that steps PS1, PS2, PS3, and PS4 formed on side surfaces of each of the connection insulation wall 3*a* and the fixed insulation wall 3*b* are formed and the steps PS1, PS2, PS3, and PS4 are finished with insulation pads IP1 and IP2 and other configurations are the same as or similar to those of the first embodiment, changed portions will be mainly described below in order to avoid overlapping descriptions.

The primary insulation wall 3 and the secondary insulation wall 5 in the embodiment may have the same or similar thickness as described above.

The primary insulation wall 3 may include the connection insulation wall 3*a* and the fixed insulation wall 3*b*, and in this case, the connection insulation wall 3*a* may be inserted and installed between the adjacent fixed insulation walls 3*b* to seal a space formed between the adjacent secondary insulation walls 5 when unit elements including the fixed insulation wall 3*b* are disposed adjacent to each other. Hereinafter, front, rear, left, and right side surfaces of the fixed insulation wall 3*b* are defined as side surfaces connected to front and rear side surfaces of the connection insulation wall 3*a*, and left and right side surfaces of the connection insulation wall 3*a* are defined as side surfaces connected to a left side surface or a right side surface of another adjacent connection insulation wall 3*a*.

As shown in FIGS. 52 and 53A to 53C, the fixed insulation wall 3*b* may be divided into an upper portion and a lower portion. The upper portion and the lower portion of the fixed insulation wall 3*b* may be divided with respect to a position of about half of a thickness of the fixed insulation wall 3*b*, but are not limited thereto.

The fixed insulation wall 3*b* may be formed to have front-rear and left-right widths of the upper portion smaller than front-rear and left-right widths of the lower portion, and thus the positive-shaped first steps PS1 may be formed on the front, rear, left, and right side surfaces of the fixed insulation wall 3*b*.

The first step PS1 may overlap front and rear side surfaces of the second step PS2, the third step PS3, or the fourth step PS4 formed on the connection insulation wall 3*a* to be described below on the front, rear, left, and right side surfaces of the fixed insulation wall 3*b* to form the first slits SL1 as shown in FIG. 57. The first insulation pad IP1 may be formed to be bonded on the first step PS1 of the fixed insulation wall 3*b*, and the first insulation pad IP1 will be described below.

As shown in FIGS. 52, 54A to 54C, and 56A to 56C, the connection insulation wall 3*a* may be divided into an upper portion and a lower portion. The upper portion and the lower portion of the connection insulation wall 3*a* may be divided with respect to a position of about half of the thickness of the connection insulation wall 3*a*, but are not limited thereto.

The connection insulation wall 3*a* is inserted and installed into a linear spatial portion formed between two adjacent fixed insulation walls 3*b* and as shown in FIGS. 54A to 54C, may be formed have a front-rear width of the upper portion greater than a front-rear width of the lower portion and a left-right width of the upper portion smaller than a left-right width of the lower portion so that the second step PS2 may be formed on the front, rear, left, and right side surfaces thereof.

The second step PS2 may have a positive shape on the left and right side surfaces of the connection insulation wall 3*a* as shown in FIG. 54B and have a negative shape on the front and rear side surfaces of the connection insulation wall 3*a* as shown in FIG. 54C.

When a plurality of other connection insulation walls are consecutively inserted and installed into the linear spatial portions formed between the two adjacent fixed insulation walls 3*b*, the second step PS2 having the positive shape on the left and right side surfaces of the connection insulation wall 3*a* may overlap steps formed in the negative shape on side surfaces of the other connection insulation walls connected adjacent thereto to form a fourth slit SL4 as shown in FIG. 58. The second insulation pad IP2 may be formed on the second step PS2 having the positive shape on the left and right side surfaces of the connection insulation wall 3*a*, and the second insulation pad IP2 will be described below. Here, the other connection insulation walls may be the connection insulation wall 3*a* having the third steps PS3 having the negative shape on one side surface thereof as shown in FIG. 55B or the connection insulation wall 3*a* having the fourth steps PS4 having the negative shape in recesses of the front, rear, left, and right side surfaces thereof.

When the connection insulation wall 3*a* is inserted and installed between the two adjacent fixed insulation walls 3*b*, the second steps PS2 having the negative shape on the front and rear side surfaces of the connection insulation wall 3*a* may overlap the first steps PS1 having the positive shape on the front, rear, left, and right side surfaces of the fixed insulation wall 3*b* to form the first slits SL1 as shown in FIG. 57.

In addition, the connection insulation wall 3*a* is inserted and installed into the linear spatial portion formed between the two adjacent fixed insulation walls 3*b* and as shown in FIG. 55A to 55C, may have the front-rear width of the upper portion formed to be greater than the front-rear width of the lower portion and the left-right width of the upper portion formed to be the same as the left-right width of the lower portion and may be alternately formed on the left and right side surfaces to form the third steps PS3 on the front, rear, left, and right side surfaces of the connection insulation wall 3*a*.

As shown in FIG. 55B, the third step PS3 may have the negative shape on one side surface of the left and right side surfaces of the connection insulation wall 3*a* and the positive shape on the other side surface and have the negative shape on the front and rear side surfaces of the connection insulation wall 3*a* as shown in FIG. 54C.

When the plurality of other connection insulation walls are consecutively inserted and installed into the linear spatial portion formed between the two adjacent fixed insulation walls 3*b*, the third step PS3 having the negative shape on the left and right side surfaces of the connection insulation wall 3*a* may overlap steps formed in the positive shape on side surfaces of the other connection insulation walls connected adjacent to each other to form the fourth slit SL4 as shown in FIG. 58. Here, the other connection insulation walls may be the connection insulation wall 3*a* having the second steps PS2 having the positive shape on the left and right side surfaces thereof as shown in FIG. 54B or the connection insulation wall 3*a* having the third step PS3 having the positive shape on one of the left and right side surfaces thereof as shown in FIG. 55B.

When the plurality of other connection insulation walls are consecutively inserted and installed into the linear spatial portion formed between the two adjacent fixed insulation walls 3*b*, the third step PS3 having the positive shape among the left and right side surfaces of the connection insulation wall 3*a* may overlap steps formed in the negative shape on side surfaces of the other connection insulation walls connected adjacent to each other to form the fourth slit SL4 as shown in FIG. 58. The second insulation pad IP2 may be formed on the third step PS3 having the positive shape among the left and right side surfaces of the connection insulation wall 3*a*, and the second insulation pad IP2 will be described below. Here, another connection insulation wall may be the connection insulation wall 3*a* having the third step PS3 having the negative shape on one side surface thereof as shown in FIG. 55B or the connection insulation wall 3*a* having the fourth steps PS4 having the negative shape in recesses of the front, rear, left, and right side surfaces thereof.

In addition, the connection insulation walls 3*a* are inserted and installed into spatial portions having a cross shape formed between the four adjacent fixed insulation walls 3*b* and as shown in FIG. 56, may be formed to have the front-rear and left-right widths of the upper portion greater than the front-rear and left-right widths of the lower portion so that the fourth steps PS4 may be formed on the front, rear, left, and right side surfaces thereof.

The fourth step PS4 may have the negative shape at the protrusions of the front, rear, left, and right side surfaces of the connection insulation wall 3*a* and in recesses of the front, rear, left, and right side surfaces thereof.

When the connection insulation walls 3*a* are inserted and installed into the spatial portions having the cross shape formed between the four adjacent fixed insulation walls 3*b*, the fourth step PS4 having the negative shape at the protrusions of the front, rear, left, and right side surfaces of the connection insulation wall 3*a* may overlap the steps formed in the positive shape on the side surfaces of the other connection insulation walls installed in the linear spatial portion formed between the two adjacent fixed insulation walls 3*b* to form the fourth slit SL4 as shown in FIG. 58. Here, the other connection insulation walls may be the connection insulation wall 3*a* having the second steps PS2 having the positive shape on the left and right side surfaces thereof as shown in FIG. 54B or the connection insulation wall 3*a* having the third steps PS3 having the positive shape on one of the left and right side surfaces thereof as shown in FIG. 55B.

When the connection insulation walls 3*a* are inserted and installed into the spatial portions having the cross shape formed between the four adjacent fixed insulation walls 3*b*, the fourth steps PS4 having the negative shape in recesses of the front, rear, left, and right side surfaces of the connection insulation wall 3*a* may overlap the first steps PS1 having the positive shape on the front, rear, left, and right side surfaces of each of the four adjacent fixed insulation walls 3*b* to form the first slits SL1 as shown in FIG. 57.

As shown in FIG. 57, the first slit SL1 in the embodiment is the space formed between the fixed insulation wall 3*b* and the connection insulation wall 3*a* by overlapping between a first negative step formed on the side surface of the connection insulation wall 3*a* and a first positive step formed on the side surface of the fixed insulation wall 3*b* when the connection insulation wall 3*a* is inserted and installed between the adjacent fixed insulation walls 3*b* and has a bent shape. Here, the first positive step formed on the side surface of the fixed insulation wall 3*b* may be the first steps PS1 having the positive shape formed on the front, rear, left, and right side surfaces of the fixed insulation wall 3*b*, and the first negative step formed on the side surface of the connection insulation wall 3*a* may be the second steps PS2 or the third steps PS3 formed on the front and rear side surfaces of the connection insulation wall 3*a* or the fourth steps PS4 formed in the recesses of the front, rear, left, and right side surfaces of the connection insulation wall 3*a*.

Although the heat convection phenomenon is reduced in the first slit SL1 having the bent shape when compared to a slit having a linear shape, the heat convection phenomenon may occur through the space of the first slit SL1.

Therefore, in the embodiment, the first insulation pads IP1 are formed to be bonded on the first steps PS1 formed in the positive shape on the front, rear, left, and right side surfaces of the fixed insulation wall 3*b* in order to prevent the heat convection phenomenon.

The first insulation pad IP1 may be formed to be bonded on the first positive step formed on the side surface of the fixed insulation wall 3*b* facing the connection insulation wall 3*a* and compressed by the first negative step formed on the side surface of the connection insulation wall 3*a* facing the fixed insulation wall 3*b* in a state of not being bonded to the connection insulation wall 3*a* when the connection insulation wall 3*a* is installed between the adjacent fixed insulation walls 3*b*, thereby blocking the spatial portion of the first slit SL1.

The first insulation pad IN may be made of an insulating material such as glass wool, but is not limited thereto.

In addition, as shown in FIG. 58, the fourth slit SL4 in the embodiment is the space formed between the adjacent connection insulation walls 3*a* by overlapping between a second positive step formed on a side surface of any one connection insulation wall 3*a* of the adjacent connection insulation walls 3*a* and a second negative step formed on a side surface of the other connection insulation wall 3*a* and has a bent shape. Here, the second positive step formed on the side surface of any one connection insulation wall 3*a* may be the second steps PS2 or the third steps PS3 formed on at least any one of the left and right side surfaces of the connection insulation wall 3*a*, and the second negative step formed on the side surface of the other connection insulation wall 3*a* may be the third steps PS3 formed on at least any one of the left and right side surfaces of the connection insulation wall 3*a* or the fourth steps PS4 formed on the protrusions of the front, rear, left, and right side surfaces of the connection insulation wall 3*a*.

Although the heat convection phenomenon is more reduced in the fourth slit SL4 having the bent shape than the slit having the linear shape, the heat convection phenomenon may occur through the space of the fourth slit SL4.

Therefore, in the embodiment, in order to prevent the heat convection phenomenon, the second insulation pads IP2 are formed to be bonded on the second positive steps among the second positive steps or the second negative steps formed on the left and right side surfaces of the adjacent connection insulation walls 3*a*.

The second insulation pad IP2 may be formed to be bonded on the second positive step formed on the side surface of any one of the adjacent connection insulation walls 3*a* and compressed by the second negative step formed on the side surface of the other connection insulation wall 3*a* among the adjacent connection insulation walls 3*a* when the adjacent connection insulation walls 3*a* are consecutively installed between the adjacent fixed insulation walls 3*b*, thereby blocking the spatial portion of the fourth slit SL4.

The second insulation pad IP2 may be made of an insulating material such as glass wool, but is not limited thereto.

In the embodiment, a width of each of the first, second, third, and fourth steps PS1, PS2, PS3, and PS4 may be the same or similar, for example, 30 mm, and is not limited thereto.

In addition, the width of each of the first and fourth slits SL1 and SL4 may be the same or similar, and for example, the width between the side surface of the upper portion of the connection insulation wall 3*a* and the side surface of the upper portion of the fixed insulation wall 3*b* may be 2 mm, and the width between the side surface of the lower portion of the connection insulation wall 3*a* and the side surface of the lower portion of the fixed insulation wall 3*b* may be 2 mm, but the present invention is not limited thereto.

In addition, a thickness and a width of each of the first and second insulation pads IP1 and IP2 may be the same or similar, and for example, the thickness may be 10 mm and the width may be 30 mm, but the present invention is not limited thereto.

As described above, in the embodiment, by forming the thickness of the primary insulation wall 3 and 3*a* from the total thickness of the primary insulation wall 3 including the connection insulation wall 3*a* and the secondary insulation wall 5 identically or similarly to that of the secondary insulation wall 5, it is possible to not only maintain the mechanical strength of the secondary insulation wall 5 to the predetermined level but also reduce the low-temperature load and the sloshing load of the secondary barrier 4, thereby preventing the damage to the secondary barrier 4.

In addition, in the embodiment, by providing the auxiliary insulation plate 33 on the lower surface of the connection insulation wall 3*a* provided in the space between the adjacent primary insulation walls 3 constituting the unit element, it is possible to further increase the insulation performance of the connected portion between the adjacent secondary insulation walls 5 constituting the unit element.

In addition, in the embodiment, it is possible to improve the configuration of the secondary barrier 4, thereby increasing the insulation performance.

In addition, in the embodiment, by applying the non-adhesive elastic insulating material to the leveling member 8 of the secondary insulation wall 5 between the secondary insulation wall 5 and the hull 7, it is possible to level the deformed portion of the hull 7 even without using the existing mastic and leveling wedge, thereby increasing the insulation performance of the tank.

In addition, in the embodiment, by fixing the unit panels of the adjacent secondary insulation walls in the cleat structure method by the protrusions 91 provided to protrude outward from the lower side surface of the unit panel of the secondary insulation wall 5 and the stud bolt 92 fixed to the hull 7, it is possible to reduce the number of processes compared to the method of making the hole in the secondary insulation wall 5 and fixing the unit panel using the stud bolt.

In addition, in the embodiment, by improving the structure of the slit and providing various insulating filler materials for filling the slit in order to optimize the slit provided to cope with the contraction and expansion of the primary insulation wall 3 formed on the secondary barrier 4 and minimize the convection phenomenon caused through the slit and an amount of the heat transferred into the secondary barrier 4, it is possible to enhance the stability of the primary insulation wall 3 due to the formation of the slit and also reduce the low-temperature load of the secondary barrier 4, thereby preventing the damage to the primary insulation wall 3 and the secondary barrier 4.

The present invention is not limited to the above-described embodiments and may include a combination of the embodiments or a combination of at least one of the embodiments and known technologies as another embodiment. For example, the embodiments of FIGS. 28 and 29 may be combined with the embodiments of FIGS. 4 to 27. In addition, the embodiment of FIGS. 30 and 31 may be, for example, combined with the insulation system of FIGS. 1 and 2 or the insulation system of FIGS. 28 and 29. In addition, the embodiments of FIGS. 32 to 58 may be, for example, combined with the embodiments of FIGS. 1 to 31 are possible.

Although the present invention has been described above in detail through specific embodiments, this is to specifically describe the present invention, the present invention is not limited thereto, and it will be apparent that modifications or improvements thereof are possible by those skilled in the art without departing from the technical spirit of the present invention.

All simple modifications or changes of the present invention fall within the scope of the present invention, and the specific scope of the present invention will be clarified by the appended claims.

[Description of reference numerals]

1, 1': liquefied gas storage tank
2: primary barrier
21: planar portion
22: curved portion
23: interface
3: primary insulation wall
3b: fixed insulation wall
31: primary plywood
32: primary insulating material
3a: connection insulation wall
31a: connection plywood
32a: connection insulating material
33: auxiliary insulation plate
4: secondary barrier
41: main barrier
42: auxiliary barrier
GAC: glass-aramid cloth
AF: aluminum foil
GC: glass cloth
BC: basalt cloth
5: secondary insulation wall
51: secondary insulating material
52: secondary plywood
6: mastic
7: hull
8: leveling member
9: fixing member
91: protrusion
92: stud bolt
10: adhesive member
SL1, SL1': first slit
SL2, SL2': second slit
SL3: third slit
SL4: fourth slit
GW1: first insulating filler material
GW1-1: first upper insulating filler material
GW1-2: first middle insulating filler material
GW1-3: first lower insulating filler material
GW2: second insulating filler material
GW2-1: second upper insulating filler material -continued

| [Description of reference numerals] |
|---|
| GW2-2: second middle insulating filler material |
| GW2-3: second lower insulating filler material |
| CP1: first convection path |
| CP1': convection blocking path |
| CP2: second convection path |
| CP3: third convection path |
| CP4: fourth convection path |
| CP5: fifth convection path |
| CP6: sixth convection path |
| TL: temperature sensor |
| ST1: first step |
| ST2: second step |
| CH: chamfer |
| IP1: first insulation pad |
| IP2: second insulation pad |
| PS1: first step |
| PS2: second step |
| PS3: third step |
| PS4: fourth step |

The invention claimed is:

1. A liquefied gas storage tank that stores cryogenic substances, comprising a primary barrier, a primary insulation wall, a secondary barrier, and a secondary insulation wall, wherein, in a state in which unit elements, each of which is formed by stacking the secondary insulation wall, the secondary barrier, and a fixed insulation wall that is a part of the primary insulation wall, are disposed adjacent to each other, the primary insulation wall includes a connection insulation wall provided in a spatial portion between and separating the adjacent fixed insulation walls, wherein the fixed insulation wall has a smaller width than the secondary insulation wall included in the unit element, and the connection insulation wall is installed in a spatial portion between the adjacent primary insulation walls in which the secondary barrier is exposed, a first slit formed between the fixed insulation wall and the connection insulation wall when the connection insulation wall is inserted and installed between the adjacent fixed insulation walls, a plurality of second slits formed in an upper portion in a longitudinal direction and a width direction of the fixed insulation wall, and a first insulating filler material filling the first slit.

2. The liquefied gas storage tank of claim 1, wherein the first insulating filler material is formed to fully fill the first slit, formed to fill the first slit from an inlet of the first slit to a predetermined depth so that a space is formed in a lower portion of the first slit, or formed to fill an inside of the first slit in multiple layers so that a plurality of spaces are formed inside the first slit.

3. The liquefied gas storage tank of claim 2, wherein, when the first insulating filler material is formed to fill the inside of the first slit in multiple layers so that the plurality of spaces are formed inside the first slit, the first insulating filler material includes:

a first upper insulating filler material formed in an upper portion of the first slit;

a first middle insulating filler material spaced a predetermined interval from the first upper insulating filler material and formed in a middle of the first slit; and a first lower insulating filler material spaced a predetermined interval from the first middle insulating filler material and formed in a lower portion of the first slit, each of the first upper insulating filler material, the first middle insulating filler material, and the first lower insulating filler material is formed of the same insulating material or different insulating materials, and the insulating material includes glass wool, super lite, a soft-foam material, or an aerogel blanket.

4. The liquefied gas storage tank of claim 1, wherein the first insulating filler material fills the first slit in an insertion method using a jig after the connection insulation wall is inserted and installed between the adjacent fixed insulation walls, or fills the first slit by inserting and installing the connection insulation wall between the adjacent fixed insulation walls in a state of being bonded to both side surfaces of the connection insulation wall facing a side surface of the fixed insulation wall using an adhesive member.

5. The liquefied gas storage tank of claim 1, wherein the second slit is filled with a second insulating filler material therein when formed to a depth similar to a thickness of the fixed insulation wall, and the second insulating filler material is formed to fill the second slit from an inlet of the second slit to a predetermined depth so that a space is formed in a lower portion of the second slit, or formed to fill an inside of the second slit in multiple layers so that a plurality of spaces are formed inside the second slit.

6. The liquefied gas storage tank of claim 5, wherein, when the second insulating filler material is formed to fill the inside of the second slit in multiple layers so that the plurality of spaces are formed inside the second slit, the second insulating filler material includes a second upper insulating filler material formed in an upper portion of the second slit, a second middle insulating filler material spaced a predetermined interval from the second upper insulating filler material and formed in a middle of the second slit, and a second lower insulating filler material spaced a predetermined interval from the second middle insulating filler material and formed in a lower portion of the second slit, each of the second upper insulating filler material, the second middle insulating filler material, and the second lower insulating filler material is formed of the same insulating material or different insulating materials, and the insulating material includes glass wool, super lite, a soft-foam material, or an aerogel blanket.

7. The liquefied gas storage tank of claim 1, comprising one or more third slits formed in a longitudinal direction of the connection insulation wall and positioned collinearly with the second slit formed in the longitudinal direction when the connection insulation wall is inserted and installed between the fixed insulation walls, wherein the second slit and the third slit are formed to a depth corresponding to about half of thicknesses of the fixed insulation wall and the connection insulation wall and are not filled with an insulating filler material therein, the first insulating filler material is formed to be at least longer than a depth of each of the second slit and the third slit, and a heat convection path through the first slit, the second slit, and the third slit is intermittently formed.

8. The liquefied gas storage tank of claim 1, wherein the primary insulation wall and the secondary insulation wall have the same or similar thickness.

9. A liquefied gas storage tank that stores cryogenic substances, comprising a primary barrier, a primary insulation wall, a secondary barrier, and a secondary insulation wall, wherein, in a state in which unit elements, each of which is formed by stacking the secondary insulation wall, the secondary barrier, and a fixed insulation wall that is a part of the primary insulation wall, are disposed adjacent to each other, the primary insulation wall includes a connection insulation wall provided in a spatial portion between and separating the adjacent fixed insulation walls, wherein the fixed insulation wall has a smaller width than the secondary insulation wall included in the unit element, and the connection insulation wall is installed in a spatial portion between the adjacent primary insulation walls in which the secondary barrier is exposed, first steps formed on front, rear, left, and right side surfaces of the connection insulation wall, second steps formed on front, rear, left, and right side surfaces of the fixed insulation wall, first slits formed by the first steps and the second steps between the connection insulation wall and the fixed insulation wall when the connection insulation wall is inserted and installed between the adjacent fixed insulation walls, and a first insulating filler material filling the first slits.

10. The liquefied gas storage tank of claim 9, wherein the first step is formed so that front-rear and left-right widths of an upper portion of the connection insulation wall is smaller than front-rear and left-right widths of a lower portion of the connection insulation wall, the second step is formed so that front-rear and left-right widths of an upper portion of the fixed insulation wall is smaller than front-rear and left-right widths of a lower portion of the fixed insulation wall, and the first insulating filler material fills the first slit, which is a space provided between the upper portion of the connection insulation wall and the upper portion of the fixed insulation wall by installing the lower portion of the connection insulation wall to be adjacent to the lower portion of the fixed insulation wall.

11. The liquefied gas storage tank of claim 10, comprising:

a plurality of second slits formed in a longitudinal direction and a width direction of the fixed insulation wall; and one or more third slits formed in a longitudinal direction of the connection insulation wall and positioned collinearly with the second slit formed in the longitudinal direction when the connection insulation wall is inserted and installed between the fixed insulation walls, wherein the second slit and the third slit are formed to a depth corresponding to about half of thicknesses of the fixed insulation wall and the connection insulation wall and are not filled with an insulating filler material therein, the first slit filled with the first insulating filler material is formed to be at least longer than a depth of each of the second slit and the third slit, and a heat convection path through the first slit, the second slit, and the third slit is intermittently formed.

12. The liquefied gas storage tank of claim 9, wherein the primary insulation wall and the secondary insulation wall have the same or similar thickness.

* * * * *